(12) United States Patent
Yi et al.

(10) Patent No.: US 11,985,596 B2
(45) Date of Patent: May 14, 2024

(54) SIDELINK RESOURCE ALLOCATION MODE SWITCHING BASED ON POWER STATE TRANSITIONING

(71) Applicant: Ofinno, LLC, Reston, VA (US)

(72) Inventors: Yunjung Yi, Vienna, VA (US); Esmael Hejazi Dinan, McLean, VA (US); Kyungmin Park, Vienna, VA (US); Hyukjin Chae, Fairfax, VA (US); Taehun Kim, Fairfax, VA (US)

(73) Assignee: Ofinno, LLC, Reston, VA (US)

( * ) Notice: Subject to any disclaimer, the term of this patent is extended or adjusted under 35 U.S.C. 154(b) by 246 days.

(21) Appl. No.: 17/694,935

(22) Filed: Mar. 15, 2022

(65) Prior Publication Data

US 2022/0210739 A1 Jun. 30, 2022

Related U.S. Application Data

(63) Continuation of application No. PCT/US2020/053776, filed on Oct. 1, 2020.

(60) Provisional application No. 62/908,863, filed on Oct. 1, 2019.

(51) Int. Cl.
  *H04W 52/02* (2009.01)
  *H04L 5/00* (2006.01)

(52) U.S. Cl.
  CPC ....... *H04W 52/0229* (2013.01); *H04L 5/0037* (2013.01)

(58) Field of Classification Search
  CPC ........................ H04W 52/0229; H04L 5/0037
  USPC .......................................................... 370/311
  See application file for complete search history.

(56) References Cited

U.S. PATENT DOCUMENTS

| 11,115,162 B2* | 9/2021 | Kim .................. H04W 72/044 |
| 2015/0264677 A1* | 9/2015 | He ........................ H04L 5/0069 |
| | | 370/312 |

FOREIGN PATENT DOCUMENTS

| WO | 2020063519 A1 | 4/2020 |
| WO | 2020204438 A1 | 10/2020 |

OTHER PUBLICATIONS

R2-1908708—Discussion on sidelink related capability signaling; 3GPP TSG-RAN WG2 Meeting #107; Prague, Czech, Aug. 26-Aug. 30, 2019; Agenda Item:11.4.2; Source:OPPO; Title: Discussion on sidelink related capability signalling.
R2-1908717—Summary of [106#77] V2X Prioritisation (OPPO)_v1.0; 3GPP TSG-RAN WG2 Meeting #107; Prague, Czech, Aug. 26-Aug. 30, 2019; Agenda Item: 11.4.2; Source:OPPO (rapporteur); Title:Summary of [106#77] UL/SL prioritization.
R2-1908718—Left issues on UL-SL prioritization for NR-V2X; 3GPP TSG-RAN WG2 Meeting #107; Prague, Czech, Aug. 26-Aug. 30, 2019; Agenda Item: 11.4.2; Source:OPPO.

(Continued)

*Primary Examiner* — Intekhaab A Siddiquee
(74) *Attorney, Agent, or Firm* — Jacob L. Mangan; Kavon Nasabzadeh; Philip R. Smith

(57) ABSTRACT

A wireless device may receive receive one or more messages indicating a first sidelink operation mode, for a sidelink carrier, in which a base station schedules sidelink resources for a sidelink carrier, and a scheduling cell for the sidelink carrier. The wireless device may transition the scheduling cell from a normal power state to a power saving state. In response to the transitioning, the wireless device may switch from the first sidelink operation mode to a second sidelink operation mode in which the wireless device determines sidelink resources.

20 Claims, 37 Drawing Sheets

(56) References Cited

OTHER PUBLICATIONS

R2-1908743; 3GPP TSG-RAN WG2 Meeting #107; Prague, Czech Republic, Aug. 26-30, 2019; Source:CATT ; Title:New Triggers for Uu RRC Connection Establishment or Resume; Agenda Item:11.4. 2.
R2-1908747; 3GPP TSG-RAN WG2 Meeting #107; Prague, Czech Republic, Aug. 26-30, 2019; Source:CATT; Title:Prioritization between UL and SL for NR V2X; Agenda Item:11.4.2.
R2-1908817_BWP Aspects of Sidelink and Uu Prioritisation; 3GPP TSG-RAN2 107; Prague, Czech Republic, Aug. 26-Aug. 30, 2019; Agenda item: 11.4.2; Source:Samsung; Title:BWP Aspects of SL and Uu Prioritisation.
R2-1908820_RRC Connection Initiation Trigger for V2X Sidelink Communication; 3GPP TSG-RAN2 107; Prague, Czech Republic, Aug. 26-Aug. 30, 2019; Agenda item: 11.4.2; Source:Samsung; Title:RRC Connection Initiation Trigger for V2X Sidelink Communication.
R2-1909059 Discussion on NR V2X UE operations under different RRC states; As 3GPP TSG-RAN WG2 Meeting #107 ; Prague, Czech Republic, Aug. 26-30, 2019; Agenda Item: 11.4.4; Source:ZTE Corporation, Sanechips; Title: Discussion on NR V2X UE operations under different RRC states.
R2-1909067 Discussion on UL and SL prioritisation; 3GPP TSG RAN WG2 Meeting #107; Prague, Czech Republic, Aug. 26-30, 2019; Title: Discussion on UL and SL prioritisation; Source: ZTE, Sanechips; Agenda item:11.4.2; Document for: Discussion and Approval.
R2-1909069 Discussion on multi-mode co-existence; 3GPP TSG RAN WG2 Meeting #107; Prague, Czech Republic, Aug. 26-30, 2019; Title: Consideration on multi-mode co-existence; Source: ZTE, Sanechips; Agenda tem:11.4.2; Document for: Discussion and Approval.
R2-1909072 Consideration on sidelink RRM measurement; 3GPP TSG RAN WG2 Meeting #107; Prague, Czech Republic, Aug. 26-30, 2019; Title: Consideration on sidelink RRM measurement; Source: ZTE Corporation, Sanechips; Agenda item:11.4.2; Document for: Discussion and Approval.
R2-1909073 Consideration on system information acquisition for NR V2X; 3GPP TSG-RAN WG2#107; Prague, Czech Republic, Aug. 26-30, 2019; Title: Consideration on system info acquisition of NR V2X; Source: ZTE; Agenda tem:11.4.2.
R2-1909279 Further views on NR V2X System Information; 3GPP TSG-RAN WG2 Meeting #107; Prague, Czechia, Aug. 26-30, 2019; Agenda item:11.4.2; Source:Nokia, Nokia Shanghai Bell.
R2-1909280_SL_UL prioritization for NR V2X; 3GPP TSG-RAN WG2 Meeting #107; Prague, Czechia, Aug. 26-30, 2019; Agenda item: 11.4.2; Source: Nokia, Nokia Shanghai Bell.
R2-1909281_Further granularity of prioritizing UCI versus SL transmissions; 3GPP TSG-RAN WG2 Meeting #107; Prague, Czechia, Aug. 26-30, 2019; Agenda item: 11.4.2; Source:Nokia, Nokia Shanghai Bell.
R2-1909592 (R16 V2X WI A1142 RAN2 aspect of HARQ for NR V2X); 3GPP RAN WG2 Meeting #107; Prague, Czech Republic, Aug. 26-30, 2019; Agenda Item:11.4.2; Source:InterDigital Inc.; Title:RAN2 aspects of HARQ for NR V2X ; Document for: Discussion, Decision.
R2-1910036; 3GPP TSG-RAN WG2 Meeting #107; Prague, Czech Republic, Aug. 26-30, 2019; Title:[Draft] LS to RAN1 on Nr V2X cross-RAT configuration; Release:Release 16.
R2-1910135—Handling of SL in Uu RRC State Transitions; 3GPP TSG-RAN WG2 #107; Prague, Czech Republic, Aug. 26-30, 2019; Agenda Item: 11.4.2; Source: Ericsson; Title:Handling of SL in Uu RRC State Transitions.
R2-1910137—SL handling during handover in NR; 3GPP TSG-RAN WG2 #107; Prague, Czech Republic, Aug. 26-30, 2019; Agenda Item:11.4.2; Source:Ericsson; Title:SL handling during handover in NR.
R2-1910139—Discussion on SL measurements reporting; 3GPP TSG-RAN WG2 #107; Prague, Czech, Aug. 26-30, 2019; Agenda Item:11.4.2; Source:Ericsson; Title:Discussion on SL measurements reporting.
R2-1910198_Prioritization between SCG UL and SL; 3GPP TSG-RAN WG2 Meeting #107; Prague, Czech Republic, Aug. 26-30, 2019; Agenda Item: 11.4.2; Source:Apple; Title:Prioritization between SCG UL and SL.
R2-1910215_Uplink and Sidelink transmission prioritization in NR V2X; 3GPP TSG-RAN WG2 Meeting #107; Prague, CZ, Aug. 26-30, 2019(Revision of R2-1905847); Source:vivo ; Title:Uplink and Sidelink transmission prioritization in NR V2X; Agenda Item: 11.4.2.
R2-1910232_UE operation upon NR Uu Beam Failure; 3GPP TSG-RAN WG2 Meeting #107; Prague, Czech Republic, Aug. 26-30, 2019; Source:LG Electronics ; Title:UE operation upon NR Uu Beam Failure; Agenda Item: 11.4.2.
R2-1910283 V2X-Prioritization; 3GPP TSG-RAN WG2 Meeting #107; Prague, Czech Republic,Aug. 26-30, 2019; Agenda item:11. 4.2; Source:Lenovo, Motorola Mobility; Title:Remaining issue for prioritization for NR V2X.
R2-1910872_NR Uu SL priotirization; 3GPP TSG RAN WG2 #107; Prague, Czechia, Aug. 26-30, 2019; Agenda item: 11.4.2; Source: Qualcomm Incorporated; Title: Uplink and Sidelink Prioritization in NR V2X.
R2-1911328; 3GPP TSG-RAN WG2 Meeting #107; Prague, Czech Republic, Aug. 26-30, 2019(Revision of R2-1907964); Agenda item:11.4.2; Source:Samsung; Title:Interaction between RRC Connection Resume Condition and RNAU for NR V2X SL Communication.
R2-1911679—LS on UL-SL prioritization; 3GPP TSG-RAN WG2 Meeting #107; Prague, Czech, Aug. 26-Aug. 30, 2019; Title:LS on UL-SL prioritization; Response to: Release: Rel-16.
International Search Report and Written Opinion for International Application No. PCT/US2020/053776 dated Mar. 30, 2021.
R1-1908947—3GPP TSG RAN WG1 #98; Prague, CZ, Aug. 26-30, 2019; Source: Spreadtrum Communications Title: Discussion on physical layer structure for sidelink; Agenda item: 7.2.4.1; Document for: Discussion and Decision.

* cited by examiner

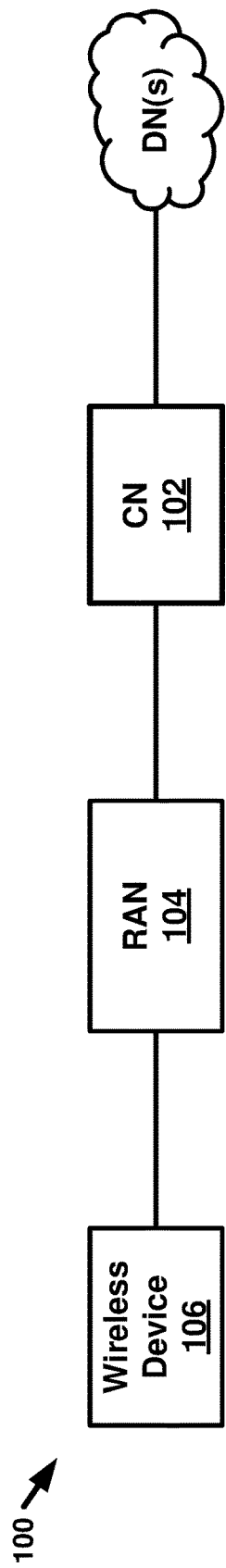
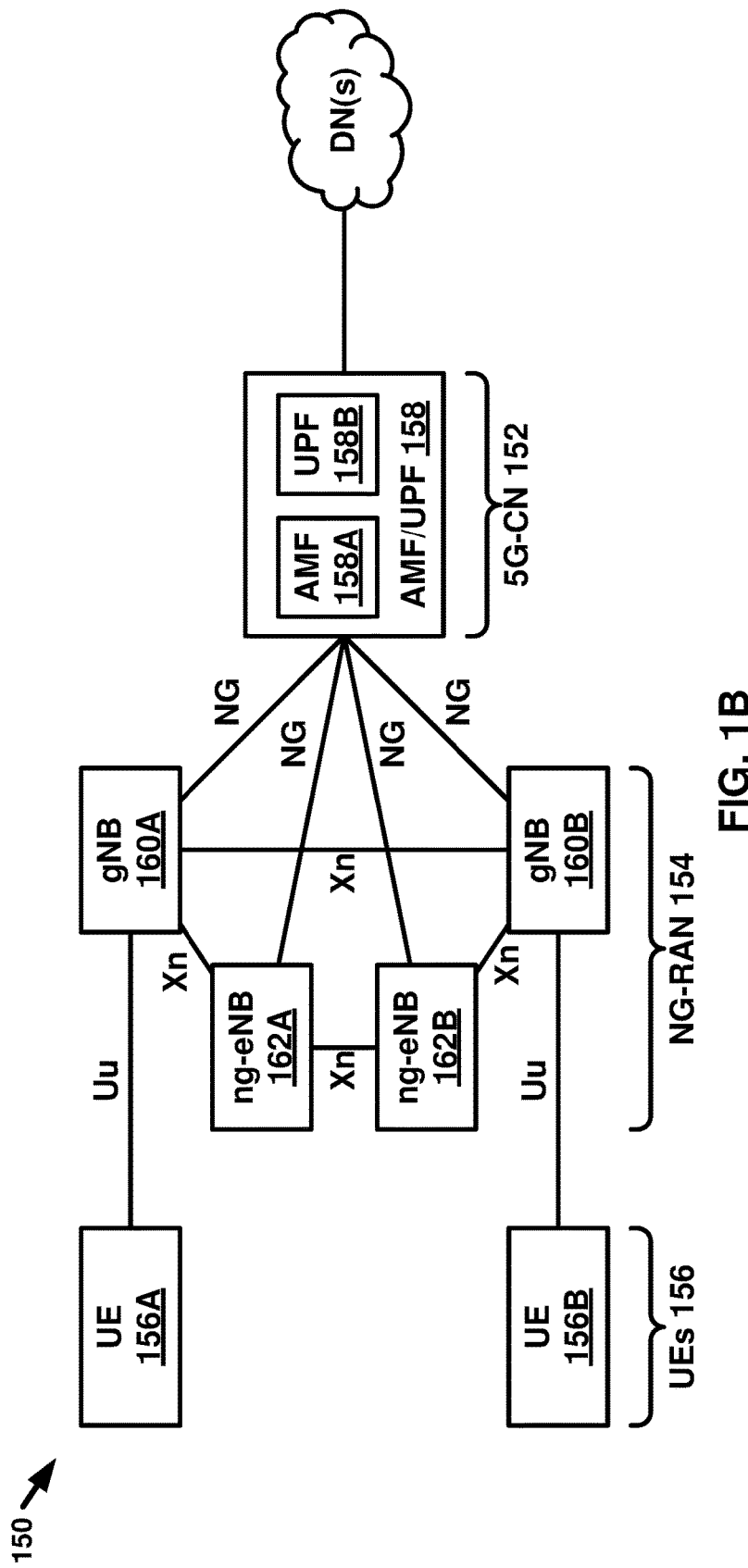

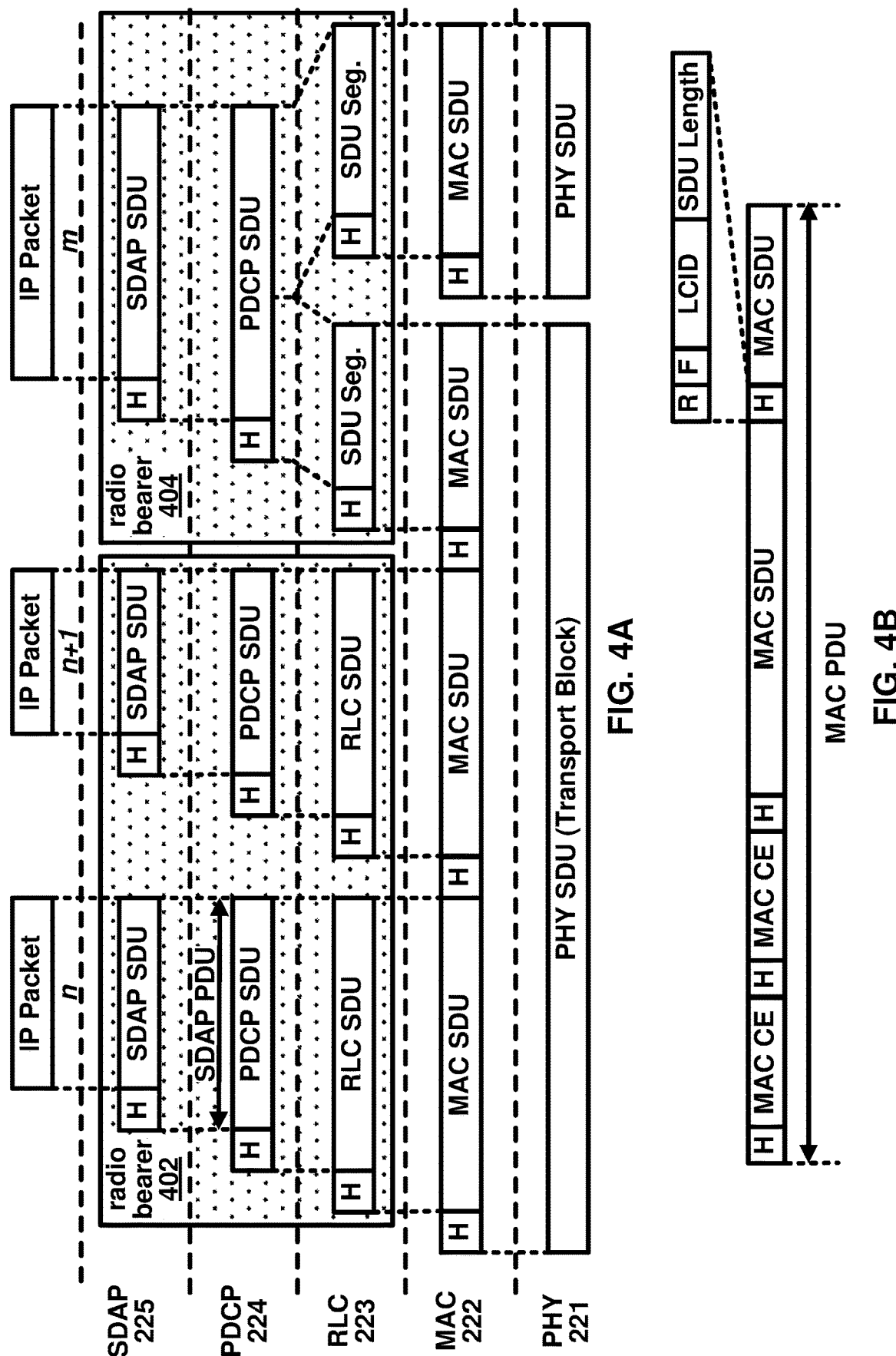

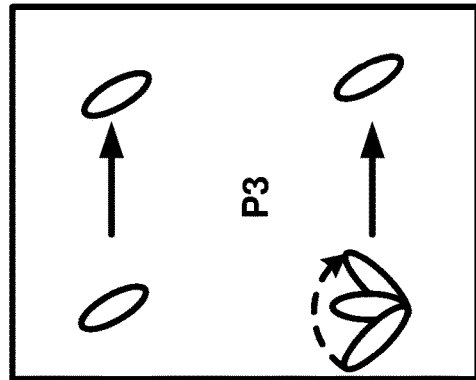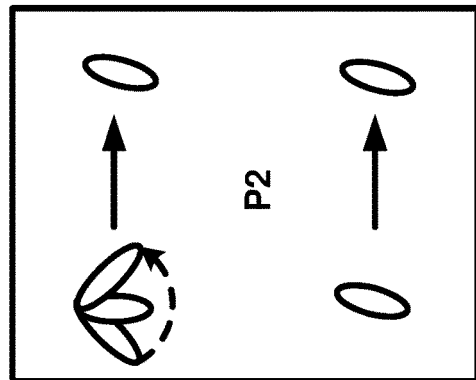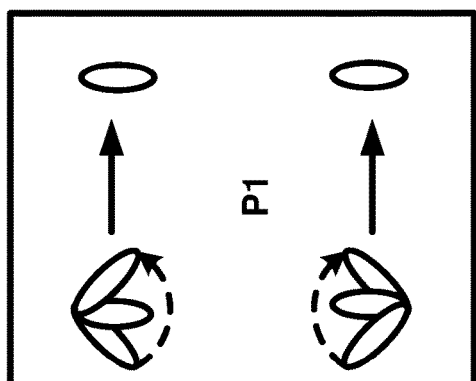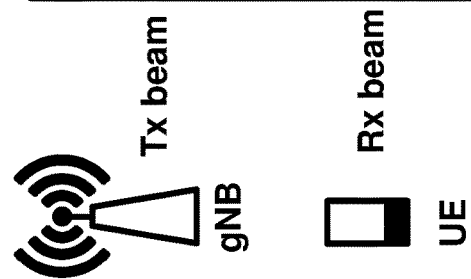
FIG. 12A
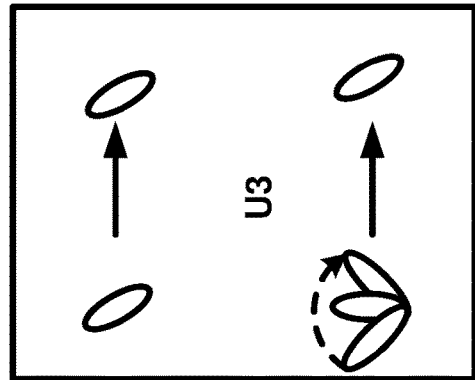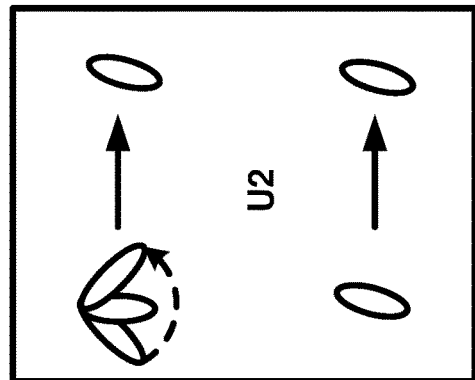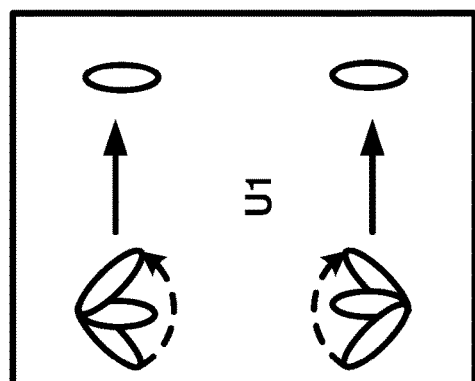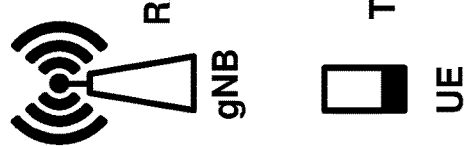
FIG. 12B

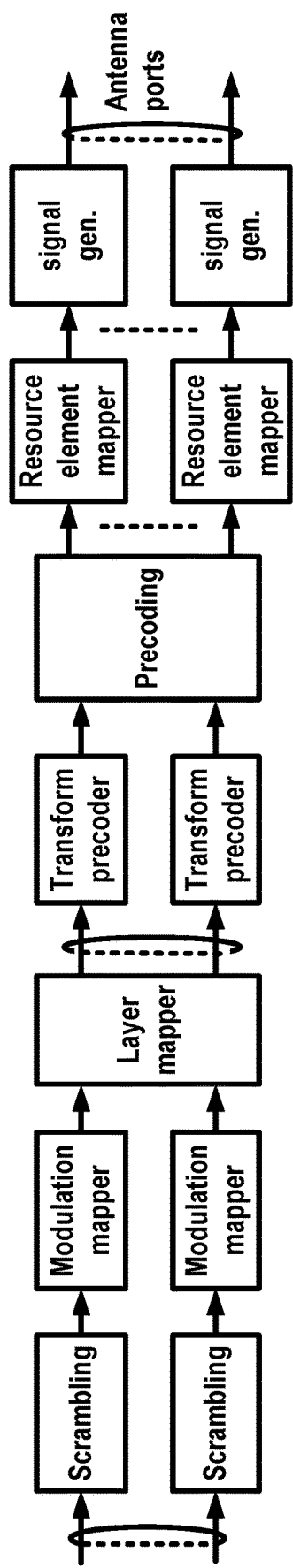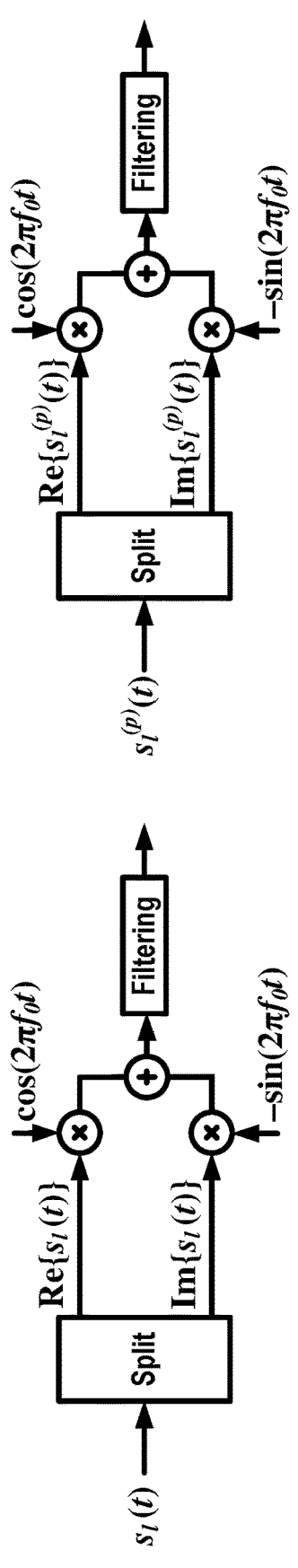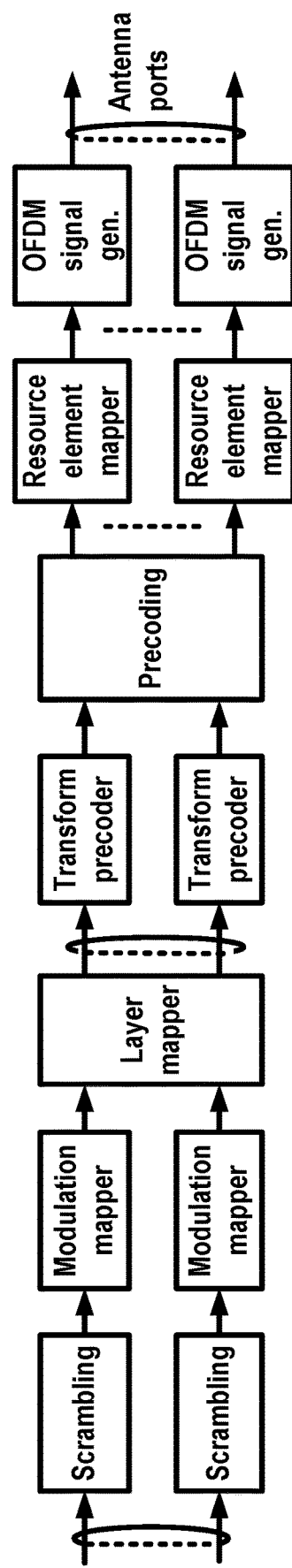
FIG. 16A
FIG. 16B
FIG. 16C
FIG. 16D

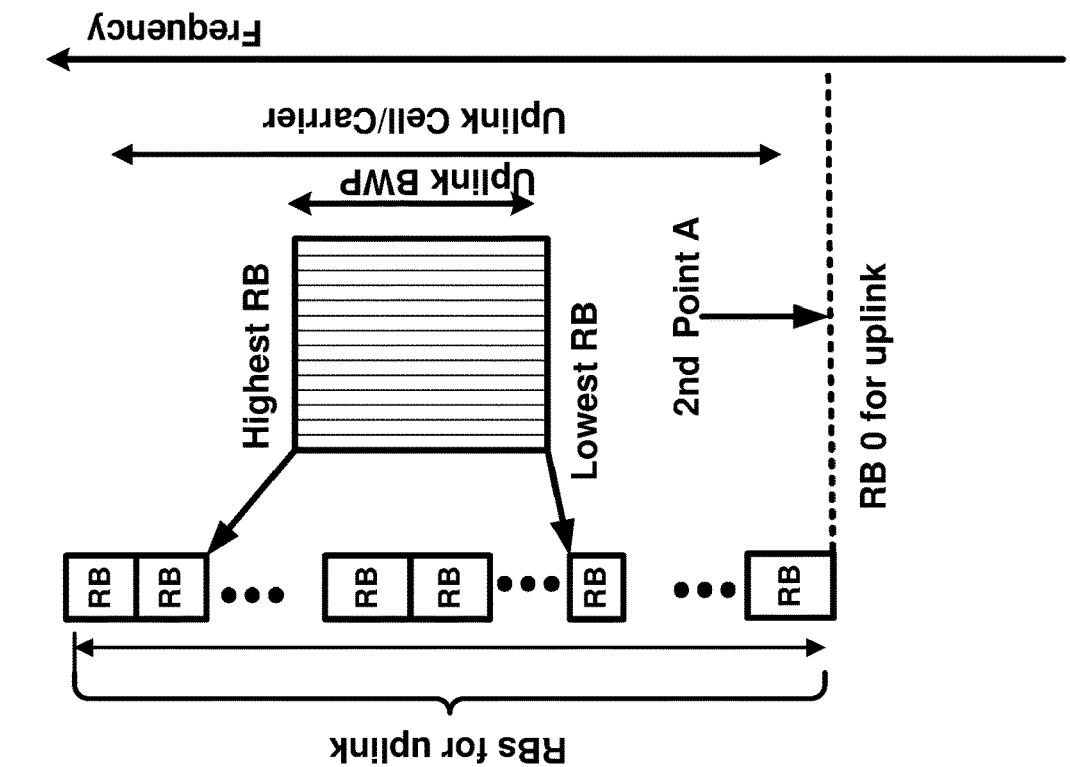
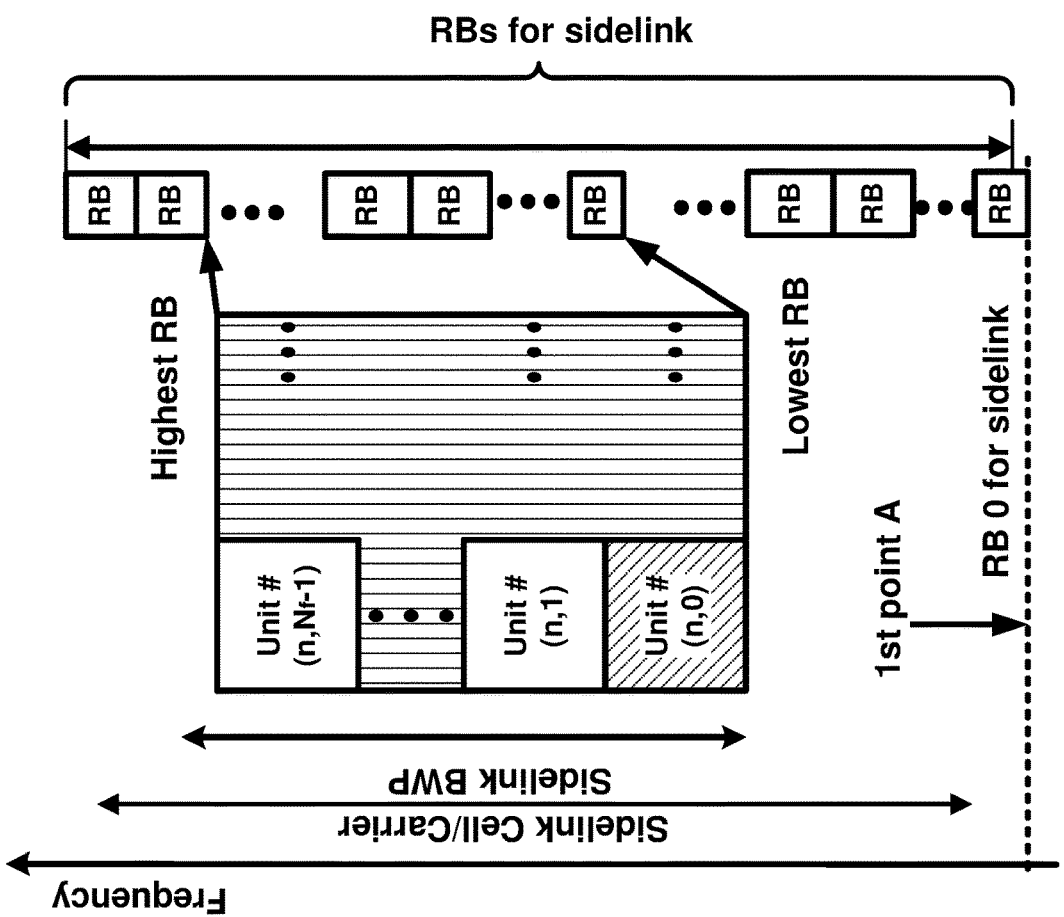
FIG. 19

SIDELINK RESOURCE ALLOCATION MODE SWITCHING BASED ON POWER STATE TRANSITIONING

CROSS-REFERENCE TO RELATED APPLICATIONS

This application is a continuation of International Application No. PCT/US2020/053776, filed Oct. 1, 2020, which claims the benefit of U.S. Provisional Application No. 62/908,863, filed Oct. 1, 2019, all of which are hereby incorporated by reference in their entireties.

BRIEF DESCRIPTION OF THE DRAWINGS

Examples of several of the various embodiments of the present disclosure are described herein with reference to the drawings.

FIG. 1A and FIG. 1B illustrate example mobile communication networks in which embodiments of the present disclosure may be implemented.

FIG. 4A illustrates an example downlink data flow through the NR user plane protocol stack of FIG. 2A.

FIG. 4B illustrates an example format of a MAC subheader in a MAC PDU.

FIG. 12A and FIG. 12B respectively illustrate examples of three downlink and uplink beam management procedures.

FIG. 16A, FIG. 16B, FIG. 16C, and FIG. 16D illustrate example structures for uplink and downlink transmission.

FIG. 19 is a diagram of example of a first resource block grid for sidelink and a second resource block grid for uplink as per an aspect of an embodiment of the present disclosure.

DETAILED DESCRIPTION

Figure 2A:
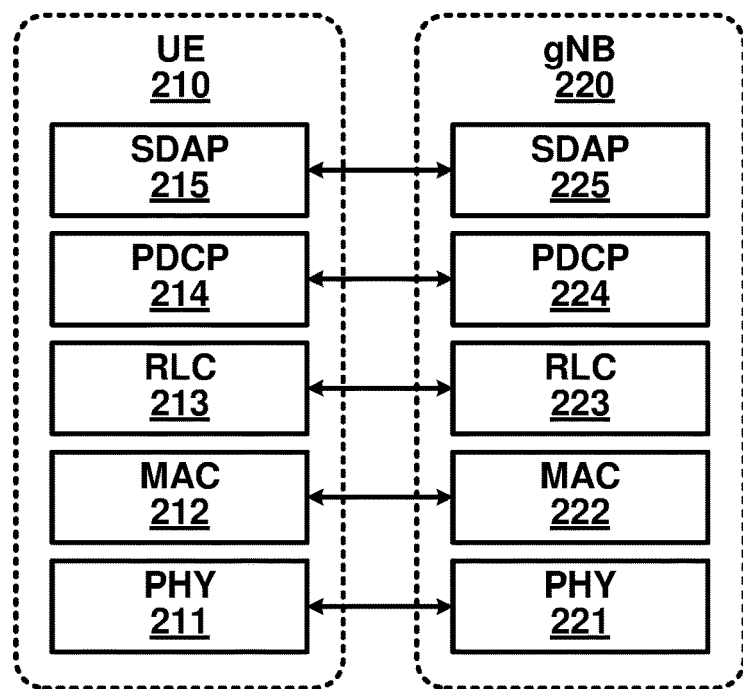
FIG. 2A and FIG. 2B respectively illustrate a New Radio (NR) user plane and control plane protocol stack.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNB s, illustrated as gNB 160A and gNB 160B (collectively gNBs 160) and/or one or more ng-eNB s, illustrated as ng-eNB 162A and ng-eNB 162B (collectively ng-eNB s 162). The gNBs 160 and ng-eNBs 162 may be more generically referred to as base stations. The gNBs 160 and ng-eNB s 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNB s 160 and/or the ng-eNB s 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNB s 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2B:
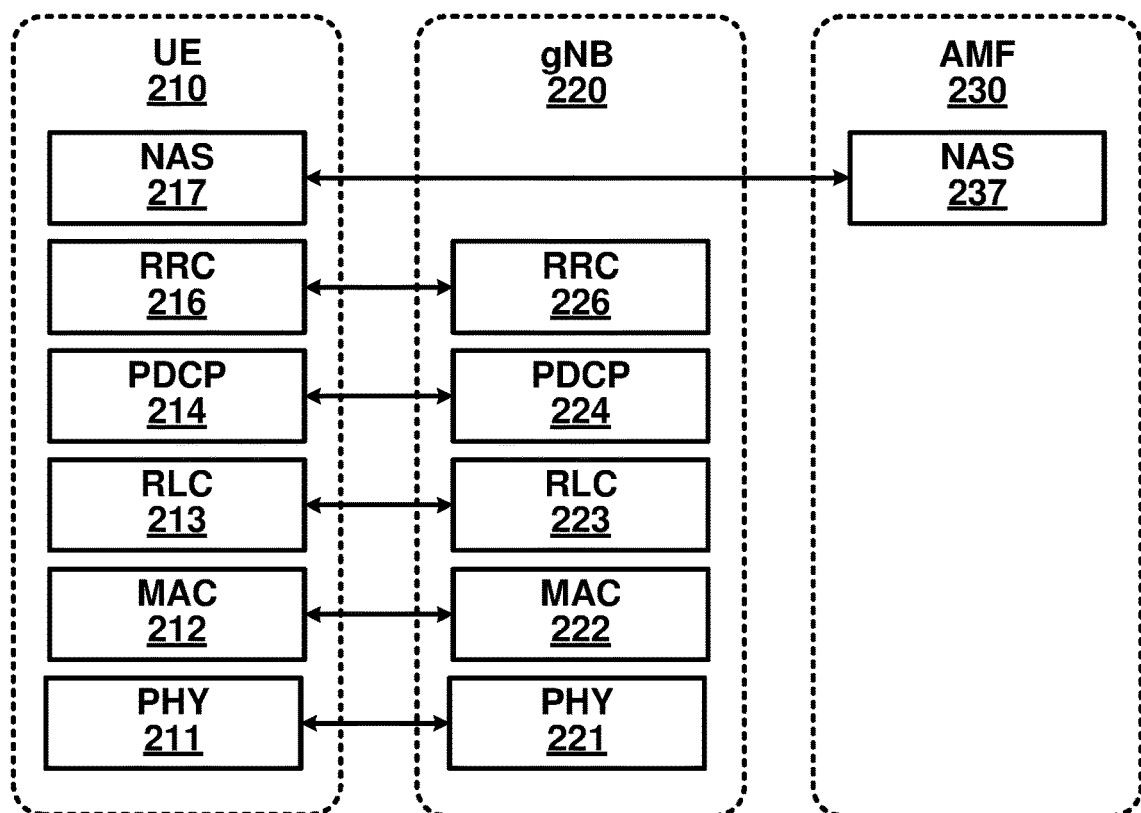

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
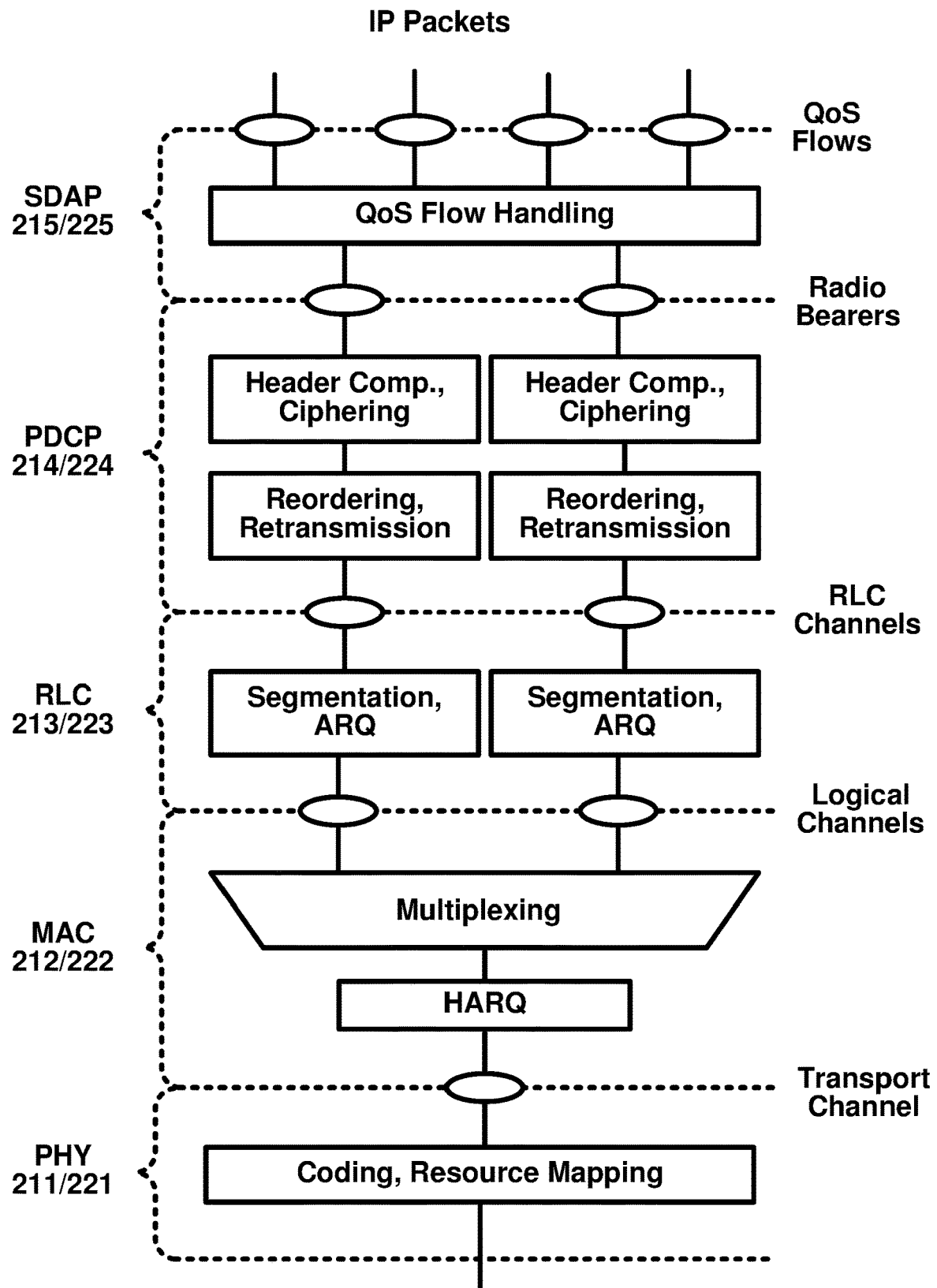
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

FIG. 4A illustrates an example downlink data flow through the NR user plane protocol stack. FIG. 4A illustrates a downlink data flow of three IP packets (n, n+1, and m) through the NR user plane protocol stack to generate two TB s at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figure 5B:
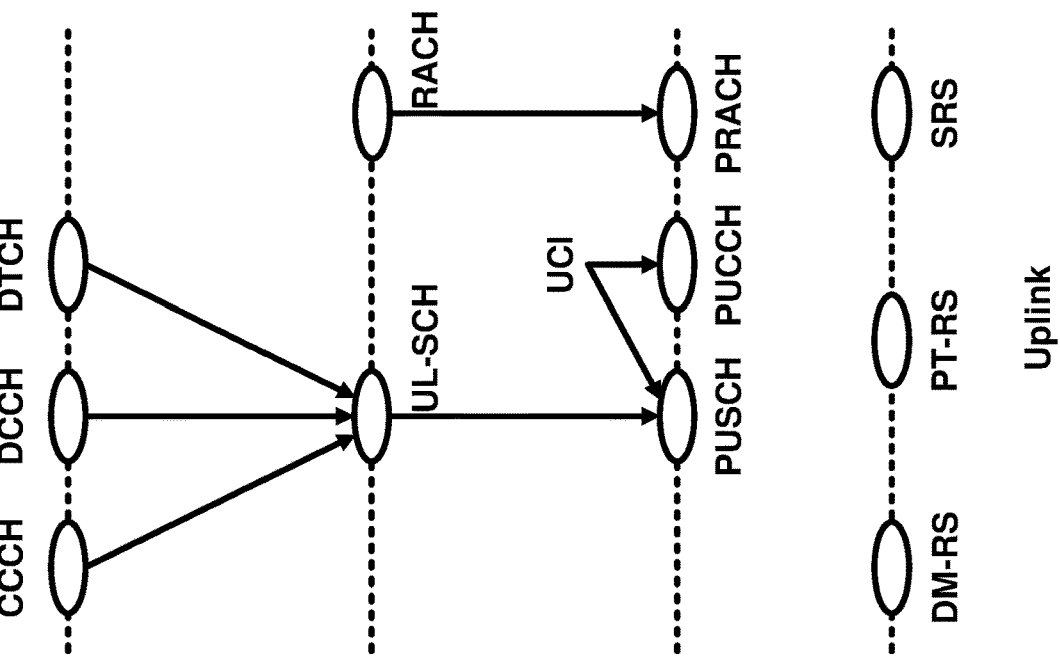
FIG. 5A and FIG. 5B respectively illustrate a mapping between logical channels, transport channels, and physical channels for the downlink and uplink.
Figure 5A:
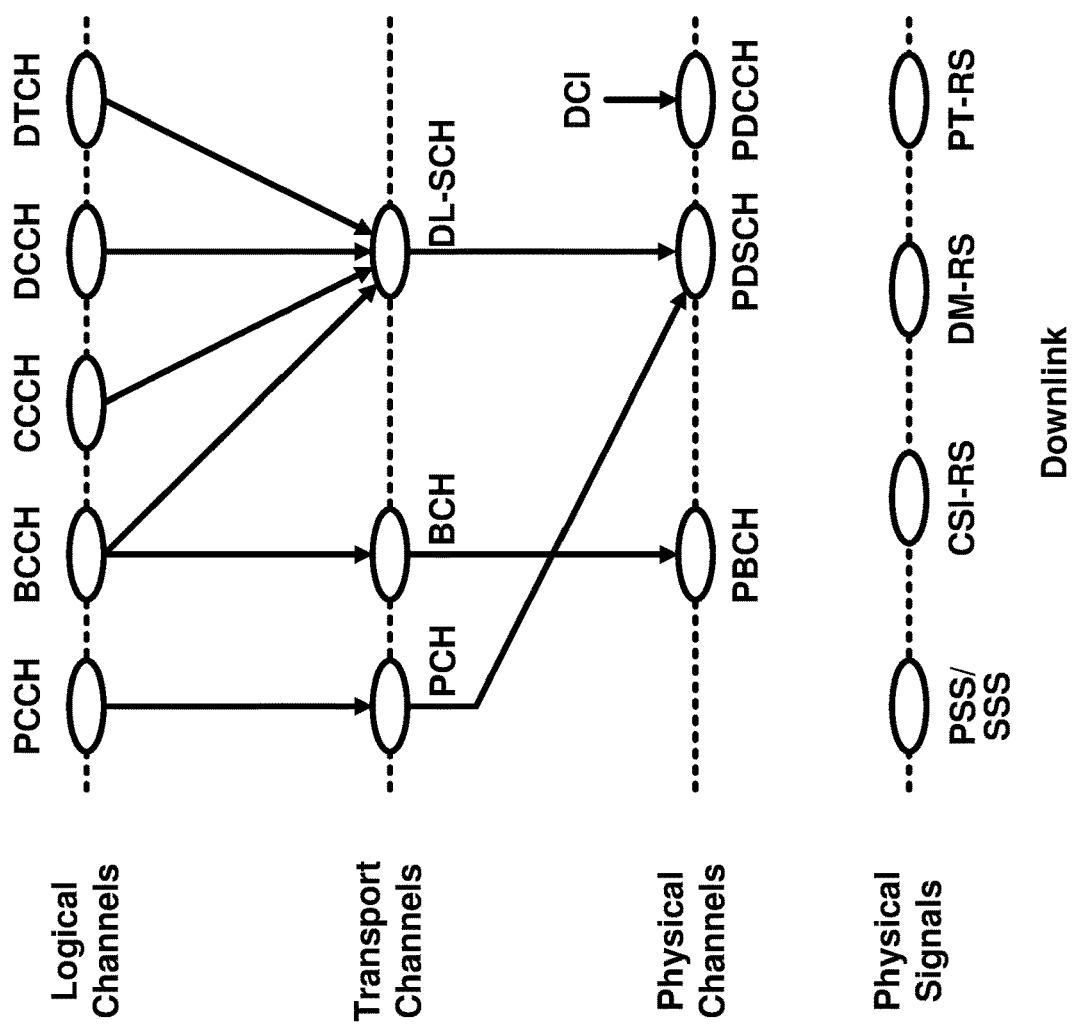

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

a paging control channel (PCCH) for carrying paging messages used to page a UE whose location is not known to the network on a cell level;

a broadcast control channel (BCCH) for carrying system information messages in the form of a master information block (MIB) and several system information blocks (SIBs), wherein the system information messages may be used by the UEs to obtain information about how a cell is configured and how to operate within the cell;

a common control channel (CCCH) for carrying control messages together with random access;

a dedicated control channel (DCCH) for carrying control messages to/from a specific the UE to configure the UE; and a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

a paging channel (PCH) for carrying paging messages that originated from the PCCH;

a broadcast channel (BCH) for carrying the MIB from the BCCH;

a downlink shared channel (DL-SCH) for carrying downlink data and signaling messages, including the SIBs from the BCCH;

an uplink shared channel (UL-SCH) for carrying uplink data and signaling messages; and a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

a physical broadcast channel (PBCH) for carrying the MIB from the BCH;

a physical downlink shared channel (PDSCH) for carrying downlink data and signaling messages from the DL-SCH, as well as paging messages from the PCH;

a physical downlink control channel (PDCCH) for carrying downlink control information (DCI), which may include downlink scheduling commands, uplink scheduling grants, and uplink power control commands;

a physical uplink shared channel (PUSCH) for carrying uplink data and signaling messages from the UL-SCH and in some instances uplink control information (UCI) as described below;

a physical uplink control channel (PUCCH) for carrying UCI, which may include HARQ acknowledgments, channel quality indicators (CQI), pre-coding matrix indicators (PMI), rank indicators (RI), and scheduling requests (SR); and a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

2.2 Control Plane Protocol Stack

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
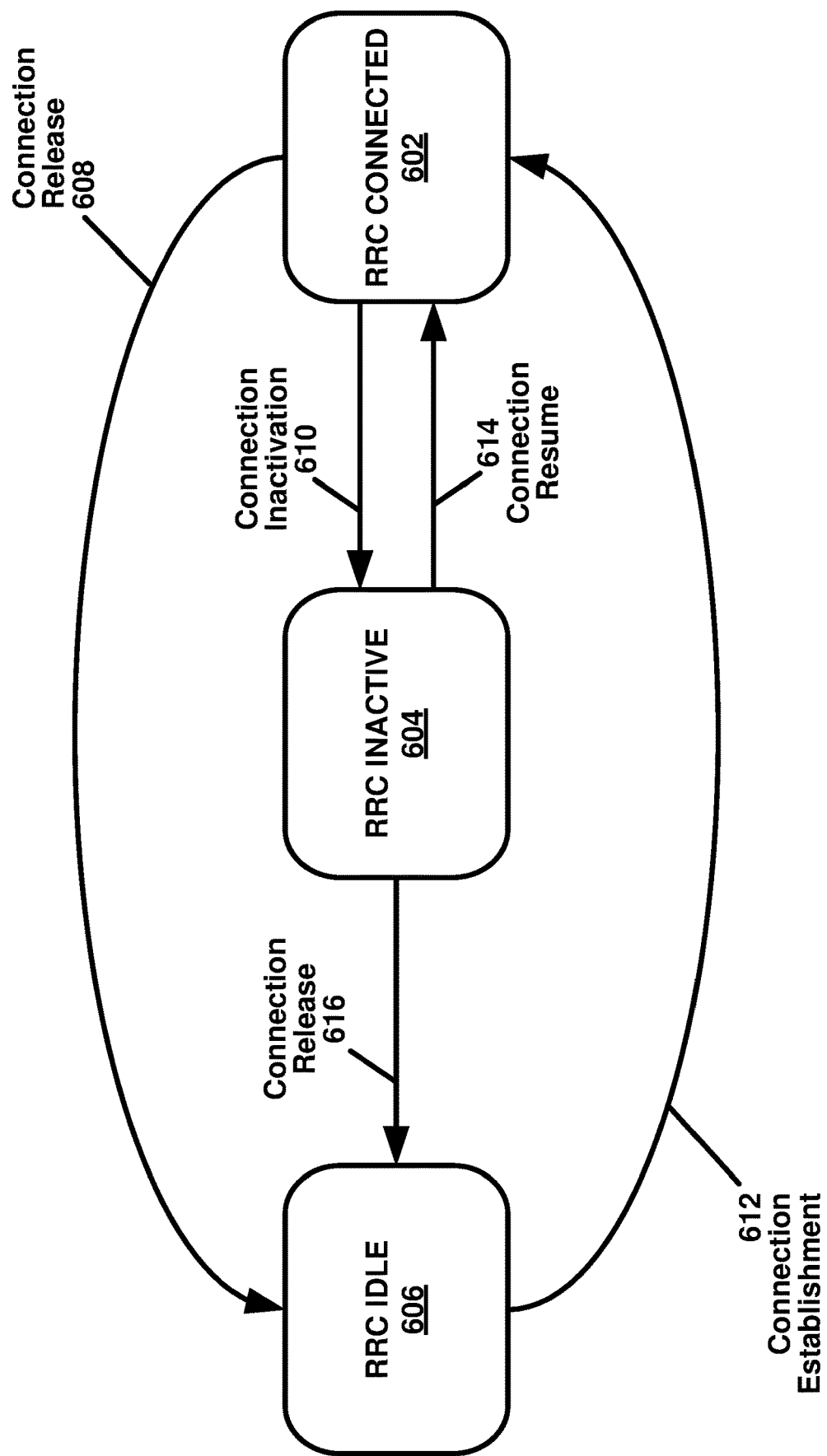
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
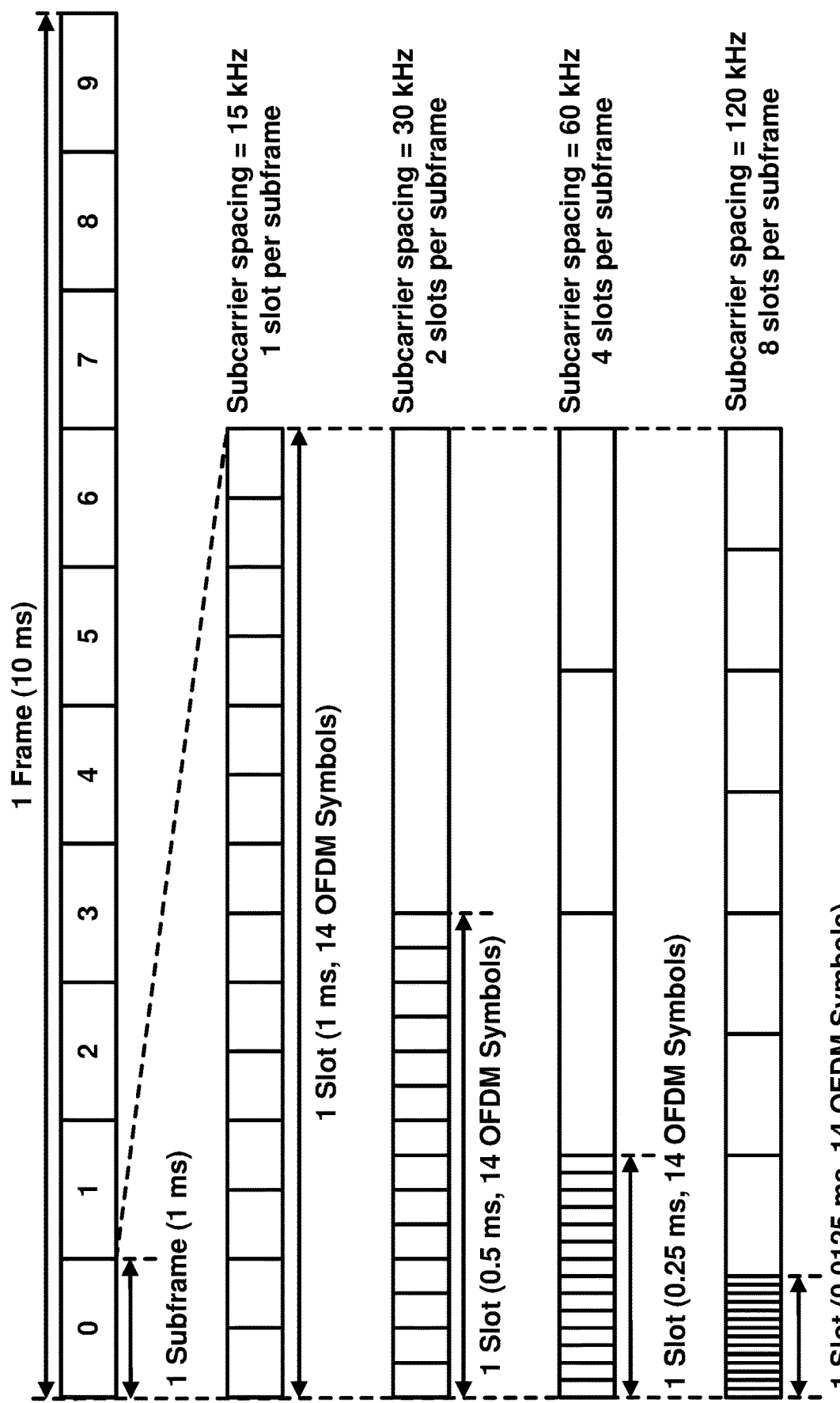
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 μs. For example, NR defines numerologies with the following subcarrier spacing/cyclic prefix duration combinations: 15 kHz/4.7 μs; 30 kHz/2.3 μs; 60 kHz/1.2 μs; 120 kHz/0.59 μs; and 240 kHz/0.29 μs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
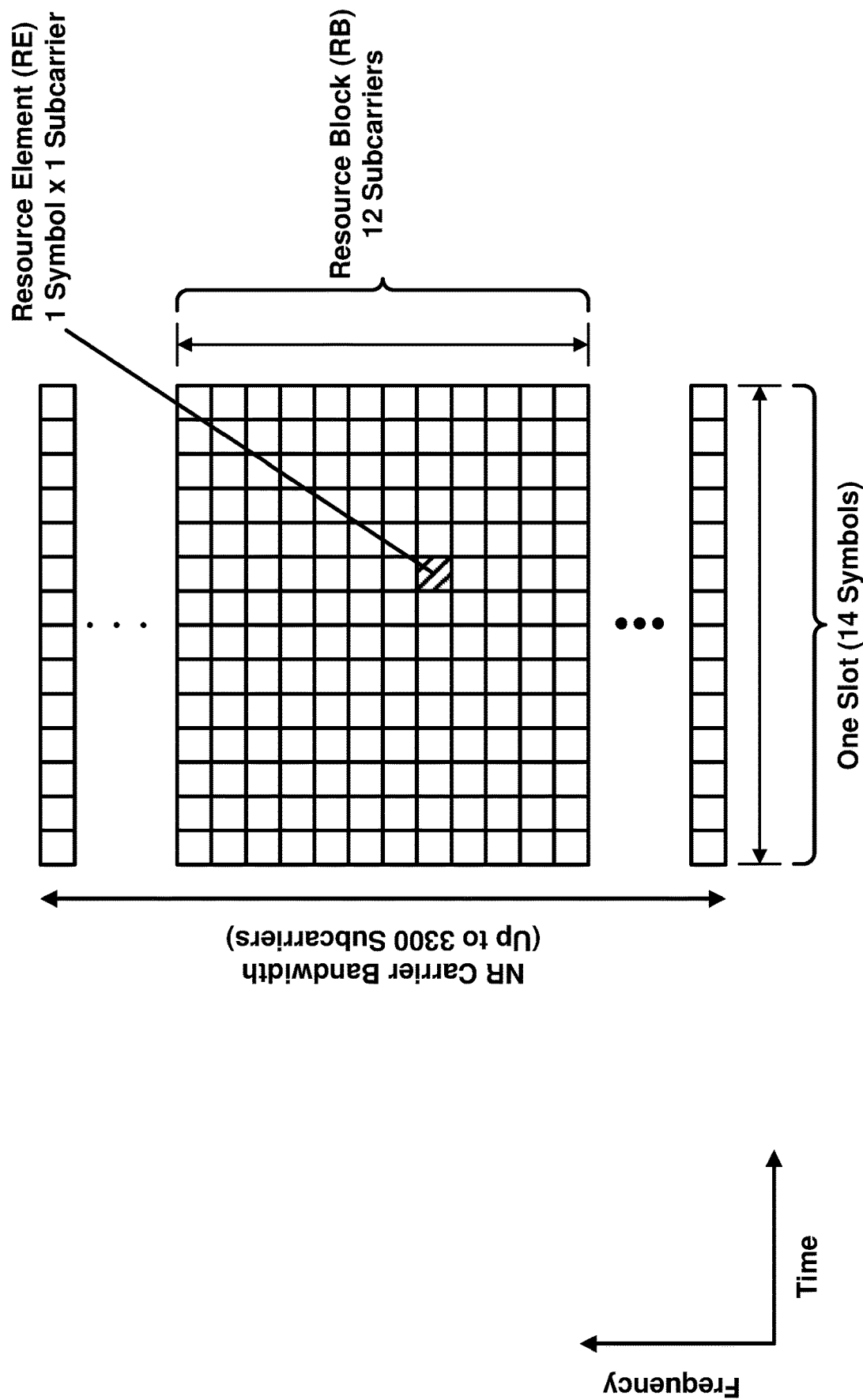
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
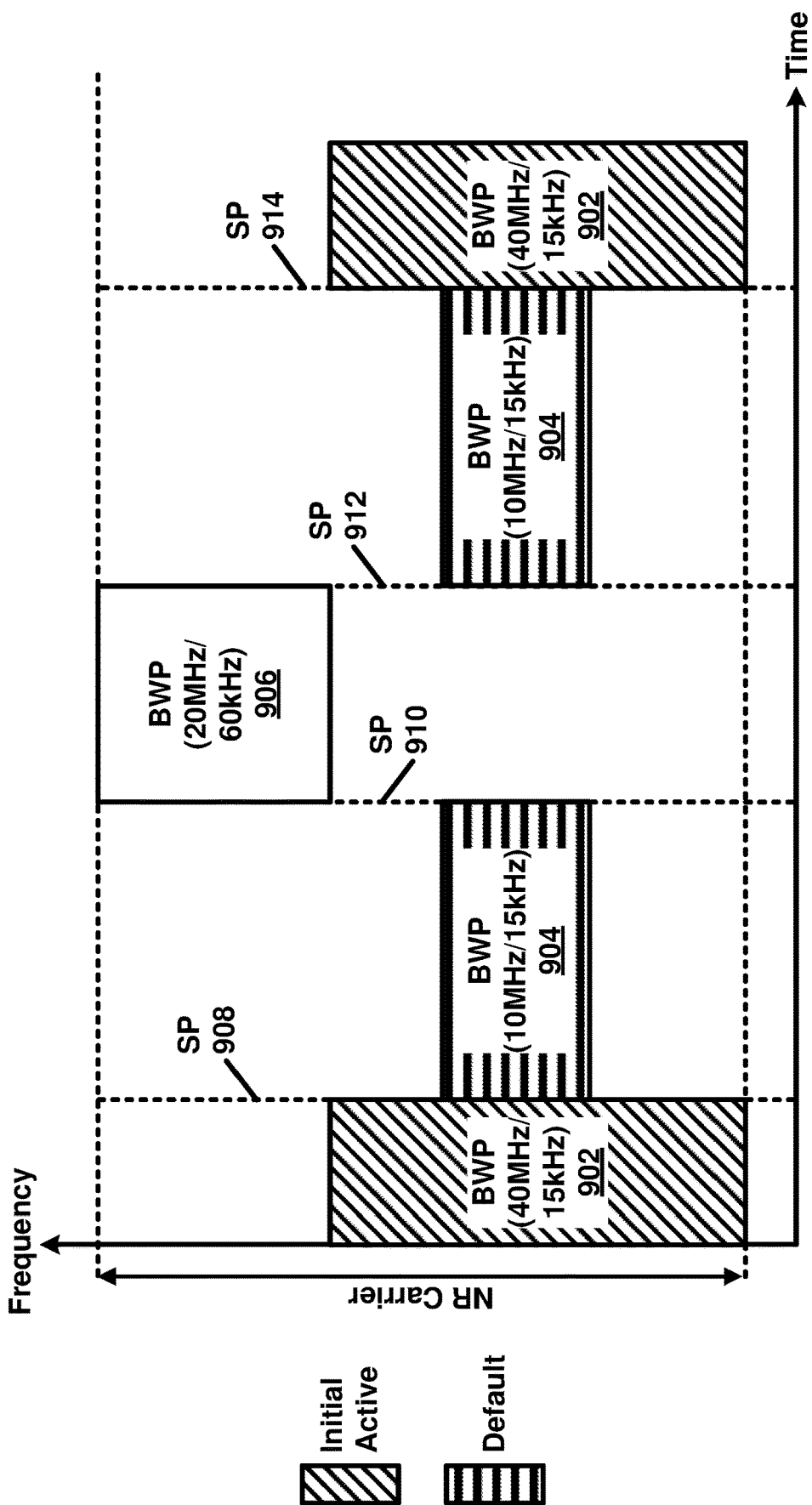
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
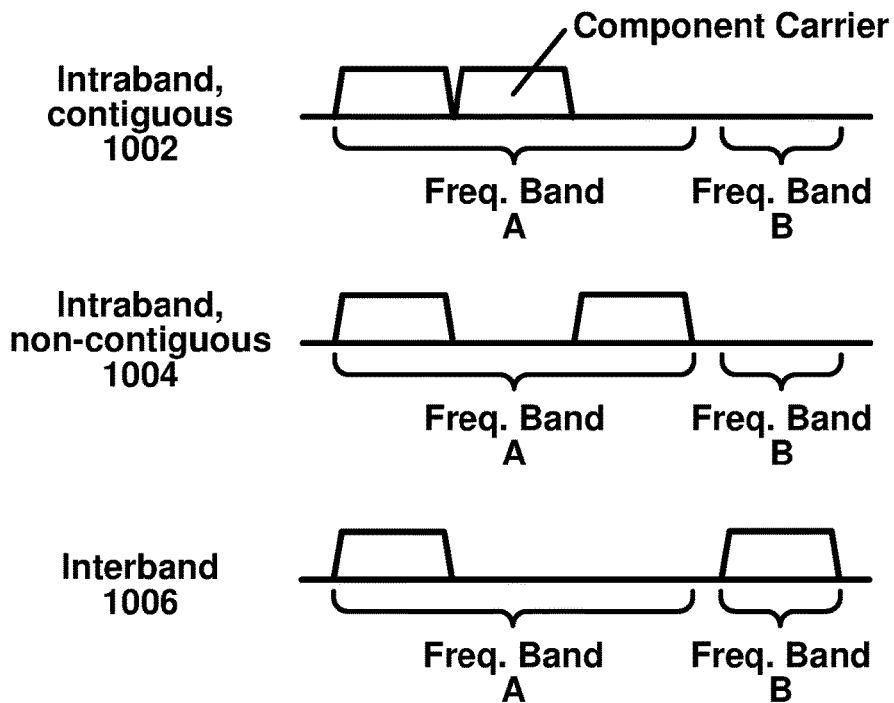
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PDC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
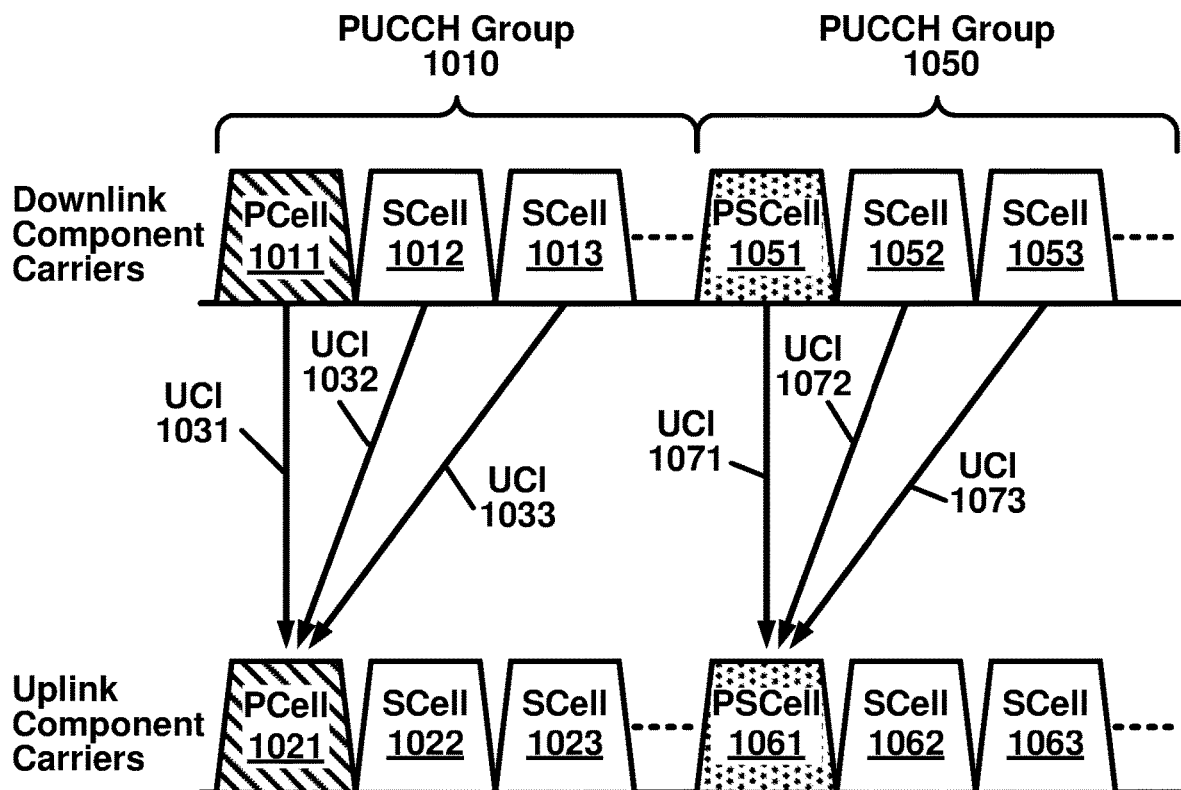
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/ physical broadcast channel (PBCH) block that includes the PSS, the SSS, and the PBCH. The base station may periodically transmit a burst of SS/PBCH blocks.

Figure 11A:
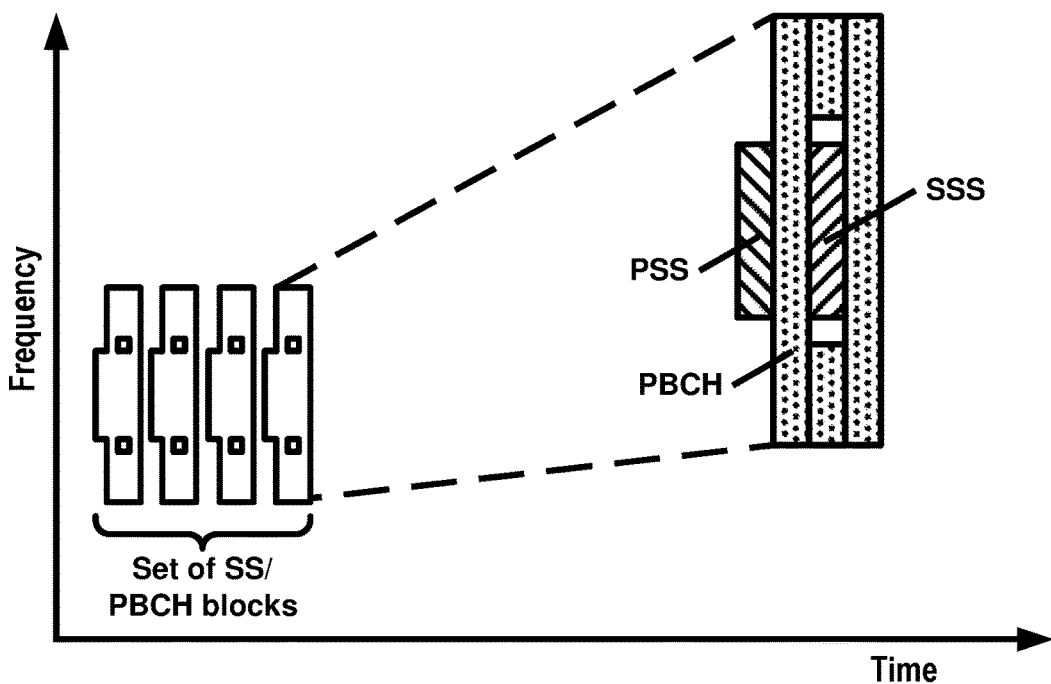
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
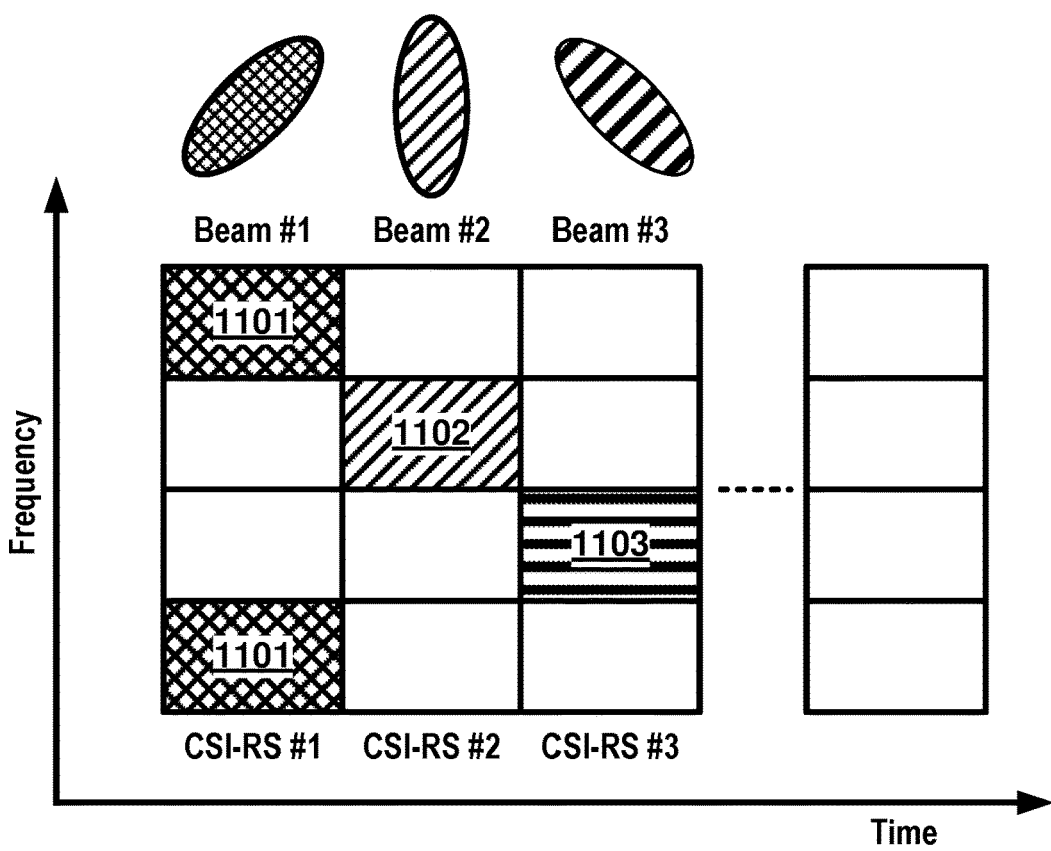
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
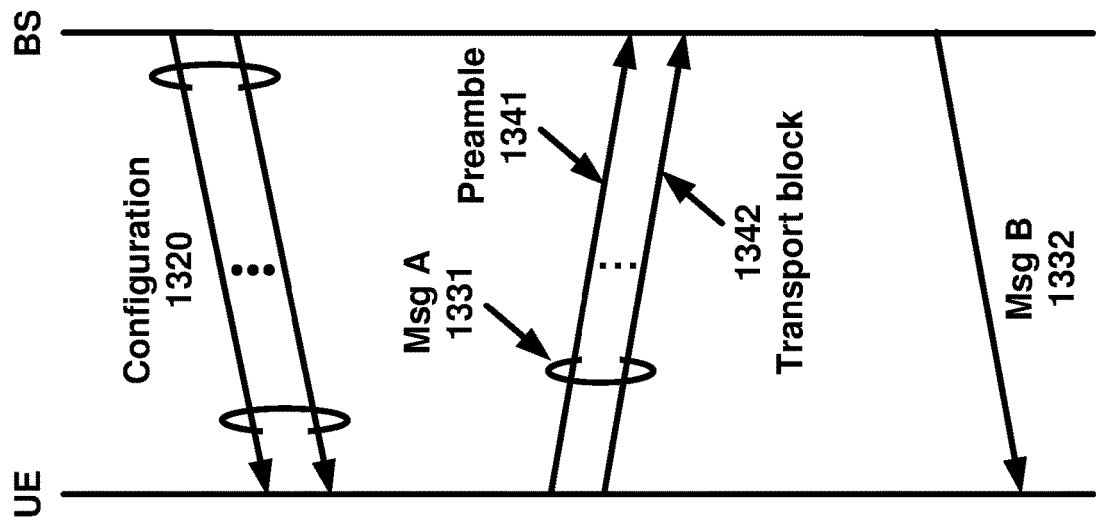
FIG. 13A, FIG. 13B, and FIG. 13C respectively illustrate a four-step contention-based random access procedure, a two-step contention-free random access procedure, and another two-step random access procedure.
Figure 13B:
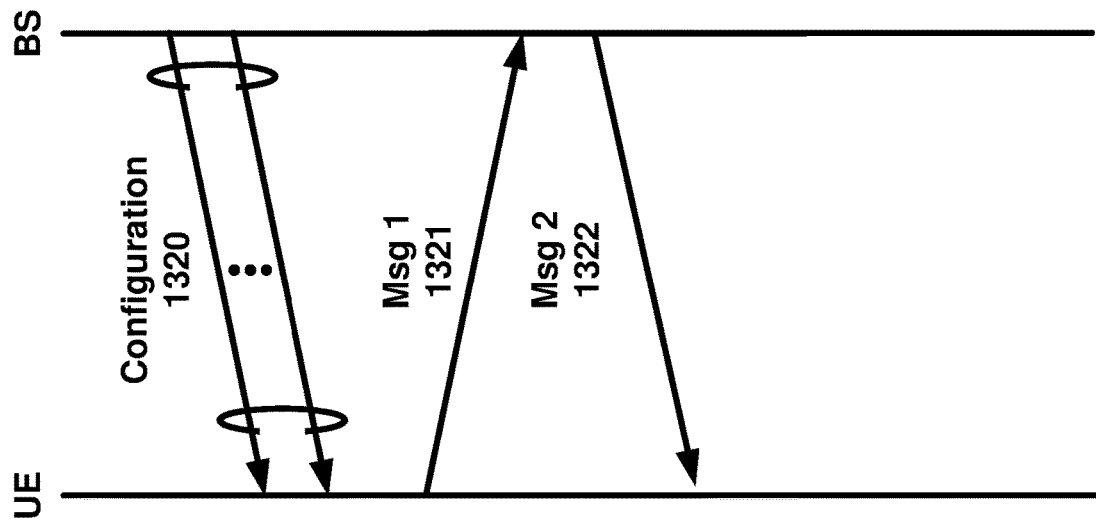
Figure 13A:
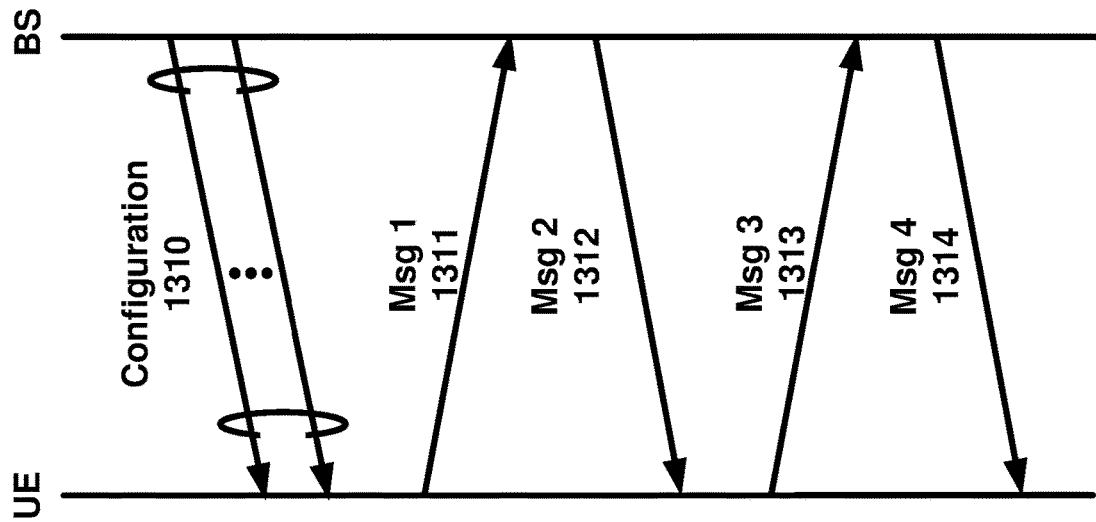

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs.

For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

RA-RNTI=$1+s\_id+14\times t\_id+14\times 80\times f\_id+14\times 80\times 8\times ul\_carrier\_id$ where s_id may be an index of a first OFDM symbol of the PRACH occasion (e.g., $0\leq s\_id<14$), t_id may be an index of a first slot of the PRACH occasion in a system frame (e.g., $0\leq t\_id<80$), f_id may be an index of the PRACH occasion in the frequency domain (e.g., $0\leq f\_id<8$), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3

1313 and the Msg 4 1314) may be used to increase the likelihood that the UE does not incorrectly use an identity of another UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1320 may be transmitted in an uplink transmission by the UE. Msg A 1320 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1350 after or in response to transmitting the Msg A 1320. The Msg B 1350 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1350.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
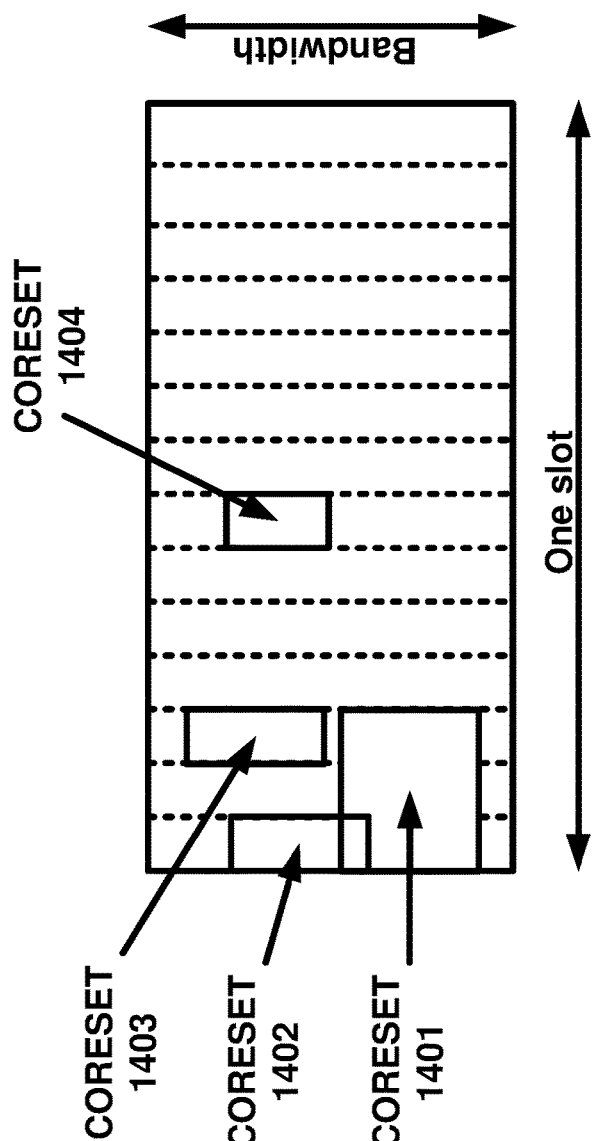
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a size and a location of the CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
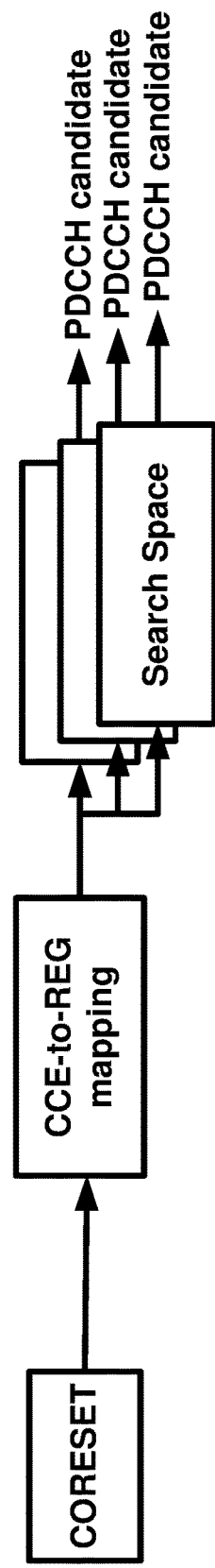
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
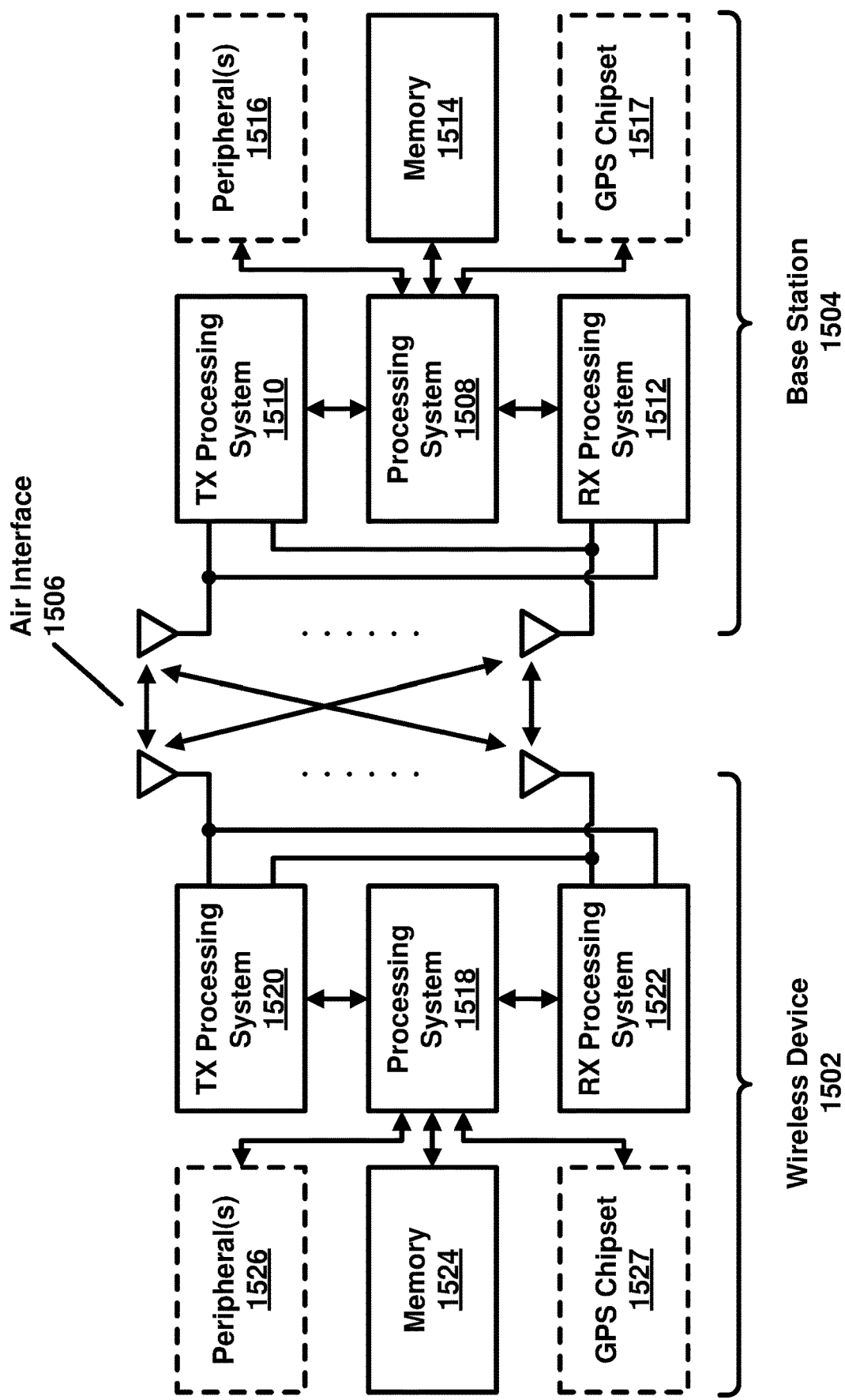
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

Figure 17:
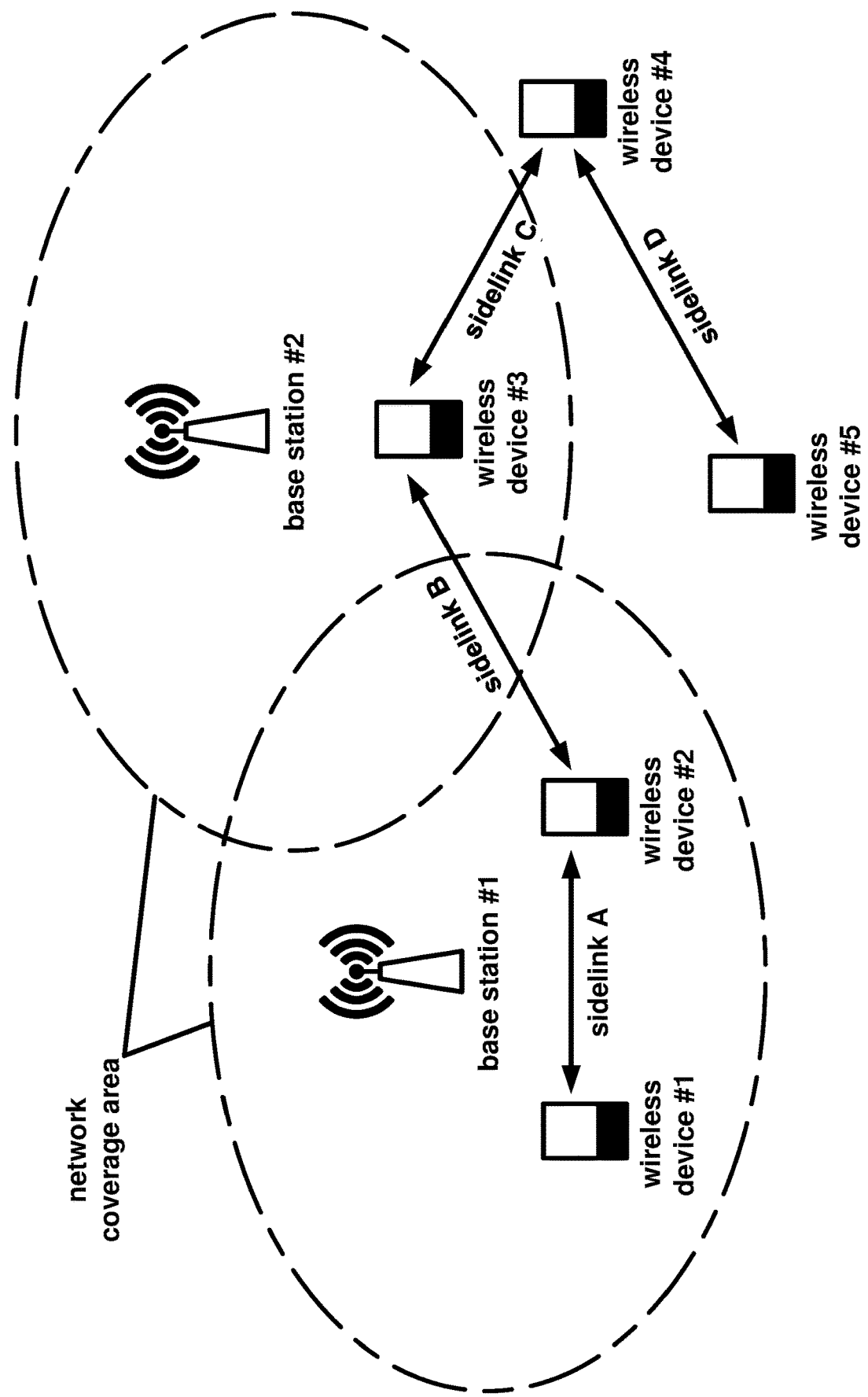
FIG. 17 is a diagram of example of a partial-coverage sidelink communication as per an aspect of an embodiment of the present disclosure.

FIG. 17 illustrates examples of device-to-device (D2D) communication, in which there is a direct communication between wireless devices. In an example, D2D communication may be performed via a sidelink (SL). The wireless devices may exchange sidelink communications via a sidelink interface (e.g., a PC5 interface). Sidelink differs from uplink (in which a wireless device communicates to a base station) and downlink (in which a base station communicates to a wireless device). A wireless device and a base station may exchange uplink and/or downlink communications via a user plane interface (e.g., a Uu interface).

As shown in the figure, wireless device #1 and wireless device #2 may be in a coverage area of base station #1. For example, both wireless device #1 and wireless device #2 may communicate with the base station #1 via a Uu interface. Wireless device #3 may be in a coverage area of base station #2. Base station #1 and base station #2 may share a network and may jointly provide a network coverage area. Wireless device #4 and wireless device #5 may be outside of the network coverage area.

In-coverage D2D communication may be performed when two wireless devices share a network coverage area. Wireless device #1 and wireless device #2 are both in the coverage area of base station #1. Accordingly, they may perform an in-coverage intra-cell D2D communication, labeled as sidelink A. Wireless device #2 and wireless device #3 are in the coverage areas of different base stations, but share the same network coverage area. Accordingly, they may perform an in-coverage inter-cell D2D communication, labeled as sidelink B. Partial-coverage D2D communications may be performed when one wireless device is within the network coverage area and the other wireless device is outside the network coverage area. Wireless device #3 and wireless device #4 may perform a partial-coverage D2D communication, labeled as sidelink C. Out-of-coverage D2D communications may be performed when both wireless devices are outside of the network coverage area. Wireless device #4 and wireless device #5 may perform an out-of-coverage D2D communication, labeled as sidelink D.

Sidelink communications may be configured using physical channels, for example, a physical sidelink broadcast channel (PSBCH), a physical sidelink feedback channel (PSFCH), a physical sidelink discovery channel (PSDCH), a physical sidelink control channel (PSCCH), and/or a physical sidelink shared channel (PSSCH). PSBCH may be used by a first wireless device to send broadcast information to a second wireless device. PSBCH may be similar in some respects to PBCH. The broadcast information may comprise, for example, a slot format indication, resource pool information, a sidelink system frame number, or any other suitable broadcast information. PSFCH may be used by a first wireless device to send feedback information to a second wireless device. The feedback information may comprise, for example, HARQ feedback information. PSDCH may be used by a first wireless device to send discovery information to a second wireless device. The discovery information may be used by a wireless device to signal its presence and/or the availability of services to other wireless devices in the area. PSCCH may be used by a first wireless device to send sidelink control information (SCI) to a second wireless device. PSCCH may be similar in some respects to PDCCH and/or PUCCH. The control information may comprise, for example, time/frequency resource allocation information (RB size, a number of retransmissions, etc.), demodulation related information (DMRS, MCS, RV, etc.), identifying information for a transmitting wireless device and/or a receiving wireless device, a process identifier (HARQ, etc.), or any other suitable control information. The PSCCH may be used to allocate, prioritize, and/or reserve sidelink resources for sidelink transmissions. PSSCH may be used by a first wireless device to send and/or relay data and/or network information to a second wireless device. PSSCH may be similar in some respects to PDSCH and/or PUSCH. Each of the sidelink channels may be associated with one or more demodulation reference signals. Sidelink operations may utilize sidelink synchronization signals to establish a timing of sidelink operations. Wireless devices configured for sidelink operations may send sidelink synchronization signals, for example, with the PSBCH. The sidelink synchronization signals may include primary sidelink synchronization signals (PSSS) and secondary sidelink synchronization signals (SSSS).

Sidelink resources may be configured to a wireless device in any suitable manner. A wireless device may be pre-configured for sidelink, for example, pre-configured with sidelink resource information. Additionally or alternatively, a network may broadcast system information relating to a resource pool for sidelink. Additionally or alternatively, a network may configure a particular wireless device with a dedicated sidelink configuration. The configuration may identify sidelink resources to be used for sidelink operation (e.g., configure a sidelink band combination).

The wireless device may operate in different modes, for example, an assisted mode (which may be referred to as mode 1) or an autonomous mode (which may be referred to as mode 2). Mode selection may be based on a coverage status of the wireless device, a radio resource control status of the wireless device, information and/or instructions from the network, and/or any other suitable factors. For example, if the wireless device is idle or inactive, or if the wireless device is outside of network coverage, the wireless device may select to operate in autonomous mode. For example, if the wireless device is in a connected mode (e.g., connected to a base station), the wireless device may select to operate (or be instructed by the base station to operate) in assisted mode. For example, the network (e.g., a base station) may instruct a connected wireless device to operate in a particular mode.

In an assisted mode, the wireless device may request scheduling from the network. For example, the wireless device may send a scheduling request to the network and the network may allocate sidelink resources to the wireless device. Assisted mode may be referred to as network-assisted mode, gNB-assisted mode, or base station-assisted mode. In an autonomous mode, the wireless device may select sidelink resources based on measurements within one or more resource pools (for example, pre-configure or network-assigned resource pools), sidelink resource selections made by other wireless devices, and/or sidelink resource usage of other wireless devices.

To select sidelink resources, a wireless device may observe a sensing window and a selection window. During the sensing window, the wireless device may observe SCI transmitted by other wireless devices using the sidelink resource pool. The SCIs may identify resources that may be used and/or reserved for sidelink transmissions. Based on the resources identified in the SCIs, the wireless device may select resources within the selection window (for example, resource that are different from the resources identified in the SCIs). The wireless device may transmit using the selected sidelink resources.

Figure 18:
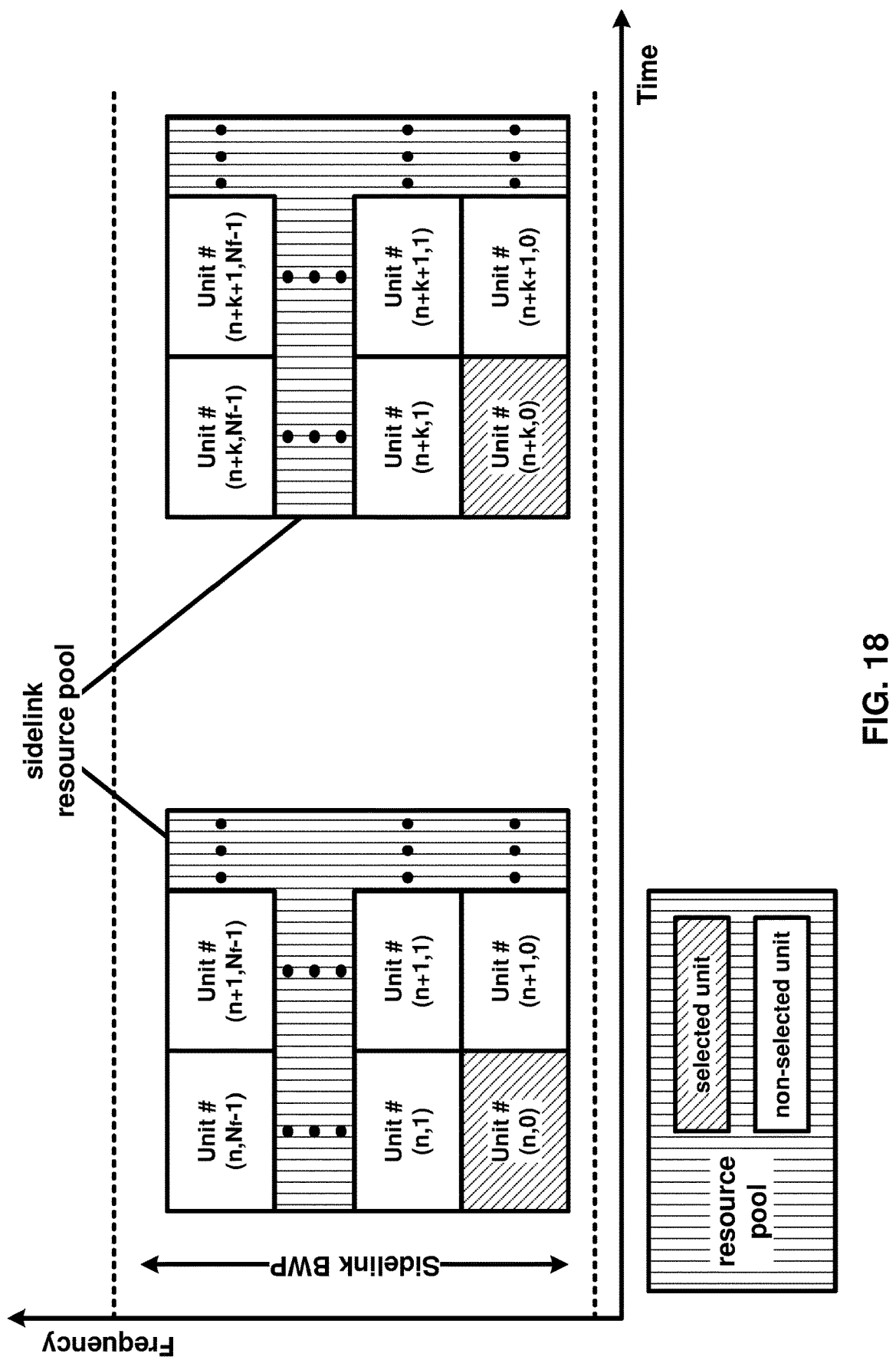
FIG. 18 is a diagram of example of an out-of-coverage sidelink communication as per an aspect of an embodiment of the present disclosure.

FIG. 18 illustrates an example of a resource pool for sidelink operations. A wireless device may operate using one or more sidelink cells. A sidelink cell may include one or more resource pools. Each resource pool may be configured to operate in accordance with a particular mode (for example, assisted or autonomous). The resource pool may be divided into resource units. In the frequency domain, each resource unit may comprise, for example, one or more resource blocks which may be referred to as a sub-channel. In the time domain, each resource unit may comprise, for example, one or more slots, one or more subframes, and/or one or more OFDM symbols. The resource pool may be continuous or non-continuous in the frequency domain and/or the time domain (for example, comprising contiguous resource units or non-contiguous resource units). The resource pool may be divided into repeating resource pool portions. The resource pool may be shared among one or more wireless devices. Each wireless device may attempt to transmit using different resource units, for example, to avoid collisions.

Sidelink resource pools may be arranged in any suitable manner. In the figure, the example resource pool is non-contiguous in the time domain and confined to a single sidelink BWP. In the example resource pool, frequency resources are divided into a Nf resource units per unit of time, numbered from zero to Nf−1. The example resource pool may comprise a plurality of portions (non-contiguous in this example) that repeat every k units of time. In the figure, time resources are numbered as n, n+1 . . . n+k, n+k+1 . . . , etc.

A wireless device may select for transmission one or more resource units from the resource pool. In the example resource pool, the wireless device selects resource unit (n,0) for sidelink transmission. The wireless device may further select periodic resource units in later portions of the resource pool, for example, resource unit (n+k,0), resource unit (n+2k,0), resource unit (n+3k,0), etc. The selection may be based on, for example, a determination that a transmission using resource unit (n,0) will not (or is not likely) to collide with a sidelink transmission of a wireless device that shares the sidelink resource pool. The determination may be based on, for example, behavior of other wireless devices that share the resource pool. For example, if no sidelink transmissions are detected in resource unit (n−k,0), then the wireless device may select resource unit (n,0), resource (n+k,0), etc. For example, if a sidelink transmission from another wireless device is detected in resource unit (n−k,1), then the wireless device may avoid selection of resource unit (n,1), resource (n+k,1), etc.

Different sidelink physical channels may use different resource pools. For example, PSCCH may use a first resource pool and PSSCH may use a second resource pool. Different resource priorities may be associated with different resource pools. For example, data associated with a first QoS, service, priority, and/or other characteristic may use a first resource pool and data associated with a second QoS, service, priority, and/or other characteristic may use a second resource pool. For example, a network (e.g., a base station) may configure a priority level for each resource pool, a service to be supported for each resource pool, etc. For example, a network (e.g., a base station) may configure a first resource pool for use by unicast UEs, a second resource pool for use by groupcast UEs, etc. For example, a network (e.g., a base station) may configure a first resource pool for transmission of sidelink data, a second resource pool for transmission of discovery messages, etc.

In an example, a wireless device may be configured to operate using uplink, downlink, and sidelink on multiple different cells. As a result, the network may maintain a greater quantity of resources and the wireless device may monitor increasing numbers of search spaces (for example, to monitor for downlink control information (DCI)). Maintenance of resources (e.g., one or more RRC parameters, one or more scheduling request configurations, one or more PUCCH resources/PUCCH resource sets, etc.) and monitoring of search spaces may result in significant consumption of radio resources and power. In an example, mechanisms have been introduced with the aim of limiting this consumption (for example, discontinuous reception (DRX), bandwidth part (BWP) switching, radio resource control (RRC) state transition, cell activation-deactivation, etc.). These mechanisms may be used to free up resources for alternative uses and/or reduce power consumption within the network. However, these mechanisms do not sufficiently account for the possibility that a wireless device will perform sidelink operations, independently of non-sidelink operations, while in a base station assisted mode (e.g., mode 1). Accordingly, implementation of these mechanisms may result in reduced resource/power savings and/or degraded sidelink performance.

In an example, new mechanisms may be defined for wireless device operation that permit the wireless device to perform sidelink operations without degraded performance while retaining at least some of the resource/power savings associated with power saving mechanisms. Embodiments may decouple the monitoring of one or more first search spaces from the monitoring of one or more second search spaces. For example, the monitoring of search spaces associated with sidelink may be decoupled from the monitoring of search spaces associated with uplink and/or downlink. A determination to monitor or stop monitoring a particular search space may be based on one or more suitable criteria as will be discussed herein. Embodiments may decouple the maintenance of one or more first resources from the maintenance of one or more second resources. For example, the maintenance of first PUCCH resources associated with sidelink may be decoupled from maintenance of second PUCCH resources associated with uplink and/or downlink. In accordance with the present disclosure, a wireless device in assisted mode can maintain sidelink performance while reducing consumption of resources and power.

These mechanisms may be implemented by modifying the wireless device behavior associated with an legacy RRC state (for example, RRC Connected) and/or by modifying how the wireless device determines an RRC state transition. Additionally or alternatively, a new RRC state may be defined (referred to herein as RRC L-Connected), and the wireless device may be configured to perform these mechanisms when in the RRC L-Connected state and/or when determining an RRC state transition.

In an example, a base station and a wireless device may define a new radio resource control (RRC) state such as RRC L-CONNECTED (e.g., RRC Limited CONNECTED) for one or more criteria being met. The wireless device may perform one or more subset functionalities in the new RRC state (e.g., RRC L-CONNECTED) compared to functionalities of RRC CONNECTED state. The wireless device may be released for downlink and/or uplink from the base station during RRC L-CONNECTED state. The wireless device may be connected to the base station for sidelink operation during RRC L-CONNECTED state. For example, the wireless device may perform reduced monitoring on one or more search spaces of one or more cells on RRC L-CONNECTED state regardless of power saving techniques (e.g., DRX, power saving techniques, wake-up procedure, etc.) compared to RRC CONNECTED state. For example, in RRC L-CONNECTED state, the wireless device may stop monitoring on one or more first search spaces which may not be used for SL DCIs for any sidelink cell among configured search spaces to the wireless device. The wireless device may monitor one or more second search spaces of one or more scheduling cells for SL DCIs of one or more sidelink cell instead of monitoring all search spaces of all active cells. The configured search spaces may comprise the one or more first search spaces and the one or more second search spaces. In RRC_CONNECTED state, the wireless device may monitor both the one or more first search spaces and the one or more second search spaces (unless power saving technique may reduce the monitoring).

For example, the wireless device may not perform CSI feedback, may not maintain timers on RRC CONNECTED states, may not maintain configured grant resources used for transmitting uplink data, may not maintain downlink SPS resources for receiving downlink data, and/or the like. The wireless device may perform essential functionalities which allow continuous and seamless gNB-assisted sidelink operation for the sidelink cell. For example, the wireless device may monitor the one or more second search spaces of the scheduling cell for SL DCIs of the sidelink cell. For example, the wireless device may perform radio resource management (RRM) measurement on the serving cell. For example, the wireless device may maintain one or more SR resources used for sidelink SR transmission. For example, the wireless device may maintain one or more configured grant resources on the sidelink cell configured by the base station. The wireless device may release other RRC configured resources (e.g., SR configurations not used for SL SR transmissions, CSI feedback RS/reporting configurations, deactivating SCell(s) which are not used for scheduling SL DCIs, etc.).

A sidelink cell (or carrier, BWP) may share frequency spectrum (e.g., a frequency band/band combination) with an uplink cell (or carrier, BWP). In existing technologies, a center frequency and/or resource blocks of a sidelink cell (or carrier, BWP) sharing frequency spectrum with an uplink cell (or carrier, BWP) may be based on to a center frequency and/or resource blocks of the uplink cell (or carrier, BWP). A first bandwidth (e.g., a number of resource blocks) of the sidelink cell may be based on second bandwidth of the uplink cell. For example, a wireless device may be configured, by a base station, with a serving cell (uplink or downlink) operating on the frequency band. Frequency band of the sidelink cell/carrier that may be based a center frequency and/or bandwidth of the serving cell (uplink carrier). For example, sidelink transmissions may use the same frequency configuration (e.g. center frequency, resource blocks) of the uplink carrier. For example, the same point A or reference frequency location may be used for sidelink transmissions as uplink or downlink transmission. In an example existing implementation, a wireless device may determine frequency parameters of a sidelink cell (or carrier, BWP) based on preconfigured parameters in the wireless device's hardware implementation. For example, point A and/or reference frequency location may depend on UE hardware implementations. Existing implementation of sidelink frequency configurations are not flexible to accommodate increasing traffic transmitted by a sidelink. In an example, sidelink traffic may be substantially higher than uplink/downlink traffic. Implementation of existing technologies may lead inefficiency in terms of handling flexible traffic requirements for sidelink traffic for various applications, such as V2X, multimedia V2V communications, mission critical services, and/or the like.

In existing technologies, based on a predetermined/limited center frequency, a wireless device may determine resource blocks of a sidelink cell (or carrier, BWP) that are based on resource blocks of an uplink cell (or carrier, BWP) sharing frequency spectrum to the sidelink cell. The wireless device may support a bandwidth for the sidelink cell (or carrier, BWP) based on the uplink cell (or carrier, BWP). For example, even if the wireless device may not need a large bandwidth for an uplink operation (e.g., due to low uplink traffic volume), the wireless device may maintain a large bandwidth for the uplink cell/carrier when the wireless device operates sidelink via the sidelink cell (or carrier, BWP). This may increase power consumption of the wireless device and may increase complexity of the wireless device.

In an example, a wireless device may receive from a base station a first reference frequency location for a starting RB of uplink transmissions and a second reference frequency location for a starting RB of sidelink transmissions. A base station may transmit configuration parameters comprising a first point A for uplink cell (or carrier, BWP) and a second point A for sidelink cell (or carrier, BWP). In an example, the first point A may indicate a first reference frequency location where first physical resource block (PRB) for a first resource grid mapping starts for uplink transmissions. In an example, the second point A may indicate a second reference frequency location where first physical resource block (PRB) for a second resource grid mapping starts for sidelink transmissions.

Embodiments may enable a flexible sidelink cell/carrier configuration regardless whether the sidelink cell/carrier share frequency spectrum with an uplink cell/carrier. For example, embodiments may enable a base station to configure two reference frequency locations (for uplink and sidelink) for a small bandwidth uplink cell (or carrier, BWP) in a frequency band/band combination while maintaining a large bandwidth sidelink cell (or carrier, BWP) in the frequency band/band combination. By configuring two reference frequency locations, example embodiments support a center frequency of a sidelink operation being different from a center frequency of an uplink operation in shared frequency spectrum. This may enable a base station to determine a center frequency of an uplink carrier/cell in the shared frequency spectrum, without being restricted to a predetermined center frequency or limited candidates. For example, embodiments may enable that a base station may configure, to a wireless device, two uplink cells/carriers in a frequency band via an uplink carrier aggregation. The wireless device may support a sidelink BWP of a sidelink cell/carrier that may overlap with both of the two uplink cells/carriers in frequency domain.

In example embodiments, a wireless device may generate a first DM-RS for the uplink transmission to a base station using the first point A. The wireless device may communicate with a second wireless device based on the second resource grid mapping. For example, the wireless device may generate a second DM-RS for the second wireless device using the second point A. Embodiments may enable efficient multi-user multiplexing based on a DM-RS generation/transmission based on a reference frequency location. For example, a base station may configure an uplink BWP and a sidelink BWP to a wireless device, where the uplink BWP may partially overlap with the sidelink BWP. A DM-RS sequence generated based on the uplink BWP (e.g., sequence is generated locally within the uplink BWP) may not provide efficient correlation to a second DM-RS sequence generated based on the sidelink BWP. Embodiments may enable the base station to indicate a first point A used for resource blocks for the uplink BWP being same as a second point A used for resource blocks for the sidelink BWP. The wireless device may determine the DM-RS sequence based on the first point A. The wireless device may determine the second DM-RS sequence based on the second point A. Embodiments may enhance correlation properties between the DM-RS sequence and the second DM-RS sequence as if the wireless device may use common resource blocks between sidelink and uplink transmissions. Embodiments may enable the base station to indicate a first point A used for resource blocks for the uplink BWP being different from a second point A used for resource blocks for the sidelink BWP, for example, when multiplexing between uplink signals and sidelink signal may not occur significantly.

For example, the wireless device may determine one or more resource blocks for uplink transmissions based on the first resource grid mapping. The sidelink frequency configuration parameters may comprise a second point A. In an example, the second point A may indicate a second reference frequency location where first physical resource block (PRB) for a second resource grid mapping starts for sidelink transmissions. For example, the wireless device may determine one or more resource blocks for sidelink transmissions based on the second resource grid mapping. The wireless device may communicate with a base station based on the first resource grid mapping. Embodiments may enable a case where a first wireless device uses a first numerology for a sidelink operation via a sidelink cell/carrier/BWP and a second wireless device uses a second numerology for an uplink operation via an uplink cell/carrier/BWP in shared frequency spectrum. For example, a first point A for the uplink cell/carrier/BWP may be determined based on the second numerology. A second point A for the sidelink cell/carrier/BWP may be determined based on the first numerology. The first point A may be different from the second point A in response to the first numerology being different from the second numerology. Based on the first point A, the first wireless device may determine resource blocks/a first resource grid. Based on the second point A, the second wireless device may determine resource blocks/a second resource grid. This may enable different numerologies are multiplexed in a shared spectrum among different wireless devices.

In an example, a wireless device may be configured (e.g., via RRC signaling, a pre-configured in the wireless device hardware implementation) with one or more first parameters for a sidelink cell on a frequency band/band combination. For example, the sidelink cell may be configured to one or more licensed spectrum band/band combinations uplink frequency. The wireless device may be configured with one or more second parameters for an uplink cell on the frequency band/band combination. One or more uplink component carriers (CCs) may be optionally configured for a serving cell. A base station may activate the uplink cell/carrier only without activating the sidelink cell/carrier. The base station may activate only the sidelink cell/carrier without activating the uplink cell/carrier (or without configuration of the uplink cell/carrier). The base station may activate both the sidelink and the uplink cells/carriers on the frequency band/band combinations. The base station may transmit one or more RRC messages comprising configuration parameters. The configuration parameters may comprise/indicate one or more first configured grants for the sidelink cell, which may be activated/deactivated via SL DCIs from a scheduling cell for a mode 1 operation. The configuration parameters may comprise/indicate one or more second configured grants for the uplink cell, which may be activated/deactivated via DCIs from a cell (e.g., a corresponding downlink cell for a self-carrier scheduling). In an example, a second point A (e.g., a second reference frequency location where a PRB 0 for a resource grid mapping may start for the sidelink carrier/cell) may be configured independently (e.g., via RRC signaling) for the sidelink cell/carrier from a first point A (e.g., a first reference frequency location where a PRB 0 for a resource grid mapping may start for the uplink cell/carrier) configured to the uplink cell/carrier (if configured).

In an example, the wireless device may determine the resource grid for the sidelink cell/carrier based on the second point A. For example, a frequency location of the PRB 0 or RB 0 (e.g., an index=0 RB/PRB) of the sidelink cell/carrier may be the second point A or the reference frequency location. For example, the sidelink cell may be shared among first wireless devices connected to the base station and second wireless devices which are not connected/associated to the base station. A first point A (or a reference absolute radio-frequency channel number (ARFCN) value of a sidelink cell or a reference frequency location) for the sidelink cell may be different from a second point A of the uplink cell of the base station. When there is no point A configuration is available for the sidelink cell, the wireless device may use a point A configuration of the uplink cell.

In an example, a wireless device may be configured with a SL BWP on the sidelink cell where a PRB mapping for the SL BWP may be based on the first point A of the sidelink cell. The wireless device may be configured with one or more uplink BWPs on the uplink cell where a PRB mapping for the one or more UL BWPs may be based on the second point of the uplink cell. For example, the configuration parameters may comprise/indicate a second locationAndBandwidth of a sidelink BWP of the sidelink cell/carrier, wherein the wireless device may determine a first RB of the sidelink BWP based on the second locationAndBandwidth and the second point A (or the second reference frequency location). The configuration parameters may comprise/indicate a first locationAndBandwidth of an uplink BWP of the uplink cell/carrier, wherein the wireless device may determine a first RB of the uplink BWP based on the first locationAndBandwidth and the first point A (or the second reference frequency location).

In DM-RS mapping/sequence generation for the sidelink cell, the first point A may be used. In DM-RS mapping/sequence generation for the uplink cell, the second point A may be used. One or more subchannels for the sidelink BWP may be done locally within the sidelink BWP. A sidelink DCI may schedule one or more sidelink subchannels or sidelink resources based on a PRB indexing/subchannel indexing or based on the resource grid mapping within the SL BWP of the sidelink cell.

FIG. 19 illustrates a diagram of example of a first resource block grid for sidelink and a second resource block grid for uplink as per an aspect of an embodiment of the present disclosure. For example, a sidelink cell/carrier/BWP may share a frequency region with an uplink cell/carrier/BWP. For example, the frequency region may be a frequency band or a frequency band combination. For example, the frequency region may be a subset of a frequency band or a frequency band combination. The sidelink BWP may be configured within the sidelink cell/carrier. For example, a first reference frequency location (e.g., a first point A in FIG. 19) of the sidelink carrier/cell/BWP may be equal or smaller than or equal to a lowest frequency of the sidelink carrier/cell/BWP. In the specification, a cell may be interchangeably used with a carrier. For example, the first point A may be lower than or equal to the lowest frequency of the sidelink carrier/cell/BWP. The sidelink BWP may comprise one or more resource units (e.g., sub-channels, subchannels, one or more resource blocks, one or more RB groups, a plurality of RBs, a plurality of RBGs).

Based on the first reference frequency location (e.g., the first point A), the wireless device may determine a first resource grid for the sidelink transmission or for the sidelink cell/carrier/BWP. For example, first RB or a lowest RB of the first resource grid may start from the first point A. For example, an index of the first RB or the lowest RB may be zero. The wireless device may determine a plurality of first RBs starting from the first RB or the lowest RB based on the first point A. The wireless device may determine the first resource grid for the sidelink transmission based on a numerology for the sidelink transmission/carrier/cell/BWP. A base station may transmit one or more RRC messages comprising the first point A for the sidelink transmission/carrier/cell/BWP. The one or more RRC messages may further comprise a second point A for uplink transmission or an uplink cell/carrier/BWP.

A set of RBs may be represented as a resource grid. The first resource grid may comprise the plurality of first RBs. The one or more RRC messages may indicate/comprise an offset and a bandwidth for the sidelink BWP. For example, the offset may represent a number of RBs between the first point A and first RB of the sidelink BWP. For example, the offset may be 10 RBs, where the sidelink BWP may start at 10-th RB based on the first point A. For example, the plurality of RBs may be called as common RBs. For example, one or more RBs of the sidelink BWP may be called as RBs within the sidelink BWPs. An index of a RB of the RBs within the sidelink BWP may start from the first RB of the sidelink BWP. An index of a common RB of the common RBs corresponding to the first RB of the sidelink BWP may be the offset (e.g., The bandwidth may determine a number of RBs for the sidelink BWP. Based on the bandwidth, the wireless device may determine a largest index of a RB in the sidelink BWP. The wireless device may determine the first resource grid comprising the common RBs based on the first point A and the numerology of the sidelink cell/carrier/BWP. The common RBs may be called as physical RBs (PRBs). The common RBs may be called as RBs. For example, a frequency location shown in FIG. 19 (e.g., RB 0 for sidelink) may be the first reference frequency location or the first point A. For example, FIG. 19 illustrates that a lowest RB (Lowest RB) of the sidelink BWP within the common RBs and a highest RB (Highest RB) of the sidelink BWP within the common RBs.

The wireless device may determine a second resource grid for the uplink cell/carrier/BWP/transmission based on the second point A. For example, the first point A may be different form the second point A. For example, the first point A may be configured to be same as the second point A. For example, a frequency location shown in FIG. 19 (e.g., RB 0 for uplink) may be a second reference frequency location or the second point A. The wireless device may determine the second resource grid for the uplink similarly to the first resource grid for the sidelink, wherein the second resource grid may comprise second common RBs starting from the second point A. The wireless device may determine the second resource grid based on the second point A and a numerology for the uplink carrier/cell. The one or more RRC messages may comprise a second offset and a second BWP for an uplink BWP of the uplink carrier/cell. The wireless device may be configured with one or more uplink BWPs of the uplink carrier/cell/BWP. The second offset may represent a RB offset between the second point A and first RB of the uplink BWP. The second bandwidth may represent a number of RBs of the uplink BWP. An index of first RB of the uplink BWP, in terms of second common RBs may be same as the second offset. An index of highest RB (e.g., Highest RB) of the uplink BWP may be same as a sum of the second offset and the second bandwidth. For example, FIG. 19 illustrates that a lowest RB (Lowest RB) of the uplink BWP within the second common RBs and a highest RB (Highest RB) of the uplink BWP within the second common RBs.

Figure 20:
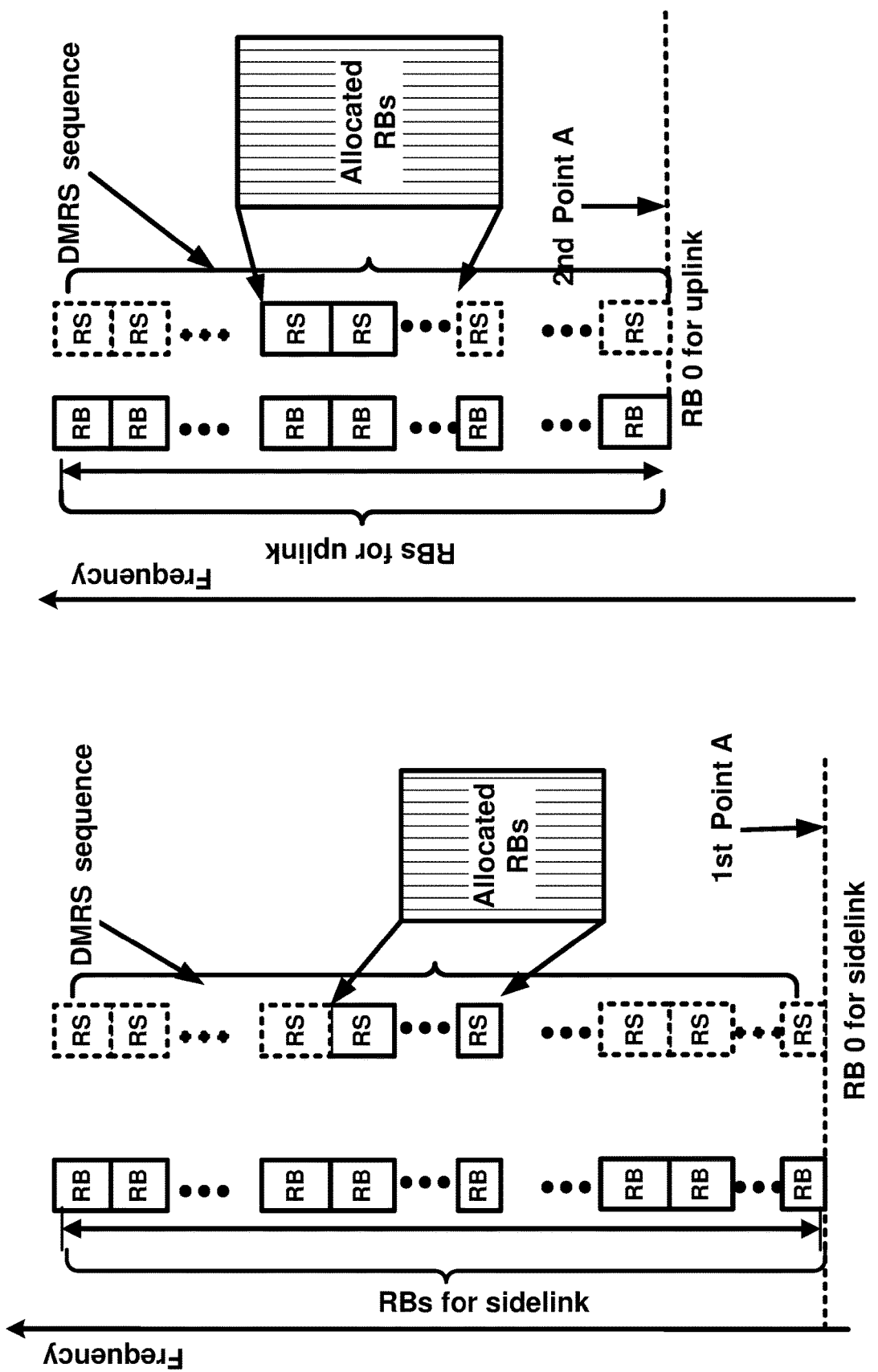
FIG. 20 is a diagram of example of demodulation reference signals as per an aspect of an embodiment of the present disclosure.

FIG. 20 illustrates a diagram of example of demodulation reference signals (DMRS) as per an aspect of an embodiment of the present disclosure. For example, a wireless device may generate a sequence for a first DMRS used for a sidelink transmission (e.g., a PSSCH, a PSCCH, a PSFCH), where a length of the sequence may be larger than a number of resource elements in the first resource grid. For example, the length may be larger than 3300. The wireless device may map the sequence of the first DMRS within one or more RBs. For example, the wireless device may determine the one or more RBs based on resource assignment via a sidelink DCI. For example, the wireless device may determine the one or more RBs based on a resource determination. The wireless device may map the sidelink transmission via the one or more RBs. For example, a k-th bit of the sequence may map to k-th resource element of the first resource grid. For example, an index of a RB of the one or more RBs, within the first resource grid or based on the common RBs, may be M. First resource element of the RB may be mapped with k-th (k=M*12) bit of the sequence. Based on an index of a RB within the first resource grid or common RBs, mapping of the sequence may be determined. For example, a portion of the sequence shown in solid lined boxes in FIG. 20 left diagram will be mapped to the allocated RBs (e.g. the one or more RBs).

FIG. 20 shows an example of a second sequence for a second DMRS used for an uplink transmission (e.g., a PUCCH, a PUSCH, a SRS). Similarly, the wireless device may determine the second sequence covering all resource elements (REs) of the second resource grid/second common RBs of the uplink. The wireless device may map a portion of the second sequence over allocated RBs (Allocated RBs). The wireless device may determine the allocated RBs based on a DCI scheduling uplink grant, or based on RRC configurations (e.g., PUCCH resource).

In an example, a wireless device may be configured to operate using uplink, downlink, and sidelink on multiple different cells. As a result, the network may maintain a greater quantity of resources and the wireless device may monitor increasing numbers of search spaces (for example, to monitor for downlink control information (DCI)). Maintenance of resources (e.g., one or more RRC parameters, one or more scheduling request configurations, one or more PUCCH resources/PUCCH resource sets, etc.) and monitoring of search spaces may result in significant consumption of radio resources and power. In existing technologies, mechanisms have been introduced with the aim of limiting this consumption (for example, discontinuous reception (DRX), bandwidth part (BWP) switching, radio resource control (RRC) state transition, cell activation-deactivation, and/or the like.). These mechanisms may be used to free up processing resources for monitoring control channels and reduce power consumption within the network. For example, a wireless device may stop monitoring one or more search spaces and stop receiving resource grants (e.g. uplink, downlink, and sidelink). A base station may not be aware of sidelink traffic types and their priorities. These power saving mechanisms do not sufficiently account for the possibility that a wireless device may perform sidelink operations, independently of non-sidelink operations (uplink/downlink), for example, while the wireless device is in a base station assisted mode (e.g., mode 1). For example, a base station may not configure a power saving technique to a wireless device while the wireless device operates in a sidelink operation e.g., based on a mode 1 sidelink operation. Accordingly, implementation of existing mechanisms may result in reduced resource/power savings and/or degraded sidelink performance.

In an example, a base station may transmit one or more RRC messages comprising configuration parameters for a cell. The configuration parameters may comprise/indicate one or more first search spaces for monitoring DCIs that assign resources for downlink or uplink data. The configuration parameters may comprise/indicate one or more second search spaces for monitoring sidelink DCIs that assign resources for sidelink data of one or more sidelink cells. For example, the cell is in a normal state (e.g., non-power saving state). The wireless device may monitor the one or more first search spaces for DCIs when the cell is in the normal state. The wireless device may monitor the one or more second search spaces for sidelink DCIs via the cell. The wireless device may transition to a power saving state of the cell. In response to the transitioning to the power saving state, the wireless device may stop monitoring the one or more first search spaces. In the power saving state of the cell, the wireless device may continue monitoring the one or more second search spaces assigning resources for the one or more sidelink cells. In the power saving state of the cell, the wireless device may switch to a mode 2 sidelink operation and may stop monitoring the one or more second search spaces. The wireless device may determine sidelink resources for one or more sidelink transmission based on the mode 2 sidelink operation, for example, without receiving sidelink DCIs indicating sidelink resources. Embodiments may enable a wireless device to perform a mode 1 sidelink operation while reducing power consumption of the wireless device. Embodiments may enable a wireless device to continue a sidelink operation while reducing power consumption of the wireless device by switching to the mode 2 sidelink operation in a power saving state of a scheduling cell. For example, embodiments may allow reducing monitoring of DCIs for downlink or uplink data while maintaining monitoring sidelink DCIs for sidelink data when the cell is in a power saving state. Example embodiment provides different configuration parameters and power saving processes for sidelink control channel monitoring compared with uplink/downlink control channel monitoring.

In an example, the wireless device may stop monitoring the one or more second search spaces when the wireless device does not have any sidelink data. The wireless device may transmit the sidelink SR based on new sidelink data being available. For example, the wireless device may start monitoring the one or more second search spaces in response to transmitting a sidelink scheduling request (SR). Example embodiments of monitoring sidelink search spaces may enable reduced power consumption and increase quality of service of a sidelink operation.

In an example, a base station may deactivate, based on an explicit command or based on a timer, a scheduling cell of a mode 1 sidelink operation for a sidelink cell. When the scheduling cell is deactivated, a wireless device may transition to a mode 2 sidelink operation for the sidelink cell. The wireless device may determine sidelink resources, without relying on sidelink DCIs, via the mode 2 sidelink operation. By transitioning to the mode 2 sidelink operation when the scheduling cell is deactivated, the wireless device may continue sidelink operation without interruption regardless of a status of the scheduling cell. Example embodiments may enable power saving and increase quality of service of the sidelink operation.

Figure 21:
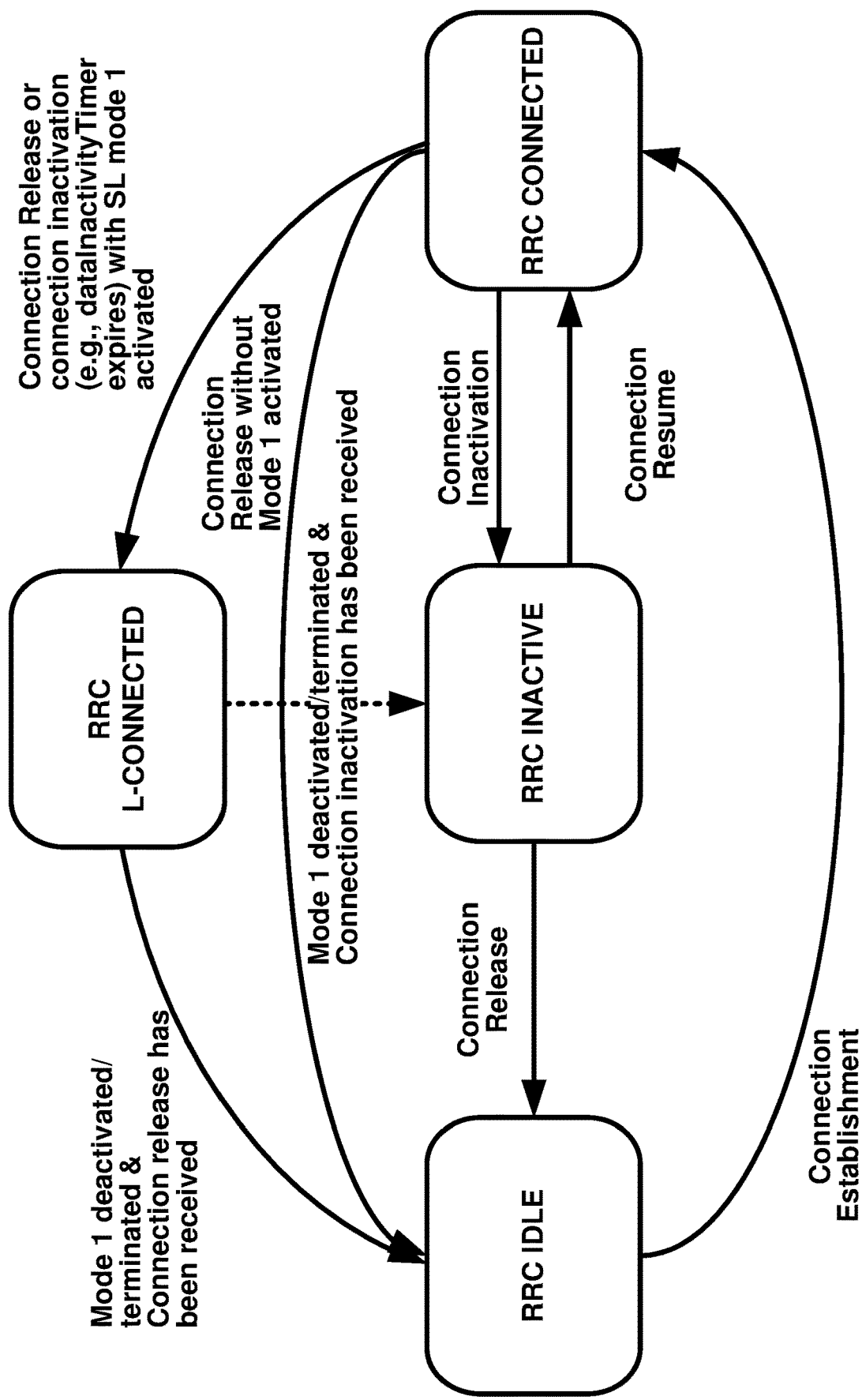
FIG. 21 illustrates an example of RRC state transition as per an aspect of an embodiment of the present disclosure.

FIG. 21 illustrates an example of RRC state transition as per an aspect of an embodiment of the present disclosure. Similar to FIG. 6, a wireless device may have RRC CONNECTED, RRC INACTIVE and RRC IDLE states. In an example, the wireless device may have a new RRC state of RRC L-CONNECTED. In response to receiving a connection release message, the wireless device may switch to the RRC IDLE state. In an embodiment, the wireless device may switch to the RRC L-CONNECTED in response to the receiving connection release message or an expiry of dataInactivityTimer, when the wireless device is operating a gNB-assisted sidelink operation (e.g., a mode 1 sidelink operation) for at least one sidelink cell. This may prevent the wireless device from experiencing performance degradation of the sidelink operation as the wireless device may not receive one or more sidelink DCIs from the base station on the RRC IDLE state. When the gNB-assisted sidelink operation (e.g., a mode 1 sidelink operation) is completed or deactivated or the gNB-assisted sidelink operation is not configured, the wireless device may switch to the RRC IDLE from the RRC-CONNECTED or the RRC L-CONNECTED when the wireless device has received the connection release message. The wireless device may switch to the RRC INACTIVE state when the wireless device may have received a RRC connection inactivation command instead of the RRC connection release message. For example, RRC L-CONNECTED state is a transient RRC state wherein a wireless device maintains RRC connectivity with a minimum set of functionalities required for operating a gNB-assisted sidelink operation for one or more sidelink cells. After the sidelink operation based on the gNB-assistance is completed or deactivated, the wireless device may switch to one of legacy RRC states which were supposed to be transitioned assuming the gNB-assisted sidelink operation is not configured. Between legacy RRC states, transitions are similar as shown in FIG. 6.

By supporting reduced functionalities while in RRC L-CONNECTED state, the wireless device may enjoy benefits of power consumption reduction when downlink and/or uplink operation become idle without stopping the gNB-assisted (e.g., mode 1) sidelink operation. With the new RRC state, the wireless device may be able to continuously receive one or more sidelink DCIs comprising one or more resource allocations for sidelink transmission(s) on the sidelink cell. A similar mechanism may be also applied to a case when a SCell is configured as a scheduling cell for a gNB-assisted sidelink operation for a sidelink cell/carrier/BWP. A new cell state (e.g., a dormant SCell, a SL active SCell, SL only active SCell, etc.) may be defined where a wireless device may perform reduced functionalities compared to an active SCell state (e.g., reduced PDCCH monitoring, no or limited CSI feedback, etc.). Embodiments may allow a power efficient sidelink operation based on the gNB assistance (e.g., a mode 1 sidelink operation).

By supporting reduced functionalities on a new RRC state (e.g., a RRC L-CONNECTED, a RRC SL ACTIVE, etc.) compared to a RRC CONNECTED state, the wireless device may enjoy benefits of power consumption reduction when downlink and/or uplink operation become idle without stopping the gNB-assisted (e.g., mode 1) sidelink operation. With the new RRC state, the wireless device may be able to continuously receive one or more sidelink DCIs comprising one or more resource allocations for sidelink transmission(s) on the sidelink cell. A similar mechanism may be also applied to a case when a SCell is configured as a scheduling cell for a gNB-assisted sidelink operation. A new cell state (e.g., a dormant SCell, a SL active SCell, etc.) may be defined where a wireless device may perform reduced functionalities compared to an active SCell state (e.g., reduced PDCCH monitoring, no or limited CSI feedback, etc.). Embodiments may allow a power efficient sidelink operation based on the gNB assistance (e.g., mode 1 sidelink operation).

In an example, a wireless device may adapt monitoring, for downlink control information, of one or more search spaces when one or more criteria are being met. For example, a base station may transmit one or more RRC messages comprising configuration parameters. The configuration parameters may comprise/indicate one or more first search spaces over one or more first cells. The configuration parameters may comprise/indicate one or more second search spaces over one or more second cells. The wireless device may monitor the one or more first search spaces to receive DCIs comprising resource assignments for downlink and/or uplink for one or more third cells. The wireless device may monitor the one or more second search spaces to receive sidelink DCIs comprising resource assignments for sidelink operation for one or more sidelink cells. In response to the one or more criteria are being met, the wireless device may stop monitoring for one or more first search spaces. In response to the one or more criteria are being met, the wireless device may continue monitoring for the one or more second search spaces, when the wireless device may continue the sidelink operation based on a gNB assistance for the one or more sidelink cell. The wireless device may skip monitoring for the one or more second search spaces, when the wireless device may not have transmitted any sidelink scheduling request (SL SR). The base station may transmit one or more SL DCIs in response to receiving a SL SR. Based on the transmitting the SL SR, the wireless device may resume monitoring on the one or more second search spaces when the one or more criteria are being met.

For example, the one or more criteria may include a case when the wireless device may receive a radio resource control (RRC) connection release message from the base station. For example, the one or more criteria may include a case when the wireless device may switch to a DRX OFF state for the one or more second cells of a cell group. For example, the one or more criteria may include a case the wireless device may receive one or more commands via MAC CEs and/or DCIs to switch to a power saving state of the one or more first cells and/or the one or more second cells. For example, the one or more criteria may include a case the wireless device may receive one or more commands to deactivate the one or more first cells and/or the one or more second cells. In an example, a wireless device may perform one or more functionalities similar to RRC L-CONNECTED state in response to the one more criteria being met while keeping RRC CONNECTED state.

Embodiments may allow efficient coexistence between gNB-assisted sidelink operation over one or more sidelink cells and downlink/uplink operation over one or more cells. Embodiments may allow power efficient operation by reducing power consumption of the wireless device for one or more first search spaces by stop monitoring the one or more first search spaces, wherein the one or more first search spaces may not transmit a sidelink DCI. By continue monitoring one or more second search spaces, wherein the one or more second search spaces may transmit one or more sidelink DCIs for the one or more sidelink cells. With reduced power consumption, the wireless device may be able to continue the gNB-assisted sidelink operation while deactivating/turning off downlink and/or uplink operation.

Although FIG. 21 shows a new RRC state, RRC L-CONNECTED, it will be understood that the wireless device behavior described above may be implemented within the framework of FIG. 6. For example, the wireless device behavior described above may be performed while in the RRC CONNECTED state and the conditions for behaving in the manner described may be similar to the conditions for RRC state transition to the RRC L-CONNECTED state. Accordingly, any behavior described in the present disclosure as being performed in the context of FIG. 21 may also be performed in the context of FIG. 6. In the present disclosure, when wireless device behavior is described within the particular context of an RRC state or state transition, it should be understood as an example provided for illustrative purposes and should not be understood as limiting the behavior to the context described.

In an example, a wireless device and a base station may define a new RRC state of RRC L-CONNECTED to identify one or more functionalities required for supporting a mode 1 sidelink operation while deactivating downlink and/or uplink operations to reduce a power consumption. In an example, the new RRC state may be triggered by a wireless device in RRC IDLE state to request a mode 1 operation without initiating a full RRC connection procedure (e.g., a normal RRC connection procedure). For example, the base station may transmit one or more RRC messages comprising configuration parameters. The configuration parameters may comprise/indicate one or more first PRACH resources in addition to one or more second PRACH resources. The wireless device may use the one or more first PRACH resources for a regular RRC connection request. The wireless device may use one or more second PRACH resources for a connection to RRC L-CONNECTED state for a sidelink operation only without engaging full downlink and/or uplink operation.

The one or more functionalities during the RRC L-CONNECTED state may comprise: (a) monitoring on one or more second search spaces which are configured to transmit SL DCIs for one or more sidelink cell based on transmission of a sidelink SR (e.g., start monitoring in response to transmission of the sidelink SR); (b) no or reduced CSI feedback (e.g., one or more CSI-RS configurations and/or CSI reporting configurations are associated with RRC L-CONNECTED state); (c) maintaining one or more scheduling request configurations configured for sidelink SR transmissions (e.g., releasing other SR configurations); (d) maintaining one or more PUCCH resources configured for sending sidelink HARQ-ACK feedback if sidelink HARQ-ACK feedback is enabled (e.g., releasing other PUCCH resources); (e) continuing RRM measurements on the serving cells; (f) maintaining one or more first scheduling SCells active for SL DCIs (e.g., one or more cells where the one or more second search spaces are configured) and deactivating other SCells; (g) keeping PCell or SPCell active; and/or (h) continuing RLM measurements.

In an example, the one or more functionalities of RRC L-CONNECTED state may be applied to a case where a cell may switch to a dormant state or a base station or a wireless device may switch to a dormant BWP in response to the one or more criteria being met.

In an example, a wireless device may be configured with a SCell for a scheduling cell for SL DCIs for one or more sidelink cells. A base station may switch a scheduling cell from the SCell to PCell before requesting a RRC connection release request. The wireless device may not expect to receive the RRC connection release request from the base station while a mode 1 operation is configured via one or more active SCells without comprising PCell for one or more sidelink cells. The wireless device may expect that PCell is configured as a scheduling cell for the mode 1 operation before receiving the RRC connection release request if the mode 1 operation is active. This is to ensure that a reliability to the wireless device for supporting the mode 1 operation is maintained during the RRC L-CONNECTED state. When a link fails on one or more scheduling SCells, without active scheduling PCell, the base station may have limited flexibility to adjust the sidelink operation according to the situation. In the RRC L-CONNECTED state, the wireless device may receive SL DCIs at least PCell or SPCell.

The RRC state transition diagram is shown in FIG. 21. In response to transitioning to a RRC L-CONNECTED state, a wireless device may release one or more timers configured RRC CONNECTED states which are used for downlink and/or uplink operation (e.g., DRX configuration, BWP switching timer, etc.). The wireless device may release one or more configured grant resources used for transmitting uplink data. The wireless device may release downlink SPS resources for receiving downlink data, and/or the like. The wireless device may perform essential functionalities which allow continuous and seamless gNB-assisted sidelink operation for the sidelink cell. For example, the wireless device may monitor the one or more second search spaces of the scheduling cell for SL DCIs of the sidelink cell. For example, the wireless device may perform radio resource management (RRM) measurement on the serving cell.

For example, the wireless device may maintain one or more SR resources used for sidelink SR transmission. For example, the wireless device may maintain one or more configured grant resources on the sidelink cell configured by the base station. The wireless device may release other RRC configured resources (e.g., SR configurations not used for SL SR transmissions, CSI feedback RS/reporting configurations, deactivating SCell(s) which are not used/configured for scheduling SL DCIs, etc.). The wireless device may release any configuration of a SCell which is deactivated.

Figure 22:
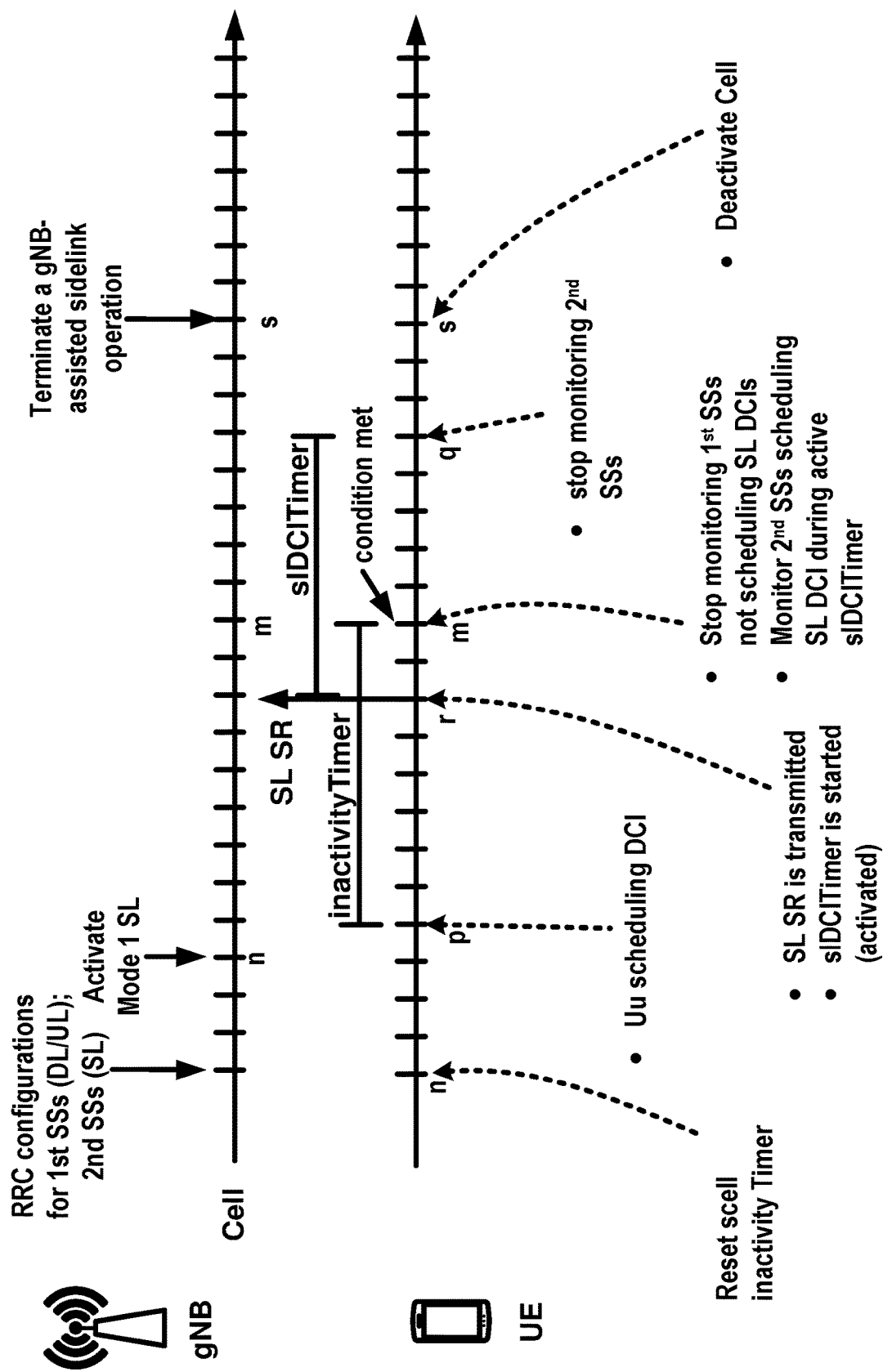
FIG. 22 illustrates an example signal flow diagram as per an aspect of an example embodiment of the present disclosure.

FIG. 22 illustrates an example signal flow diagram as per an aspect of an example embodiment of the present disclosure. A base station may transmit one or more RRC messages comprising configuration parameters. The configuration parameters may comprise/indicate a first cell (Cell) to a wireless device, wherein the wireless device may be a sidelink transmitter device. The configuration parameters may indicate/comprise a gNB-assistance operation (e.g., a mode 1 sidelink operation) for the wireless device for one or more sidelink cells. The configuration parameters may indicate/comprise one or more first search spaces and one or more second search spaces to the wireless device. The one or more first search spaces may be a superset of the one or more second search spaces. The one or more first search spaces and the one or more second search spaces may be partially overlapped or may not be overlapped. The wireless device may monitor the one or more first search spaces to receive DCIs comprising at least resource assignments for downlink and/or uplink for the Cell. For example, the wireless device may monitor the one or more first search spaces to receive DCIs comprising slot format indicator, puncturing indication, transmission power control and/or the like. The wireless device may monitor the one or more second search spaces to receive at least sidelink DCIs comprising resource assignments for sidelink operation for the one or more sidelink cells. For example, the wireless device may monitor the one or more second search spaces to receive DCIs for one or more same purposes same as to the one or more search spaces (e.g., resource assignments, slot formation indicator (SFI), preemption indicator (PI), etc.).

At a time n, the base station may activate the gNB-assistance information. For example, the activation may be done via MAC CEs and/or DCIs. For example, the activation may be done via configuring the gNB-assistance information such as configuration of the one or more second search spaces. For example, the activation may be done via configuring one or more RRC parameters for the one or more sidelink cells (such as configuration of one or more resource pools). At a time p, the wireless device may receive a DCI scheduling uplink data (e.g., UL grant). The wireless device may reset a data inactivity timer (e.g., dataInactivityTimer). At a time r, the wireless device may transmit a sidelink SR (SL SR) for requesting one or more sidelink DCIs for resource allocations on the one or more sidelink cells. In response to transmitting the SL SR, the wireless device may continue or restart monitoring on the one or more second search spaces. The base station may additionally configure a timer to monitor activity for a sidelink operation.

For example, the wireless device may configure slDCI-Timer which may be started in response to transmitting an SL SR and may be reset whenever the wireless device receives a SL DCI at least for a new sidelink transmission. In response to expiry of the slDCITimer, the wireless device may assume that the sidelink operation is not active, and the wireless device may deactivate autonomously the gNB-assistance information on the one or more sidelink cells. At a time m, the data inactivity timer may expire as there is no ongoing downlink and/or uplink on the Cell, which may be a condition of one or more criteria that the wireless device may determine search spaces to monitor. For example, when the data inactivity timer expires, the wireless device may assume downlink and/or uplink are not active anymore. The wireless device may stop monitoring the one or more first search spaces which may not schedule a SL DCI. The wireless device may continue monitoring the one or more second search spaces for the active sidelink operation for the one or more sidelink cells. In response to the expiry of the slDCITimer (if configured), the wireless device may stop monitoring on the one or more second search spaces.

Figure 23:
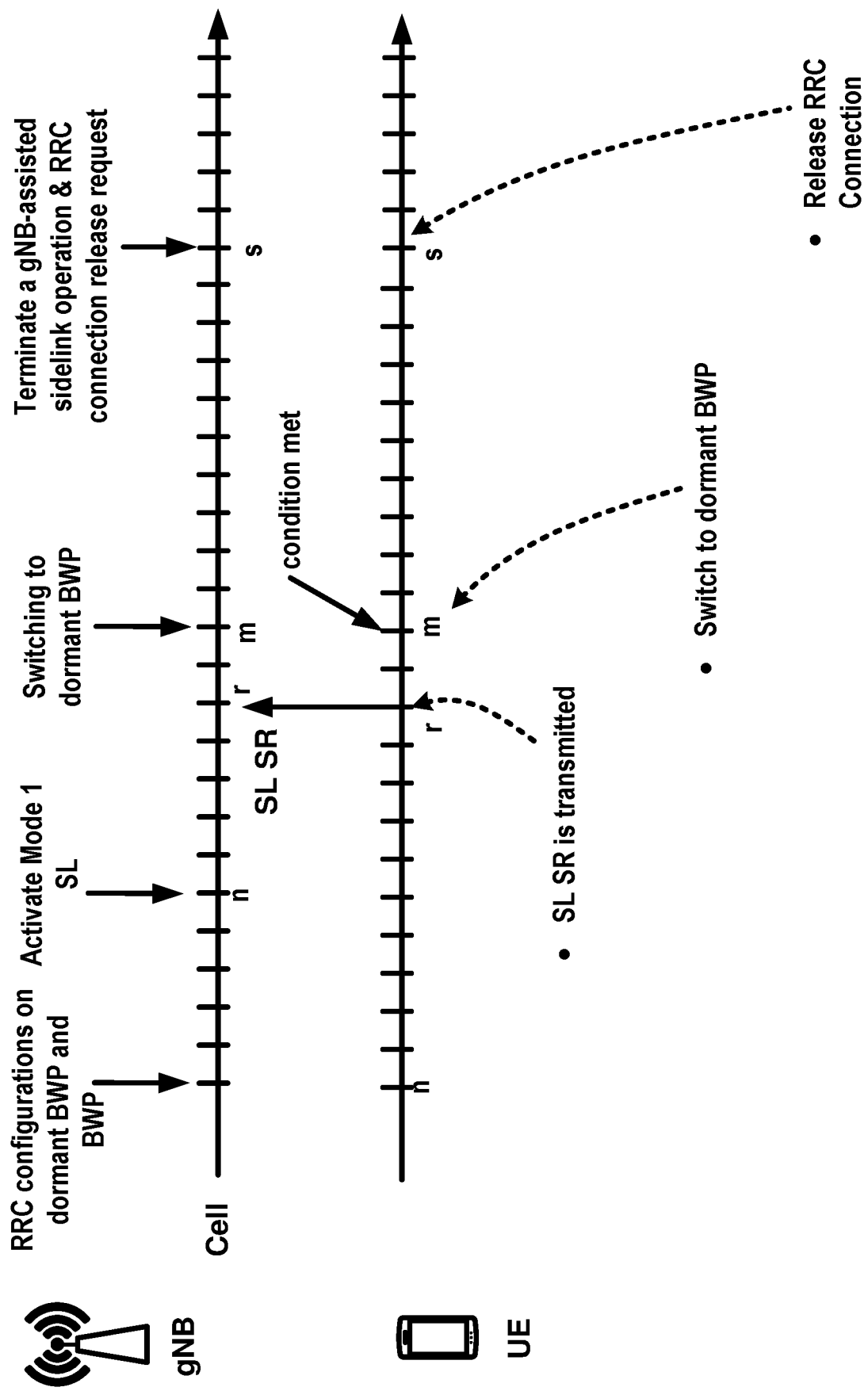
FIG. 23 illustrates an example signal flow diagram as per an aspect of an example embodiment of the present disclosure.

In an example, the base station may transmit a command via MAC CE(s) and/or DCI(s) to switch a sidelink operation for a sidelink cell (or one or more sidelink cells) from a gNB-assistance operation mode to a UE-autonomous operation mode. FIG. 23 illustrates an example signal flow diagram as per an aspect of an example embodiment of the present disclosure. For example, as shown in FIG. 23, the base station may indicate to terminate the gNB-assisted sidelink operation at a time s. In response to receiving the indication, the wireless device may switch the operation mode of the one or more sidelink to the UE-autonomous operation mode (e.g., a mode 2 sidelink operation). As there is no search space to monitor for SL DCIs on the Cell, the wireless device may deactivate the cell (e.g., going to RRC_IDLE in case Cell is PCell, deactivation in case Cell is a PCell, deconfigure a second cell group incase Cell is SPCell, and/or the like).

In an example, a base station and a wireless device may support a dormant state of a PCell or a SPCell or a SCell. The wireless device may monitor one or more first search spaces to receive DCIs comprising commands to switch one or more cells between active and dormant state on the dormant PCell. For example, the one or more first search spaces may be monitored on DRX OFF state as well. The wireless device may monitor one or more second search spaces to receive SL DCIs comprising resource assignments for one or more sidelink cells on the PCell/SPCell/SCell in the dormant state, if the PCell/SPCell/SCell is configured as a sidelink scheduling cell. The wireless device may perform reduced CSI feedback for a cell when the cell is in a dormant state compared to when the cell is in an active state. The wireless device may perform radio link monitoring (RLM), and necessary beam management procedure. The wireless device may stop monitoring on one or more third search spaces. The one or more third search spaces may comprise search spaces which are configured to the wireless device on the PCell, but may not belong to the one or more first search spaces nor the one or more second search spaces. During the dormant PCell state, one or more SR resources and PUCCH resources are maintained. The wireless device may suspend one or more configured grant resources configured on the PCell. A similar behavior may be also applied in case of SPCell of a secondary group where the SPCell may be a scheduling cell for one or more sidelink cells. A similar behavior may be also applied in case of SCell where the SCell may be a scheduling cell for one or more sidelink cells In an example, a base station may transmit one or more RRC messages comprising configuration parameters. The configuration parameters may comprise/indicate a dormant BWP for a PCell or a SPCell. The configuration parameters may comprise/indicate a dormant BWP for a SCell. The wireless device may be configured with one or more first search spaces on the dormant BWP of the PCell or the SPCell or the SCell to receive DCIs comprising commands to switch one or more cells between active and dormant state. The one or more first search spaces may be configured on the PCell's or the SPCell's or the SCell's dormant BWP. The wireless device may monitor the one or more first search spaces even during the dormant state of the PCell or the SPCell or the SCell if configured. The configuration parameters may comprise/indicate one or more second search spaces on the dormant BWP of the PCell or the SPCell or the SCell to receive SL DCIs comprising resource assignments for the one or more sidelink cells. The configuration parameters may comprise/indicate one or more PUCCH resource sets/resources to support sidelink HARQ-ACK transmission on the dormant BWP of the PCell or the SPCell or the SCell. The configuration parameters may comprise/indicate one or more sidelink SR resources for SL SR transmissions on the dormant BWP of the PCell or the SPCell or the SCell. configuration parameters may comprise/indicate one or more SR resources for SR transmissions on the dormant BWP of the PCell or the SPCell or the SCell. In response to satisfying one or more criteria, the wireless device may switch to a dormant BWP of a scheduling cell of SL DCIs. In response to having a plurality of scheduling cells of SL DCIs for the one or more sidelink cells, the wireless device may switch to a dormant BWP of each scheduling cell of the plurality of the scheduling cells.

For example, the one or more criteria may include a case when the wireless device may receive a radio resource control (RRC) connection release message for a cell group comprising one or more sidelink scheduling cells from the base station. For example, the one or more criteria may include a case when the wireless device may switch to a DRX OFF state for one or more sidelink scheduling cells. For example, the one or more criteria may include a case the wireless device may receive one or more commands via MAC CEs and/or DCIs to switch to a power saving state of the one or more sidelink scheduling cells. For example, the one or more criteria may include a case the wireless device may receive one or more commands to deactivate one or more sidelink scheduling cells. The one or more sidelink scheduling cells may comprise one or more downlink carriers/cells where each cell of the one or more sidelink scheduling cells may be configured with at least one search space for monitoring sidelink DCIs for one or more sidelink cells/carriers/BWPs.

In response to receiving a BWP switching to a non-dormant BWP or in response to transmitting a SR, the wireless device may switch to a non-dormant BWP of a cell. In response to transmitting a SR, the wireless device may switch to a default BWP of the cell or a previously active BWP of the cell before switching to the dormant BWP of the cell or a configured BWP (e.g., a BWP configured to switch in response to transition from a dormant state to an active state for the cell) by the base station.

In an example, a wireless device may switch to a sidelink scheduling specific BWP (e.g., a SL DL BWP) of a scheduling cell instead of a dormant BWP in response to transitioning to a dormant state of the scheduling cell and a mode 1 sidelink operation via the scheduling cell being active. Other names of a BWP may not be precluded. FIG. 21 illustrates an example. A base station may transmit one or more RRC messages comprising configuration parameters. The configuration parameters may comprise/indicate a dormant BWP (e.g., a SL DL BWP) and a BWP on a PCell to a wireless device. The BWP of the PCell is used until the one or more criteria are met (e.g., 'a condition is met'). A wireless device may be activated with a gNB-assisted resource allocation at a time n. At a time r, the wireless device may transmitted a SL SR. At a time m, as there is no activity on downlink/uplink, the base station may command switching to a dormant BWP of the PCell. The wireless device may switch to the dormant BWP of the PCell in response to receiving the command. The wireless device may monitor one or more first search spaces to receive DCIs indicating a BWP switching or a cell state change from a dormant state to an active state on the dormant BWP. The wireless device may monitor one or more second search spaces to receive SL DCIs for one or more sidelink cells based on transmission of a SL SR. For example, the wireless device may monitor the one or more second search spaces in response to transmitting the SL SR for a certain time duration. At a time s, the base station may terminate the mode 1 operation and may command RRC connection release request as there is no ongoing activity on downlink/uplink for some time. A similar embodiment may be applied for a secondary cell (e.g., SPCell, SCell, PUCCH SCell).

In an example, a wireless device may switch to a dormant state of a cell which may have a similar set of behavior to a dormant BWP from an active state of the cell. In response to switching to the dormant state of the cell, the wireless device may monitor one or more first search spaces for DCIs for switching cell state. The wireless device may monitor one or more second search spaces for SL DCIs for one or more sidelink cells on the dormant state of the cell. The wireless device may stop monitoring one or more other search spaces on the dormant state of the cell. A dormant state may be called as a SL ACTIVE state or a power saving state.

In an example, a wireless device may determine the one or more first search spaces based on one or more first RNTIs (e.g., RNTI used for scheduling a cell state or a BWP switching including a dormant state). The wireless device may monitor the one or more first RNTIs on the one or more first search spaces but the wireless device may not monitor DCIs based on the one or more first RNTIs via other search spaces. The wireless device may determine the one or more second search spaces based on one or more second RNTIs (e.g., RNTI used for scheduling resource assignments for one or more sidelink cells). The wireless device may monitor the one or more second RNTIs on the one or more second search spaces but the wireless device may not monitor DCIs based on the one or more second RNTIs via other search spaces. The wireless device may determine one or more third search spaces for other RNTIs among configured RNTIs. In an example, a wireless device may determine the one or more first search space based on one or more first DCI formats (e.g., DCI format 0_0, DCI format 1_0, DCI format 0_1, DCI format 1_1, DCI format 0_2, DCI format 2_2, or a DCI format 2_0, a DCI forma 2_1, a DCI format 2_2, a DCI format 2_3). The wireless device may determine the one or more second search spaces based on one or more second DCI formats (e.g., DCI format 3_0, a DCI format 3_1). The wireless device may determine the one or more third search spaces based on one or more third DCI formats (e.g., DCI format 2_0, a DCI forma 2_1, a DCI format 2_2, a DCI format 2_3).

In an example, a wireless device may be configured with a DRX configuration for a cell group by a base station. The wireless device may be configured with one or more first search spaces on a first cell for the first cell. The wireless device may monitor one or more sidelink DCIs, comprising resource assignments for one or more sidelink cells, on the one or more first search spaces of the first cell. The wireless device may be configured with one or more second cells for the cell group. The wireless device may be configured with one or more second search spaces over the one or more second cells for the cell group. The wireless device may monitor DCIs comprising resource assignments for downlink and/or uplink for all or a subset of the one or more second cells. Based on a DRX cycle configuration, the wireless device may switch between a DRX ActiveTime state and a DRX OFF state. The wireless device may perform monitoring on the one or more first search spaces and the one or more second search spaces during DRX ActiveTime state. The wireless may skip monitoring on the one or more first search spaces and the one or more second search spaces during DRX OFF state.

In an example, the wireless device may transmit a first SL SR during a DRX ActiveTime state at a time m. The wireless device may monitor one or more first RNTIs on the one or more first search spaces before transmitting the first SL SR. The wireless device may monitor one or more second RNTIs on the one or more first search spaces after transmitting (e.g., based on) the first SL SR at the time m. For example, the one or more first RNTIs may be same to the one or more second RNTIs. For example, the one or more first RNTIs may be a subset of the one or more second RNTIs. For example, the one or more second RNTIs may comprise the one or more first RNTIs and one or more third RNTIs used for sidelink DCIs comprising resource assignments for one or more sidelink cells. For example, the wireless device may monitor the one or more third RNTIs on the one or more first search spaces when the wireless device is configured with a mode 1 operation for the one or more sidelink cells.

The wireless device may transmit a second SL SR during a DRX OFF state. The wireless device may monitor the one or more third RNTIs in response to transmitting the second SL SR. The wireless device may not monitor the one or more fourth RNTIs during the DRX OFF state. The one or more fourth RNTIs may be same to the one or more first RNTIs. The one or more fourth RNTIs may be a set of RNTIs which belong to the one or more first RNTIs but not belong to the one or more third RNTIs.

For example, the wireless device may monitor the one or more third RNTIs on the one or more first search spaces during a time duration. The time duration may comprise a starting time after transmitting a SL SR and an ending time where a timer may be expired. For example, the timer may be a sidelink timer which will be started/activated upon transmitting the SL SR. The timer will be reset when there is a SL DCI is received by the base station. The timer may be expired after a configured time duration. For example, the wireless device may monitor the one or more third RNTIs during a DRX ActiveTime state regardless of a SL SR transmission. The wireless device may monitor one or more third RNTIs during a DRX OFF state for a time duration based on one or more SL SR transmissions.

Figure 24:
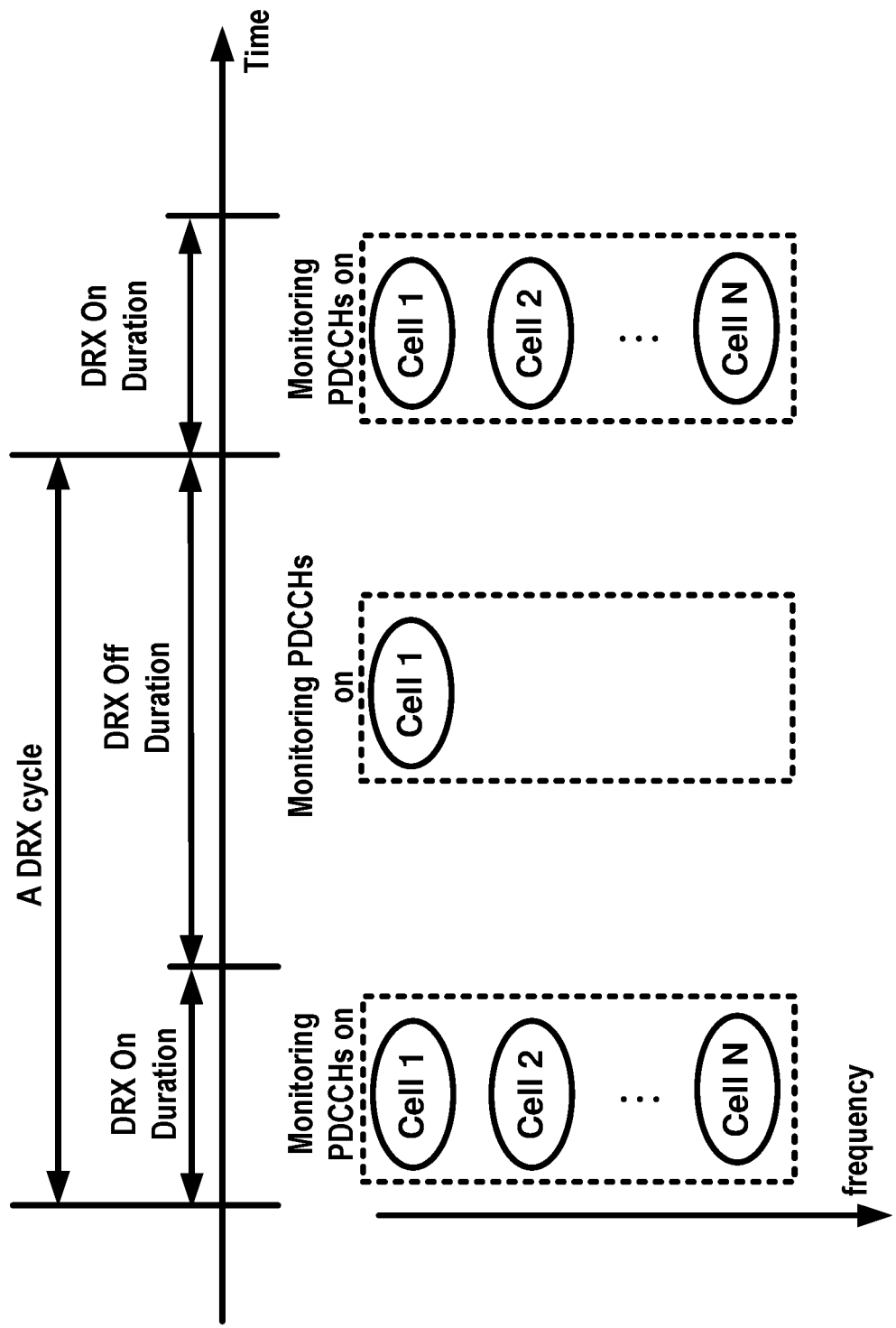
FIG. 24 illustrates an example diagram as per an aspect of an example embodiment of the present disclosure.

FIG. 24 illustrates an example diagram as per an aspect of an example embodiment of the present disclosure. A wireless device is configured with a DRX cycle configuration which consists of DRX OnDuration (DRX ActiveTime state) and a DRX Off Duration (DRX OFF state). During DRX ActiveTime state, the wireless device may monitor search spaces over one or more cells (e.g., Cell 1, Cell 2, . . . , Cell N). During DRX OFF, the wireless device may monitor search spaces of a first cell (e.g., Cell 1) when the wireless device is configured with one or more search spaces on the first cell for receiving SL DCIs for one or more sidelink cells. In an example, a wireless device is configured with one or more first search spaces where the wireless device may monitor a first set of RNTIs. The wireless device is configured with one or more second search spaces where the wireless device may monitor a second set of RNTIs. The second set of RNTIs may comprise the first set of RNTIs and one or more RNTIs for the SL DCIs. During a DRX OFF state, the wireless device may stop monitoring on the one or more first search spaces on the first cell. The wireless device may monitor on the one or more second search spaces on the first cell, in response to transmitting a SL SR during the DRX OFF state.

Figure 25:
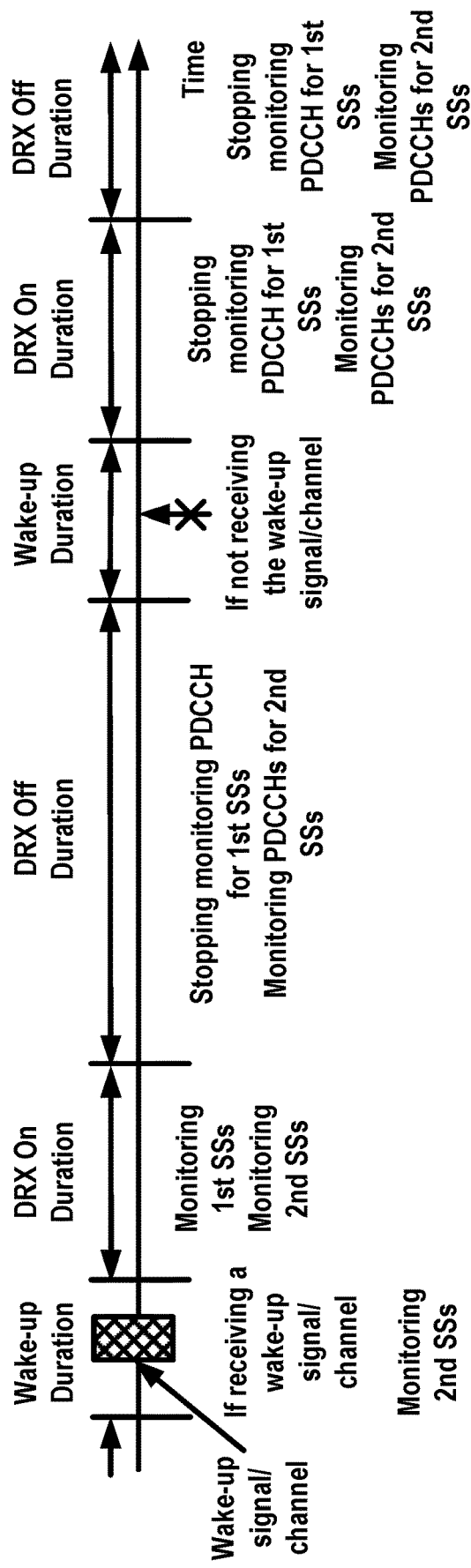
FIG. 25 illustrates an example diagram of a wake-up procedure as per an aspect of an example embodiment of the present disclosure.

In an example, a wireless device may be configured with a power saving mechanism such as wake-up procedure. The wireless device may be configured to monitor a wake-up signal aligned with a DRX cycle configuration where the wireless device may become DRX ActiveTime state if the wireless device receives the wake-up signal before DRX OnDuration of a DRX cycle. Otherwise, the wireless device may continue DRX OFF state from the previous DRX cycle. The wireless device may apply the wake-up signal procedure differently for one or more search spaces for one or more first RNTIs and for one or more second search spaces for one or more second RNTIs. FIG. 25 illustrates an example diagram of a wake-up procedure as per an aspect of an example embodiment of the present disclosure. A wireless device may be configured with a DRX cycle configuration. A base station may also configure a wake-up procedure to the wireless device. The wireless device may monitor one or more search spaces for monitoring wake-up signals before a DRX OnDuration of a DRX cycle. The wireless device may monitor the wake-up signal during DRX OFF state. The wireless device may monitor the one or more search spaces for the wake-up signal based on a configuration of the one or more search spaces. The wireless device may be configured with one or more first search spaces. The wireless device may monitor DCIs comprising resource assignments for downlink and/or uplink and/or comprising command such as a power control, slot formation indication, puncturing indication for downlink and/or uplink on the one or more first search spaces. The wireless device may monitor at least SL DCIs comprising resource assignment for one or more sidelink cells on one or more second search spaces. The wireless device may monitor second DCIs on the one or more second search spaces based on the configuration. During a DRX ActiveTime state, the wireless device may monitor both the one or more first search spaces and the one or more second search spaces. For example, when the wireless device may monitor the one or more second search spaces only for SL DCIs and not for DCIs, the wireless device may monitor the one or more second search spaces during a time duration. The time duration may start in response to transmitting a SL SR. The wireless device may stop/skip monitoring the one or more first search spaces during a DRX OFF state. The wireless device may skip monitoring the one or more second search spaces when the wireless device may not expect to receive a SL DCI in a time window (e.g., during a DRX OFF duration, a time until a next SL SR transmission, a time until a new sidelink data arrives, and/or the like). In response to not receiving a wake-up signal, the wireless device may not transition to a DRX ActiveTime state during a DRX OnDuration of a DRX cycle (e.g., a next DRX cycle after the wake-up signal monitoring occasion). The wireless device may maintain the DRX OFF state and may follow behaviors on the DRX OFF state in response to not receiving the wake-up signal regardless a time is configured as a DRX OnDuration or not.

In an example, a wireless device may monitor one or more first search space of a cell configured for SL DCIs for one or more sidelink cells in response to transmitting a SL SR. The wireless device may transmit the SL SR which corresponds to new data arrival for the all or subset of the one or more sidelink cells. For example, if one or more first search spaces for SL DCIs are configured for each resource pool or for each a LCH priority/mapping, the wireless device may monitor the corresponding search spaces to the SL SR (e.g., if the SL SR is triggered for a first LCH, the one or more search spaces associated with the LCH may be monitored). For example, the wireless device may monitor all search spaces configured for SL DCIs regardless of LCH mapping. If there is any SL SR transmission, the wireless device may monitor all search spaces where the wireless device may receive a SL DCI. For example, the wireless device may monitor one or more second search spaces of a scheduling cell for SL DCIs for a sidelink cell. The wireless device may be configured with a single scheduling cell for a sidelink cell. The wireless device may monitor the one or more second search spaces of the scheduling cell in response to transmitting a SL SR corresponding to the sidelink cell.

Figure 26:
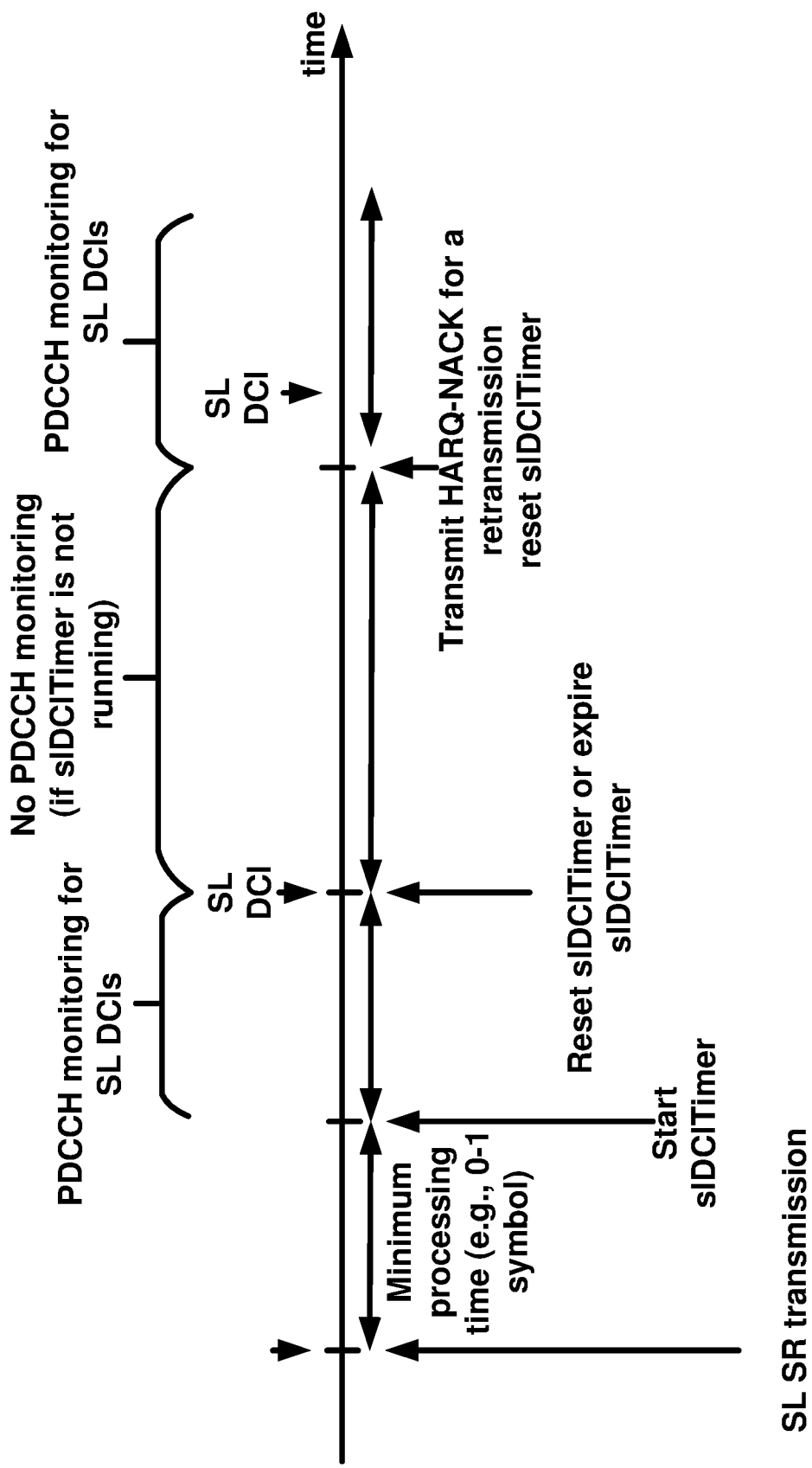
FIG. 26 illustrates an example diagram as per an aspect of an example embodiment of the present disclosure.

FIG. 26 illustrates an example diagram as per an aspect of an example embodiment of the present disclosure. A wireless device may transmit a SL SR. After a minimum processing time (e.g., 0 msec, 1 slot, K OFDM symbols), the wireless device may start a timer (e.g., slDCITimer, SL timer). The wireless device may monitor one or more search spaces configured for SL DCIs during the timer is active/running. In response to receiving a SL DCI from a base station, the wireless device may reset the timer. For example, the SL DCI may expire/stop the timer. Whether to reset the timer or stop the timer may depend on whether the wireless device may expect more SL DCIs for potential sidelink transmissions or the wireless device may not expect a SL DCI corresponding to the SL SR. For example, when the base station may schedule a single SL DCI corresponding to a SL SR, the wireless device may not stop the timer. In the example, the wireless device may retransmit the SL SR in response to expiry of the timer (as the timer has not been deactivated). For example, the base station may transmit one or more SL DCIs corresponding to a SL SR, the wireless device may reset the timer in response to receiving a SL DCI. When the timer is active, the wireless device may monitor on the one or more search spaces for SL DCIs. When the timer is not active, the wireless device may skip monitoring on the one or more search spaces. In an example, a wireless device may be allowed not to monitor the one or more search spaces in one or more cases. For example, if the wireless device may not expect receiving any DCIs or any SL DCIs (e.g., during a time between receiving a SL DCI and a potential retransmission SL DCI after the wireless device may transmit a HARQ-ACK feedback for resource allocation indicated by the SL DCI during a DRX OFF state), the wireless device is allowed to skip monitoring on the one or more search spaces. For example, a wireless device may run a SL HARQ RTT timer which will be started in response to receiving a SL DCI comprising resource assignments for a new sidelink transport block. The timer may be expired in response to transmitting a HARQ-ACK feedback corresponding to the sidelink transmissions indicated by the SL DCI.

In an example, a wireless device may be configured with a plurality of cell groups. A first cell group may comprise one or more first cells. A second cell group may comprise one or more second cells. The wireless device may be configured with a sidelink scheduling cell from the second cell group for one or more sidelink cells. A base station may release/deconfigure the second cell group when a channel condition changes (e.g., a bad channel quality on the second cell group, a RSRP to the wireless device is not sufficiently good to operate a dual connectivity, etc.). The base station may indicate one of possible options to handle the gNB-assisted sidelink operation on the second cell group when the base station may indicate a command to release/deconfigure the second cell group. For example, the base station may indicate to switch to the first cell group for the gNB-assisted sidelink operation, which may be cross-RAT operation. For example, the base station may indicate to deactivate the gNB-assisted sidelink operation. For example, the base station may indicate nothing where the wireless device may assume that the gNB-assisted operation on the second cell group is deactivated. The wireless device, if any option is indicated, may follow the option indicated by the base station.

In an example, a wireless device may maintain one or more timers in a same manner with and without configuration of a sidelink operation. The sidelink operation may be assisted by a base station (e.g., mode 1) or the sidelink operation may be performed based on a UE-autonomous resource selection (e.g., mode 2). In an example, when a wireless device may be released from a base station (e.g., becomes RRC IDLE state) or the wireless device may experience one or more SCell deactivation where the one or more SCells are configured to transmit sidelink DCIs for mode 1 sidelink operation for one or more sidelink cells or the wireless device may switch to a DRX OFF state based on a DRX configuration for the one or more cells configured to transmit the sidelink DCIs for the mode 1 sidelink operation for the one or more sidelink cells, the wireless device may assume that the gNB-assisted mode 1 operation for the one or more sidelink cells are deactivated. When the gNB-assisted mode 1 operation is deactivated, the wireless device may switch to the UE-autonomous operation (e.g., mode 2 operation) for the one or more sidelink cells.

Figure 27:
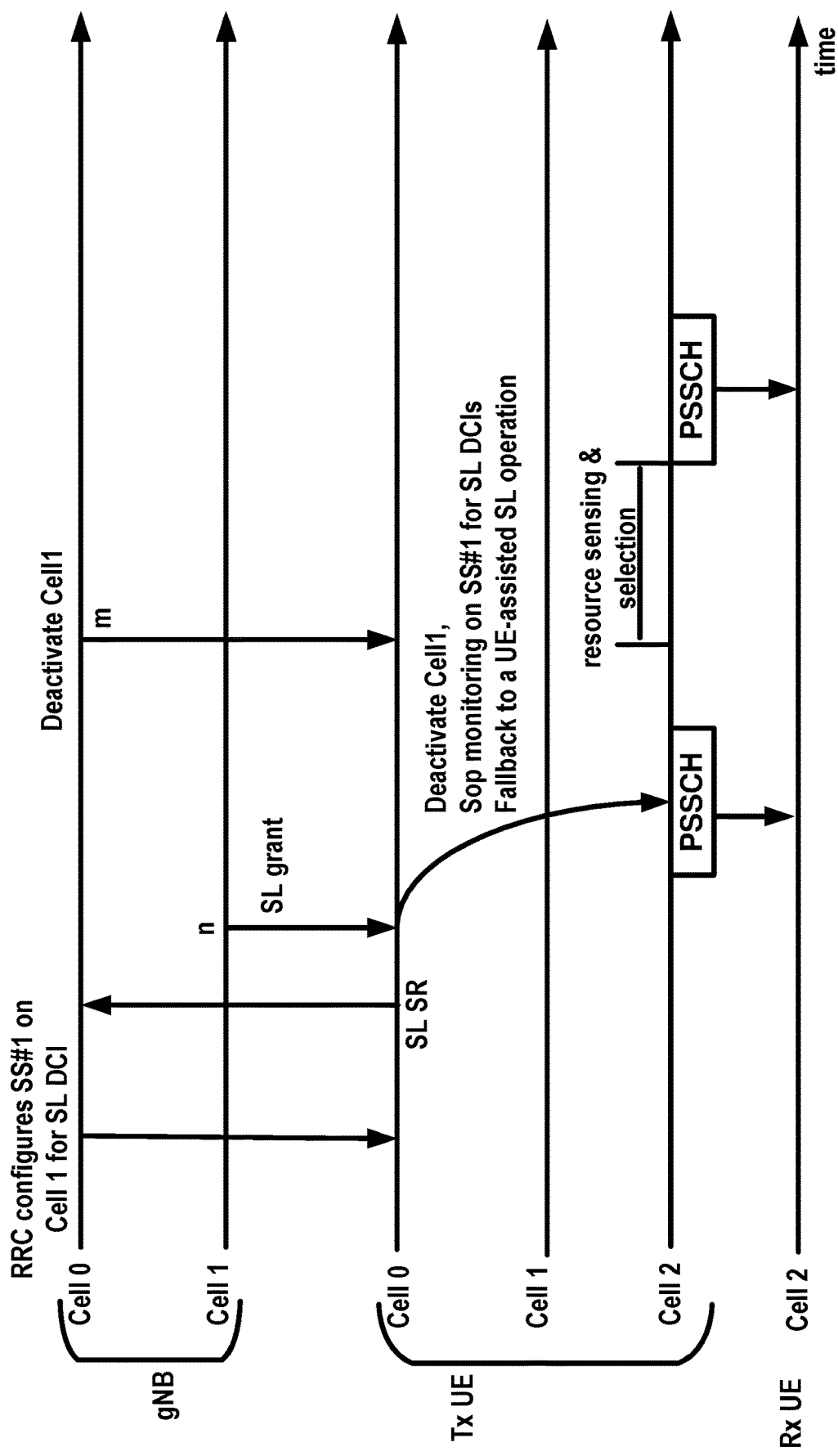
FIG. 27 illustrates an example diagram as per an aspect of an example embodiment of the present disclosure.

FIG. 27 illustrates an example diagram as per an aspect of an example embodiment of the present disclosure. A base station may transmit one or more RRC messages comprising configuration parameters. The configuration parameters may comprise/indicate a first cell (Cell 0) and a second cell (Cell 1) to a wireless device. A first wireless device (Tx UE) may be activated with the first cell and the second cell. The first wireless device may operate a sidelink operation on a sidelink cell (Cell 2). The configuration parameters may comprise/indicate a first search space (SS #1) for the wireless device to receive one or more SL DCIs for the sidelink cell via the second cell. The base station may transmit a sidelink DCI (SL grant) at a time n. The first wireless device may transmit one or more PSSCHs based on the sidelink DCI. The base station may transmit a deactivation command for the second cell at a time m. The wireless device may deactivate the second cell in response to the command. As a scheduling cell for SL DCIs has been deactivated, and there is no other configured for the one or more sidelink cells, the wireless device may stop monitoring on the first search space on the second cell (SS #1 on Cell 1). The wireless device may switch to the UE-autonomous (e.g., mode 2) operation.

The wireless device may perform the mode 2 operation (e.g., resource sensing based on measurements and/or based on one more sidelink control information and resource selection) on one or more resource pools for the one or more sidelink cells. Based on the resource selection, the wireless device may transmit one or more PSSCHs to another wireless device (e.g., Rx UE). In the example, the first wireless device may maintain one or more timers and/or one or more RRC status and/or one or more power saving state and/or one or more SCell states regardless of a sidelink operation. The wireless device may keep a same operation with and without operating a gNB-assisted mode 1 operation. This may not increase UE complexity to handle a sidelink operation in addition to downlink and/or uplink operation.

Figure 28:
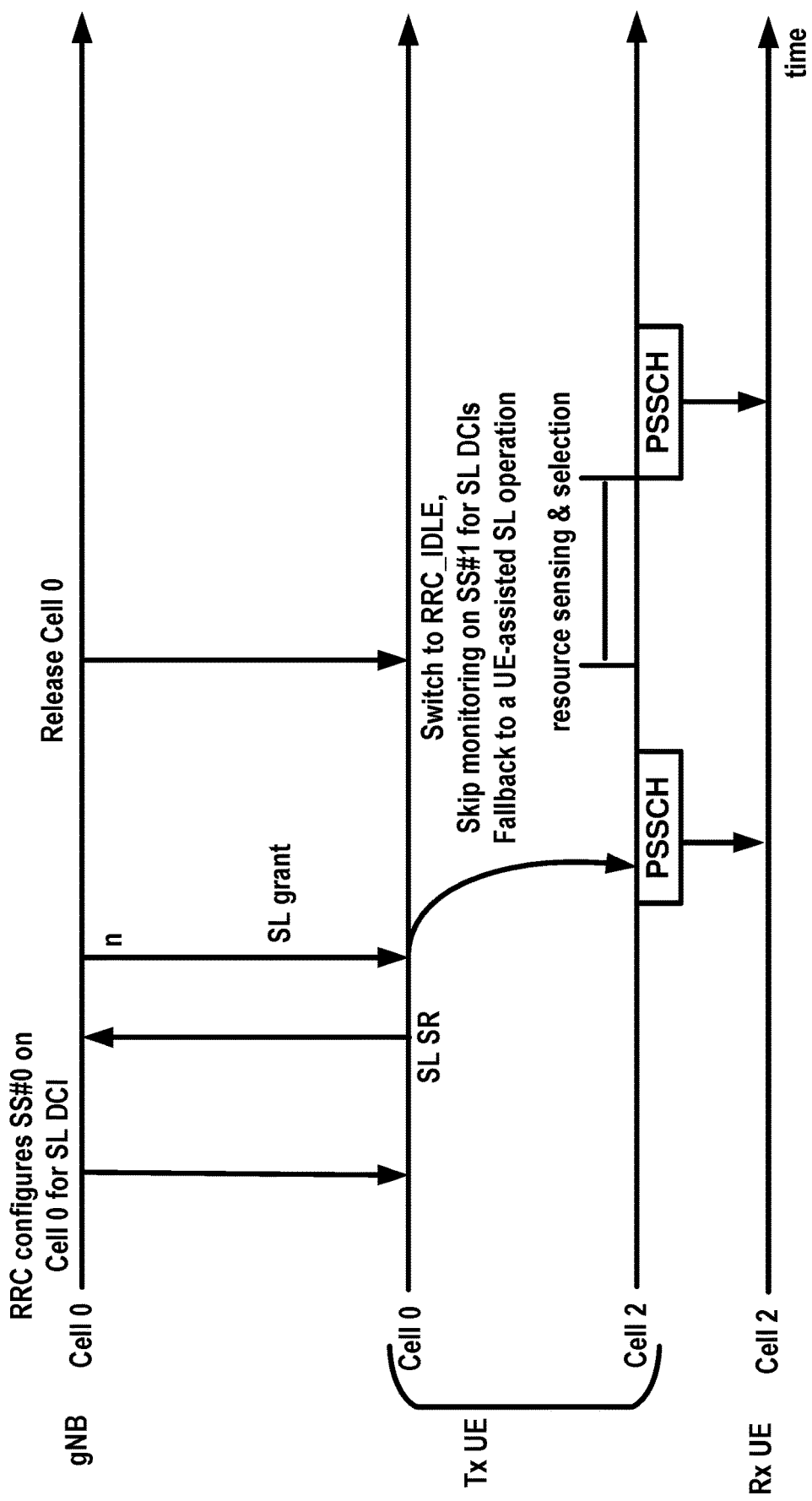
FIG. 28 illustrates an example diagram as per an aspect of an example embodiment of the present disclosure.

FIG. 28 illustrates an example as per an aspect of an example embodiment of the present disclosure when a first wireless device may receive a RRC connection release command/request from a base station. FIG. 28 illustrates a similar scenario to FIG. 27 except that the base station may configure a first cell (Cell 0) as a scheduling cell for SL DCIs for one or more sidelink cells. For example, the first cell may be a primary cell of a first cell group. For example, the first cell may be a primary cell of a second cell group when the first wireless device is configured with a plurality of cell groups. The first wireless device may receive a SL DCI (SL grant) via the first cell in response to transmitting a SL SR, and may transmit one or more PSSCHs based on the received SL DCI. When the first wireless device may receive a RRC connection release message/request to release the primary cell of a cell group, the first wireless device may perform the request. For example, for the primary cell of the first cell group, the first wireless device may switch to a RRC IDLE state and may release one or more RRC configurations including one or more sidelink resource first pools configured by the base station using a UE-dedicated RRC signaling. The first wireless device may use one or more second resource pools broadcasted by one or system information block (SIBs) or obtained via pre-configuration. The first wireless device may select a SIB-broadcast resource or pre-configured resource for a UE-autonomous resource selection (e.g., mode 2 operation). The wireless device may continue the sidelink operation on the one or more sidelink cells using the mode 2 operation. In case, the release request has been received for the primary cell of the second cell group, the first wireless device may release the second cell group. If there is no other scheduling cell for SL DCIs for the one or more sidelink cells, the first wireless device may switch to the mode 2 operation.

Figure 29:
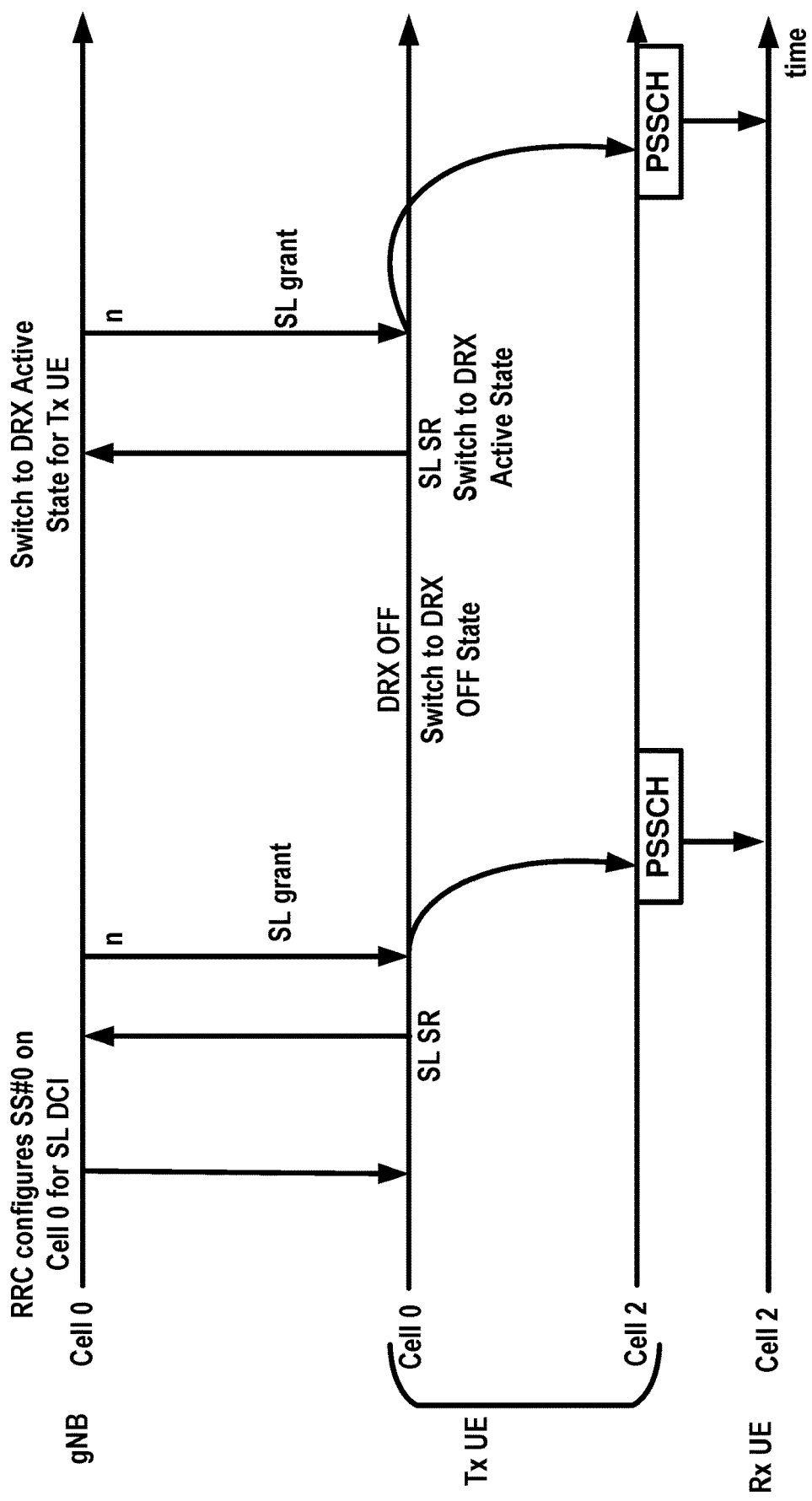
FIG. 29 illustrates an example diagram as per an aspect of an example embodiment of the present disclosure.

In an example, a similar operation may be considered for a DRX configuration. FIG. 29 illustrates an example. A similar scenario to FIG. 26, a base station may transmit one or more RRC messages comprising configuration parameters. The configuration parameters may comprise/indicate a first cell of a first cell group or a second cell group to a first wireless device. When the first device is on DRX Active, the wireless device may monitor one or more search spaces configured to the first wireless device (e.g., SS #0) and may receive one or more SL DCIs (e.g., SL grant). The first wireless device may transmit one or more PSSCHs based on the received one or more SL DCIs. In response to switching to a DRX OFF state (e.g., based on a DRX configuration of the first cell group or the second cell group), the first wireless device may not monitor the one or more search spaces (e.g., SS #0). During DRX OFF state, the first wireless device may skip monitoring one or more second search spaces configured to the first wireless device on the first cell group (or on the second cell group) except for one or more third search spaces configured for power saving signals (e.g., wake-up signal).

In an example, the first wireless device may have one or more new sidelink data arrived. In response to a new data arrival on its data queue, the first wireless device may trigger a sidelink scheduling request (SL SR). In response to transmitting the SL SR, the first wireless device may switch to the DRX Active state. For example, in switching to the DRX Active state, the wireless device may treat a SL SR same as a regular scheduling request for an uplink (e.g., one or more timers related to the uplink e.g., HARQ RTT timer may be reset/activated). For example, the wireless device may not reset/set/activate any other timers related to a DRX configuration except for one or more timers associated with a sidelink operation (e.g., a SL timer, a slDCITimer, etc.). For example, the wireless device may not start drx-inactivity-Timer due to transmission of a SL SR. For example, the wireless device may not start HARQ timer or retransmission timer due to the transmission of the SL SR. For example, the wireless device may reset one or more timers related to a BWP operation (e.g., bwp-inactivityTimer) based on receiving a SL DCI. For example, the wireless device may reset bwp-inactivityTimer in response to the SL DCI. The wireless device may maintain DRX states based on one or more timers/configurations for downlink and/or uplink and optionally sidelink (if configured). The wireless device may maintain a current active BWP based on both downlink/uplink and sidelink operation.

In an example, a wireless device may transmit a PUCCH to transit a sidelink HARQ feedback to a base station based on one or more feedbacks from a receiver wireless device on one or more sidelink transmissions. The wireless device may transmit the PUCCH during DRX OFF state. The wireless device may not switch to DRX Active state in response to transmitting the PUCCH.

In an example, a wireless device may have a SCell deactivation timer (e.g., sCellDeactivationTimer) expired for a scheduling cell for one or more sidelink cells (e.g., the scheduling cell may transmit one or more SL DCIs comprising resource assignments on the one or more sidelink cells). For example, in response to receiving an expiry of the sCellDeactivationTimer, the wireless device may deactivate the scheduling cell. The wireless device and a base station may coordinate to switch a scheduling cell to another cell or may deactivate a mode 1 operation. This may increase interruption of a sidelink operation due to reconfiguration latency and/or switching latency. This may degrade performance of the sidelink operation. In an example, a wireless device may assume that sCellDeactivationTimer is not activated/configured for a scheduling cell when the wireless device is configured with the scheduling cell for monitoring SL DCIs comprising resource assignments for the one or more sidelink cells (e.g., configured with mode 1 operation). The wireless device may ignore one or more related configuration to the sCellDeactivationTimer for the scheduling cell. This may enable ensured quality of sidelink operation based on the mode 1 sidelink operation by not disabling the scheduling cell based on a timer. This may enhance the quality of sidelink operation.

In an example, the wireless device may reset the sCell-DeactivationTimer in response to receiving a SL DCI on the scheduling cell. In an example, the wireless device may not reset the sCellDeactivationTimer for the scheduling cell of the sidelink operation in response to receiving the SL DCI. This may enable ensured quality of sidelink operation based on the mode 1 sidelink operation by not disabling the scheduling cell based on a timer. This may enhance the quality of sidelink operation. The wireless device may deactivate uplink carrier/cell of the scheduling cell but maintain active downlink carrier/cell of the scheduling cell. For example, the wireless device may suspend one or more configured uplink grants for the uplink carrier/cell. The wireless device may continue monitoring one or more search spaces configured for the downlink cell/carrier of the scheduling cell. In an example, the wireless device may monitor one or more second search spaces from the one or more search spaces, wherein the one or more second search spaces may transmit SL DCIs for the one or more sidelink cells. The wireless device may stop running the sCellDeactivation- Timer after the timer is expired. This may enable reduced interruption time of sidelink operation. A cell state, wherein a downlink cell/carrier of the cell is active and an uplink cell/carrier is deactivated and a wireless device may monitor one or more search spaces on the cell scheduling SL DCIs for one or more SL DCIs only while the wireless device may stop monitoring other search spaces on the cell, may be referred as a SL Active cell state. The SL Active state may be deactivated in response to deactivated sidelink operation and/or sidelink mode 1 operation.

In an example, when a wireless device is configured with a mode 1 operation via a first cell, the wireless device may ignore one or more bwp-InactivityTimer configured for the first cell (if any). The wireless device may not expect or the base station may not configure the one or more bwp-InactivityTimer for the first cell. The wireless device may not switch to a default BWP on the first cell as long as the mode 1 operation is active. When a wireless device may receive a BWP switching command from a base station on the first cell, the wireless device may be allowed to skip/ignore the BWP switching command if the wireless device may need to drop one or more sidelink transmissions due to the BWP switching. For example, the wireless device may skip/ignore the BWP switching command only when the wireless device may need to drop one or more sidelink transmission with a priority higher than or equal to a threshold due to the BWP switching. A wireless device may be allowed to skip/ignore a BWP switching on a second cell if the wireless device may need to drop one or more sidelink transmissions with a priority higher than or equal to a threshold priority value.

The first wireless device may start monitoring the one or more first search spaces configured to the first wireless device on the first cell group (or on the second cell group). In an example, the base station may transmit one or more RRC messages comprising configuration parameters. The configuration parameters may comprise/indicate slDCI-Timer (SL Timer) illustrated in FIG. 30. The first wireless device may start slDCITimer (SL Timer) in response to transmitting the SL SR. The first wireless device may reset the slDCITimer (SL Timer) in response to receiving a SL DCI or receiving a SL DCI comprising resource assignment(s) for a new PSSCHs or a new transport block. The first wireless device may maintain DRX Active state when slDCITimer (SL Timer) is active in addition to one or more criteria used for a DRX operation without a sidelink operation. The first wireless device may switch to DRX OFF state in response to an expiry of the slDCITimer (SL Timer). A timer may be called differently such as a sidelink HARQ RTT timer. A timer (e.g., SL Timer, slDCITimer, sidelink HARQ RTT timer, etc.) may be configured for a sidelink cell, or per resource pool or per a group of resource pools, or per a group of one or more sidelink cells, wherein a gNB-assisted operation (e.g., mode 1) are configured to the sidelink cell, resource pool, the group of resource pools, or the group of one or more sidelink cells.

Figure 30:
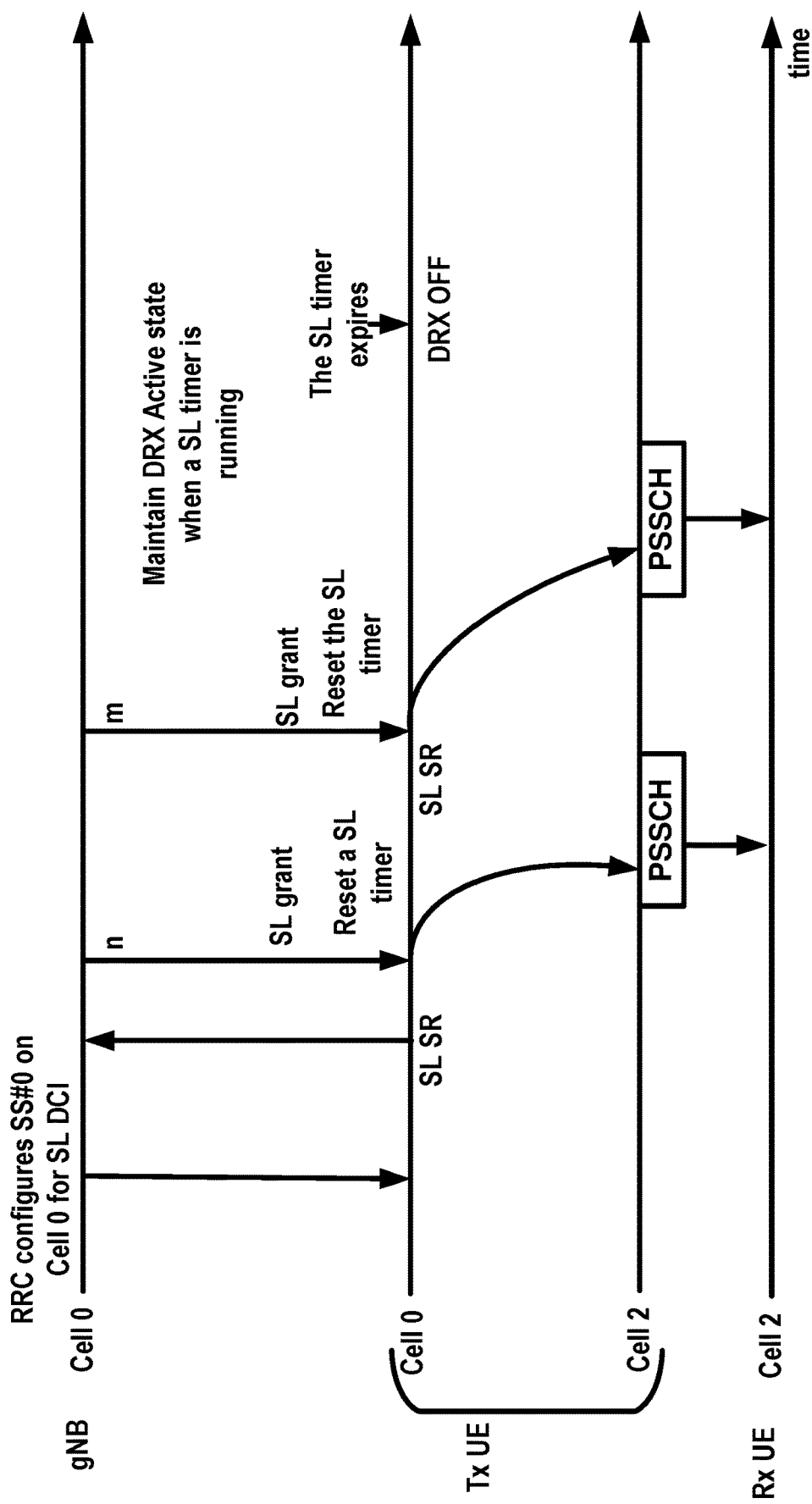
FIG. 30 illustrates an example diagram as per an aspect of an example embodiment of the present disclosure.
Figure 31:
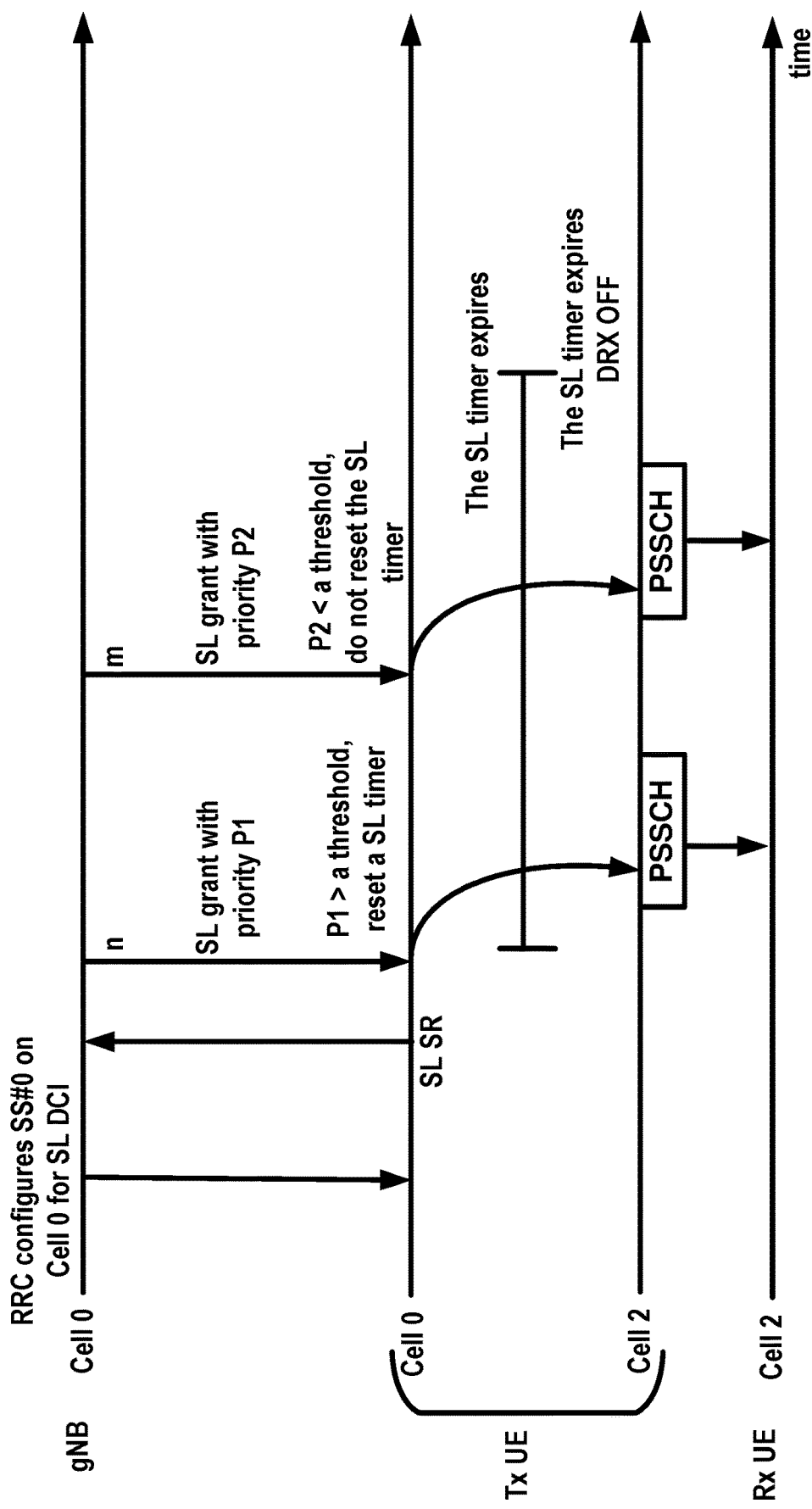
FIG. 31 illustrates an example diagram as per an aspect of an example embodiment of the present disclosure.

FIG. 31, a similar scenario to FIG. 30 with an exception of a timer for a sidelink operation, illustrates an example. A base station may transmit one or more RRC messages comprising configuration parameters. The configuration parameters may comprise/indicate a timer (e.g., SL timer, slDCITimer) which will be started after transmitting a SL SR, and may be reset whenever a SL DCI is received. When the timer is active, a first wireless device may keep DRX Active state. When the time is expired, the first wireless device may follow DRX state based on one or more other timers such as DRX inactivity timer, DRX OnDuration timer, and/or the like. In an example, a wireless device may reset a SL timer in response to receiving a SL DCI comprising resource assignments for a sidelink transmission with a priority which is greater than or equal to a threshold. FIG. 31 illustrates an example as per an aspect of an example embodiment of the present disclosure. A first wireless device may reset a SL timer for a first SL grant received at a time n as the SL grant is for a sidelink operation with a first priority greater than a threshold. The first wireless device may not reset the SL timer for a second SL grant received at a time m as the SL grant is for a sidelink operation with a second priority smaller than the threshold.

Figure 32:
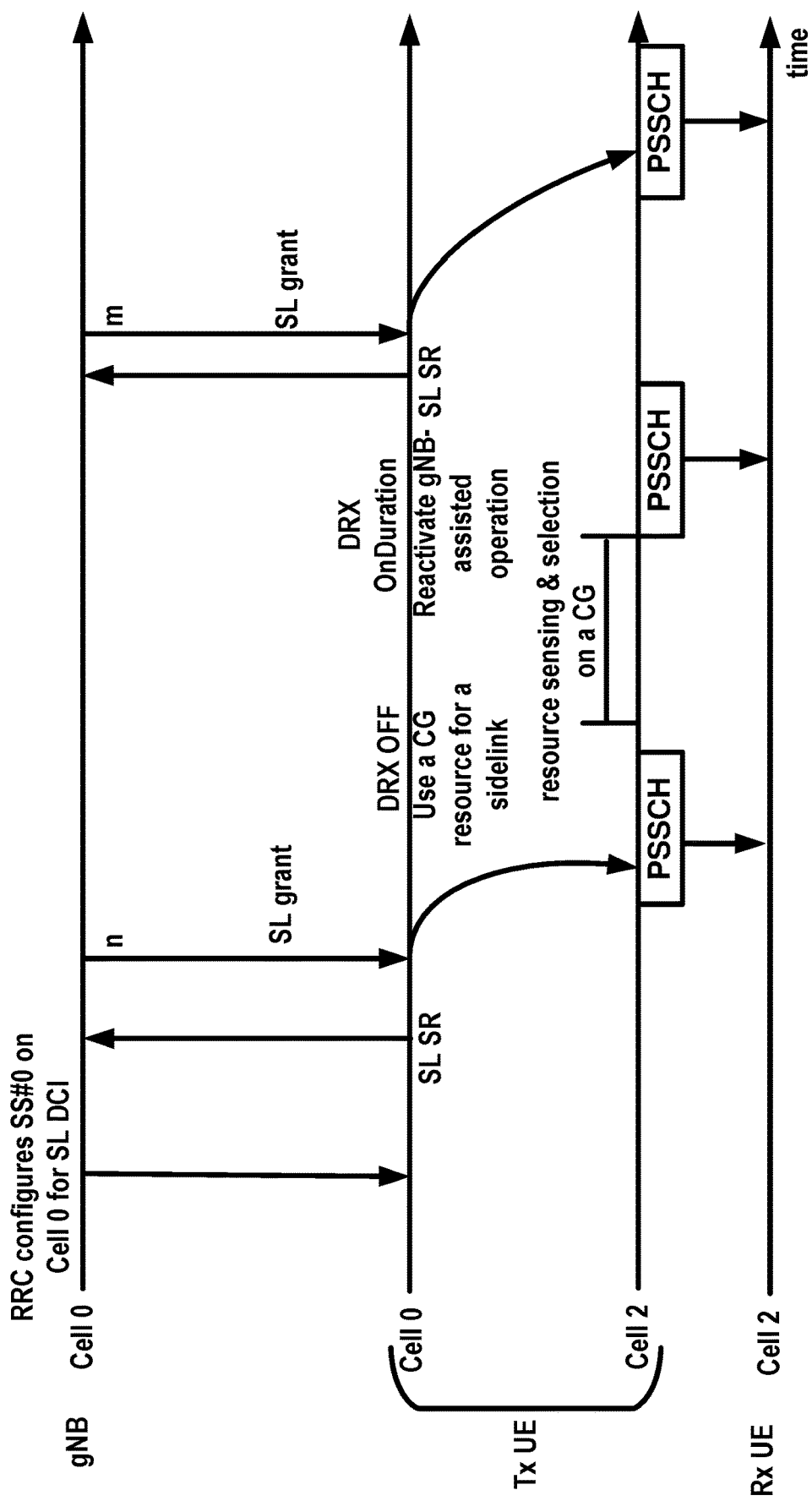
FIG. 32 illustrates an example diagram as per an aspect of an example embodiment of the present disclosure.

In an example, a base station may transmit one or more RRC messages comprising configuration parameters. The configuration parameters may comprise/indicate one or more configured grant resources or one or more resource pools that are used for one or more sidelink cells during a time duration. The time duration may include a DRX OFF state of a cell group where a scheduling cell for the one or more sidelink cells for monitoring SL DCIs. The time duration may include a SCell deactivated time or a SCell dormancy duration when the SCell is the scheduling cell for the one or more sidelink cells. The time duration may include a power saving state of the scheduling cell. The time duration may include RRC INACTIVE state of the scheduling cell. FIG. 30 illustrates an example. FIG. 32 is a similar scenario to FIG. 29-31 except that a first wireless device may utilize one or more configured resources during a time duration when the first wireless device may not expect to receive SL DCIs from a base station (e.g., during DRX OFF state). The first wireless device may reactivate a gNB-assisted operation (e.g., mode 1) when the first wireless device switches to DRX Active state.

In an example, a wireless device may determine a first behavior (e.g., switching to a mode 2 operation, switching to one or more configured grant resources configured for a time duration and/or the like) or a second behavior (e.g., switching to DRX Active state based on sending a SL SR, ignore SCell deactivation command, and/or the like) based on a priority of one or more sidelink resource pools/one or more sidelink cells/one or more LCH mappings for one or more resource pools/sidelink cells configured with a gNB-assisted (mode 1) operation. For example, when the wireless device may have a sidelink operation with a priority greater than or equal to a threshold (e.g., configured by RRC signaling), the wireless device may determine the second behavior. Otherwise, the wireless device may determine the first behavior. When the wireless device may have/activate a plurality of resource pools and/or sidelink cells and/or LCHs mapping to a sidelink operation, the wireless device may determine the first behavior or the second behavior based on a highest priority. In an example, a wireless device may determine the first behavior or the second behavior per each resource pool of a sidelink cell which is configured with mode 1 operation or per each active sidelink cell activated with mode 1 operation or per a group of resource pools/sidelink cells.

In an example, a wireless device is connected to a base station. The wireless device may operate a sidelink operation and maintain one or more sidelink HARQ buffers. The wireless device may be configured with a mode 1 operation for one or more sidelink cells via a first cell. In response to receiving timeAlignmentTimer expiry on a cell group where the first cell belongs or on a timing advanced group where the first cell belongs or on the first cell, the wireless device may flush one or more first HARQ buffers associated with downlink and/or uplink operation. The wireless device may not flush the one or more sidelink HARQ buffers. The wireless device may release PUCCH and SRS. The wireless device may deactivate the mode 1 operation. The wireless device may clear configured uplink grants for an uplink operation. The wireless device may not clear one or more configured grants for a sidelink operation. The wireless device may continue the mode 1 operation using the one or more configured grants for the sidelink operation. With released PUCCH resources, the wireless device may disable HARQ-ACK feedback for the sidelink operation to the base station. The wireless device, except for configured grants for the sidelink operation, may release one or more RRC configurations/parameters.

When the wireless device may operate using a mode 2 operation, one or more timers associated with downlink and/or uplink operation may not impact one or more configuration related to the sidelink mode 2 operation. For example, the wireless device may not release configured resource pools for sidelink mode 2 operation, regardless of whether the resource pools are configured via a broadcast system information (e.g., SIBs) or a dedicated RRC signaling (e.g., a UE-dedicated configuration).

Figure 33:
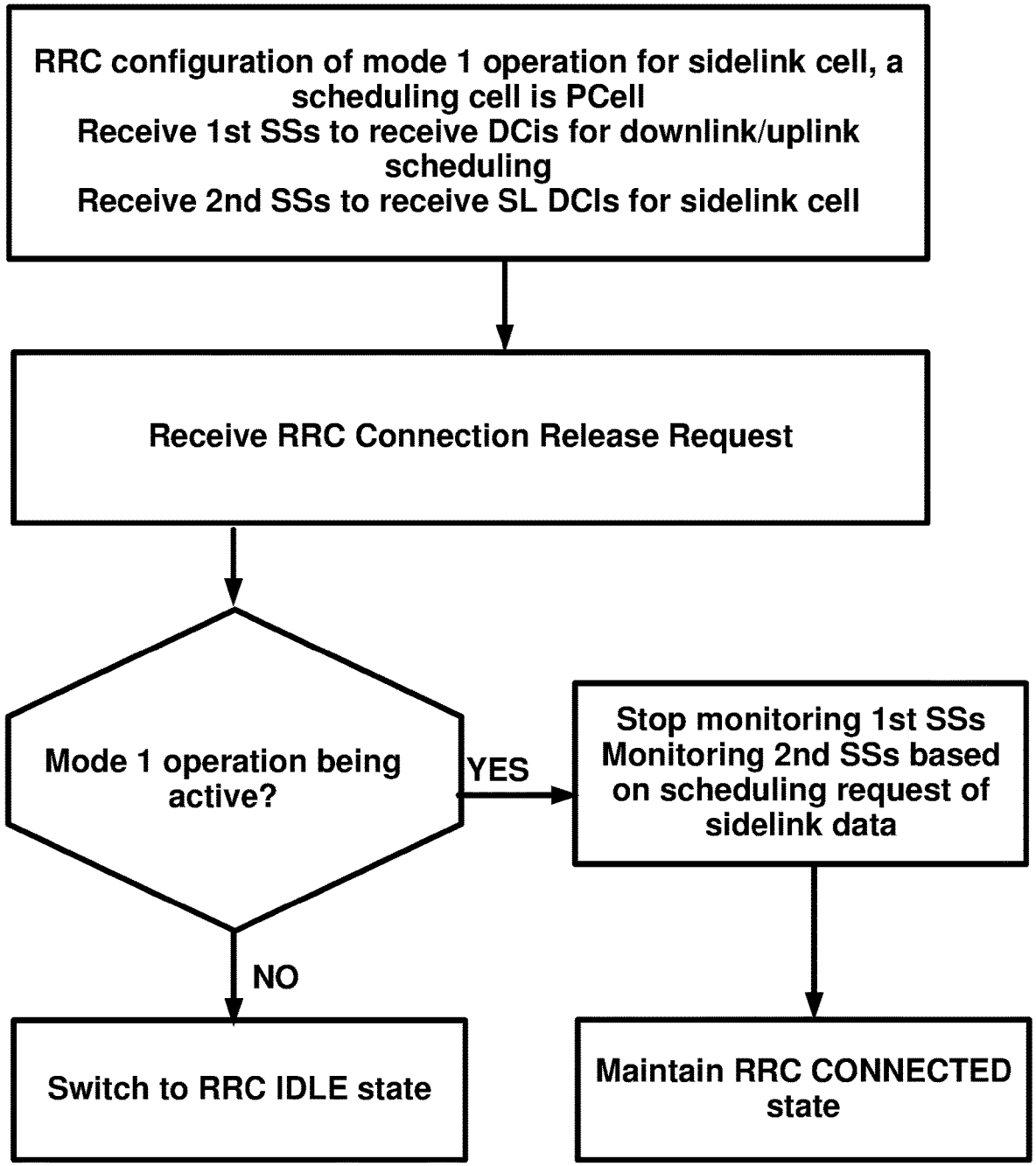
FIG. 33 is a flow diagram as per an aspect of an example embodiment of the present disclosure.

FIG. 33 illustrates a flow chart as per an aspect of an example embodiment of the present disclosure. A wireless device may switch to a RRC_IDLE in response to receiving a RRC connection release request when the wireless device may not have an active gNB-assisted sidelink operation. Otherwise, the wireless device may maintain a RRC CONNECTED state with reduced/limited functionalities (e.g., monitor only search spaces scheduling sidelink DCIs).

Figure 34:
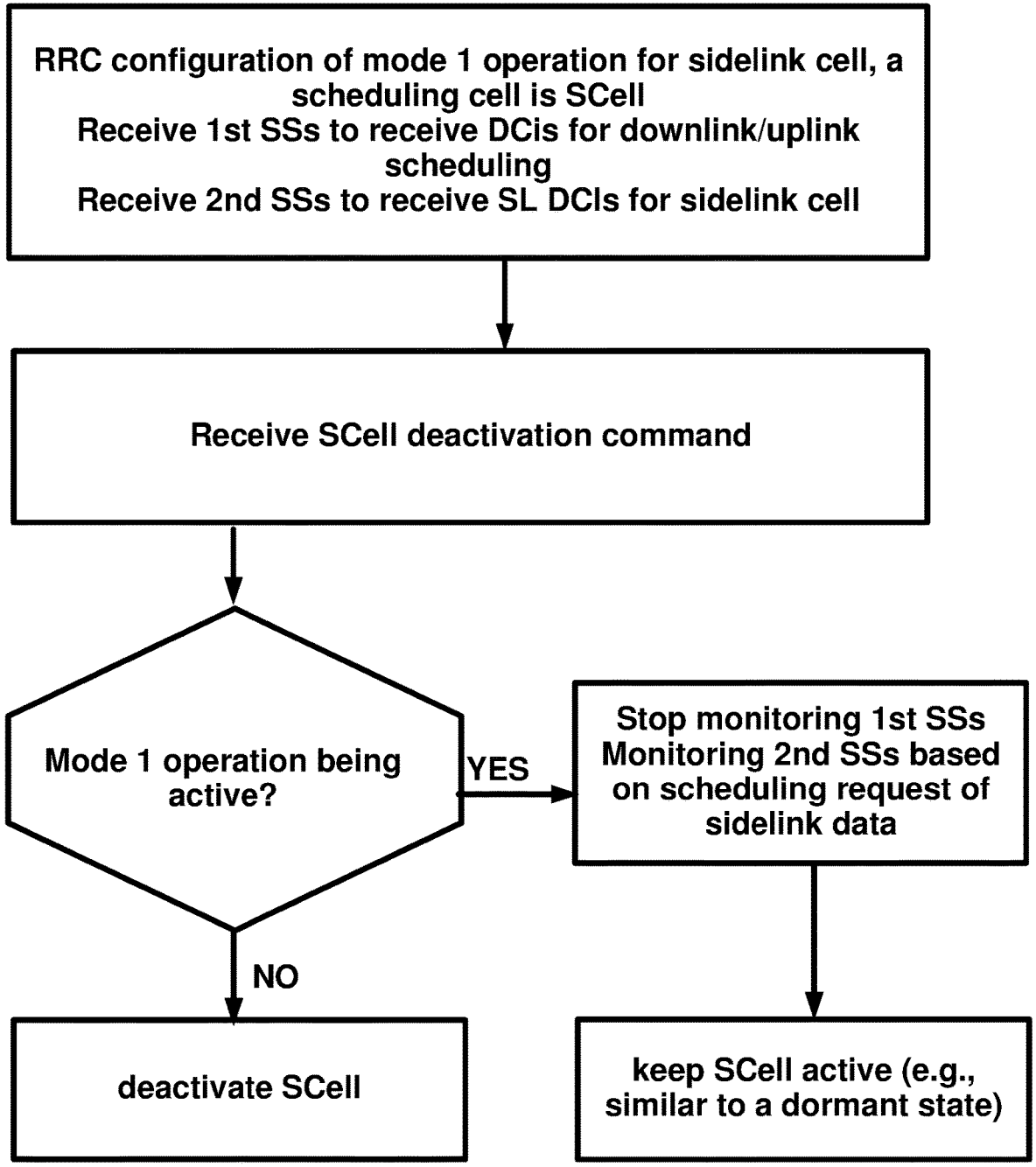
FIG. 34 is a flow diagram as per an aspect of an example embodiment of the present disclosure.

FIG. 34 illustrates a flow chart as per an aspect of an example embodiment of the present disclosure. A wireless device may deactivate a SCell in response to receiving a RRC connection release request when the wireless device may not have an active gNB-assisted sidelink operation via the SCell. Otherwise, the wireless device may maintain the SCell active with reduced/limited functionalities (e.g., a dormant-like state, a DRX OFF like state, monitor only search spaces scheduling sidelink DCIs).

In an example, a wireless device may receive one or more radio resource control (RRC) messages. The one or more RRC messages may comprise one or more first search spaces of a cell. The one or more RRC messages may comprise one or more second search spaces of the cell. The wireless device may monitor the one or more first search spaces to receive DCIs, from a base station, comprising resource assignments for downlink and/or uplink. The DCIs may comprise commands, to assist downlink and/or uplink and/or sidelink operations, such as slot formation indication, puncturing indication, transmission power control and/or the like instead of comprising the resource assignments or in addition to the resource assignments. The wireless device may monitor one or more second search spaces to receive at least sidelink DCIs, from the base station, comprising resource assignments for one or more sidelink cells and/or one or more resource pools of a sidelink operation. The wireless device may determine that one or more criteria are met. In response to the one or more criteria being met, the wireless device may stop monitoring the one or more first search spaces of the cell. The wireless device may monitor the one or more second search spaces based on transmitting a sidelink scheduling request (SL SR).

For example, the one or more criteria may comprise one or more of cases. A case may be when the wireless device may receive from the base station a RRC connection release request to initiate a RRC status change by the wireless device from a RRC CONNECTED to a RRC IDLE. A case may be when the wireless device may receive a SCell deactivation command (e.g., SCell activation/deactivation MAC CEs) from the base station to request a deactivation for the cell. A case may be when the wireless device may receive/detect/observe an expiry of a data inactivity timer which may trigger the RRC status change from the RRC CONNECTED to the RRC IDLE. For example, the wireless device may switch to the RRC IDLE in response to the expiry of the data inactivity timer when the wireless device is not configured with a mode 1 (e.g., a gNB assisted) sidelink operation. A case may be when the wireless device may receive/detect/observe an expiry of a SCell inactivity timer which may trigger the deactivation of the cell. A case may be when the wireless device may receive a power saving command to make the cell dormant state (e.g., no monitoring on one or more search spaces, no downlink/uplink data, suspend configured grant resources, etc.). A case may be when the wireless device may receive/detect/observe a power saving command to skip monitoring all of one or more first search spaces or all of one or more second search spaces comprising resource assignments for downlink/uplink configured to the cell. A case may be when the wireless device may switch to a DRX OFF state based on a DRX configuration. A case may be when the wireless device may receive/detect/observe one or more commands and/or expiry of one or more times leading a RRC status change from a RRC CONNECTED to a RRC INACTIVE. A case may be when the wireless device may receive one or more commands to deconfigure a second cell group, wherein the cell is a primary cell of the second cell group. The one or more criteria may not preclude other cases where the wireless device may be requested to change its behavior, particularly in terms of monitoring of one or more search spaces and/or releasing one or more RRC configured parameters.

For example, when the wireless device may receive a condition to release PUCCH resources of the cell, the wireless device may release one or more first PUCCH resources used only for uplink scheduling requests but maintain (e.g., not release) one or more second PUCCH resources used for sidelink scheduling requests. This may apply to one or more cases where the cell may be configured with the one or more first PUCCH resources and the one or more second PUCCH resources. For example, the cell may be a PCell, SPCell or a PUCCH SCell. The wireless device may perform the behavior in response to one or more second criteria are met. The one or more second criteria may comprise one or more cases. For example, a case may be when the wireless device may receive from the base station a RRC connection release request to initiate a RRC status change by the wireless device from a RRC CONNECTED to a RRC IDLE. A case may be when the wireless device may receive/detect/observe an expiry of a data inactivity timer which may trigger the RRC status change from the RRC CONNECTED to the RRC IDLE. For example, the wireless device may switch to the RRC IDLE in response to the expiry of the data inactivity timer when the wireless device is not configured with a mode 1 (e.g., a gNB assisted) sidelink operation. For example, the one or more first PUCCH resources being configured for HARQ-ACK feedback, CSI feedback and/or scheduling request for downlink and/or uplink. The one or more second PUCCH resources being configured at least for HARQ-ACK feedback and scheduling request for the sidelink operation for the one or more sidelink cells.

For example, the wireless device may monitor first set of RNTIs on the one or more first search spaces. For example, the wireless device may monitor second set of RNTIs on the one or more second search spaces. The second set of RNTIs may comprise the first set of RNTIs and one or more third RNTIs configured for SL DCIs for the one or more sidelink cells. The second set of RNTIs may comprise the one or more third RNTIs configured for SL DCIs for the one or more sidelink cells. In response to the one or more criteria being met, the wireless device may stop monitoring the first set of RNTIs. The wireless device may continue monitoring the one or more third RNTIs. The wireless device may stop monitoring a set of RNTIs belonging to the second set of RNTIs but not in the set of third RNTIs in response to the condition being met.

For example, the wireless device may receive (or be configured with) one or more parameters for a sidelink timer configuration. The wireless device may activate the sidelink timer in response to transmitting a SL SR. The wireless device may monitor for sidelink DCIs based on the second set of RNTIs via the one or more second search spaces while the sidelink timer being active. The wireless device may stop monitoring for sidelink DCIs based on the second set of RNTIs via the one or more second search spaces when the sidelink timer being not active. The wireless device may reset the sidelink timer in response to receiving a sidelink DCI from the base station. The wireless device may assume that the sidelink timer becomes inactive in response to an expiry of the sidelink timer.

The wireless device may attempt to apply behaviors in response to the one or more first criteria being met only when a highest priority of one or more sidelink resource pools is higher than or equal to a threshold. The wireless device assuming the one or more first criteria being not met otherwise. The wireless device may attempt to apply behaviors in response to the one or more first criteria being met only when a highest priority of one or more sidelink LCH mappings is higher than or equal to a threshold. The wireless device assuming the one or more first criteria being not met otherwise.

In an example, a wireless device may receive one or more radio resource control (RRC) messages. The one or more RRC messages may comprise one or more search spaces of a cell for scheduling DCIs for a sidelink cell. The wireless device may receive a first DCI for the cell wherein the first DCI may indicate a downlink bandwidth part switching of the cell. The wireless device may determine a highest priority from priorities associated with configured resource pools for the sidelink cell. The wireless device may determine a condition is met when the highest priority is higher than or equal to a threshold. The wireless device may be expecting a SL DCI from the base station in response to transmitting a SL SR. In response to the condition being met, the wireless device may delay the downlink bandwidth part switching after receiving the SL DCI or ignoring the downlink bandwidth part switching command In an example, a wireless device may transit to a first RRC state in response to receiving a RRC connection release command for a PCell while the wireless device operating a sidelink operation on one or more sidelink cells, wherein a base station may perform resource assignments on the one or more sidelink cells. The wireless device may transit to a RRC IDLE state from the first RRC state in response to a command to switch to a UE-autonomous resource selection mode instead of the base station performing resource assignments on the one or more sidelink cells.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 35:
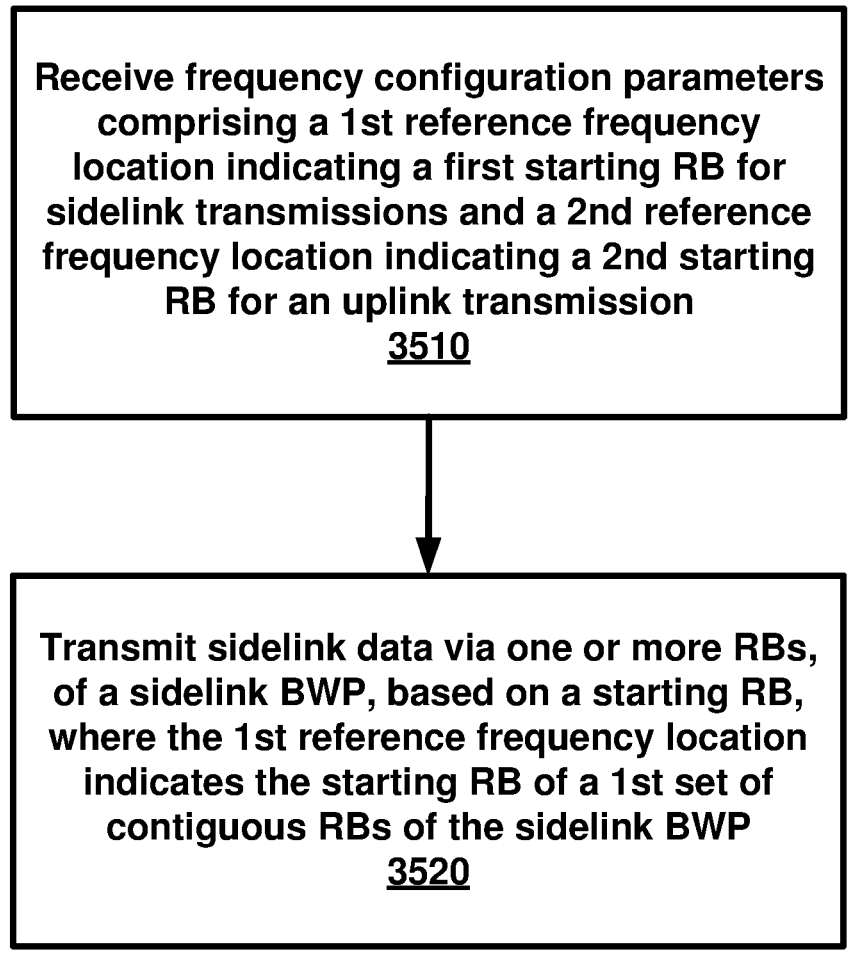
FIG. 35 is a flow diagram as per an aspect of an example embodiment of the present disclosure.

FIG. 35 is an flow diagram as per an aspect of an example embodiment of the present disclosure. At 3510, a wireless device may receive one or more frequency configuration parameters. The one or more frequency configuration parameters may comprise a first reference frequency location indicating a first starting resource block (RB) for sidelink transmissions. The one or more frequency configuration parameters may comprise a second reference frequency location indicating a second starting RB for an uplink transmission.

At 3510, sidelink data may be transmitted via one or more RBs, of a sidelink bandwidth part (BWP), based on a starting RB. The first reference frequency location may indicate the starting RB of a first set of contiguous RBs of the sidelink BWP.

Figure 36:
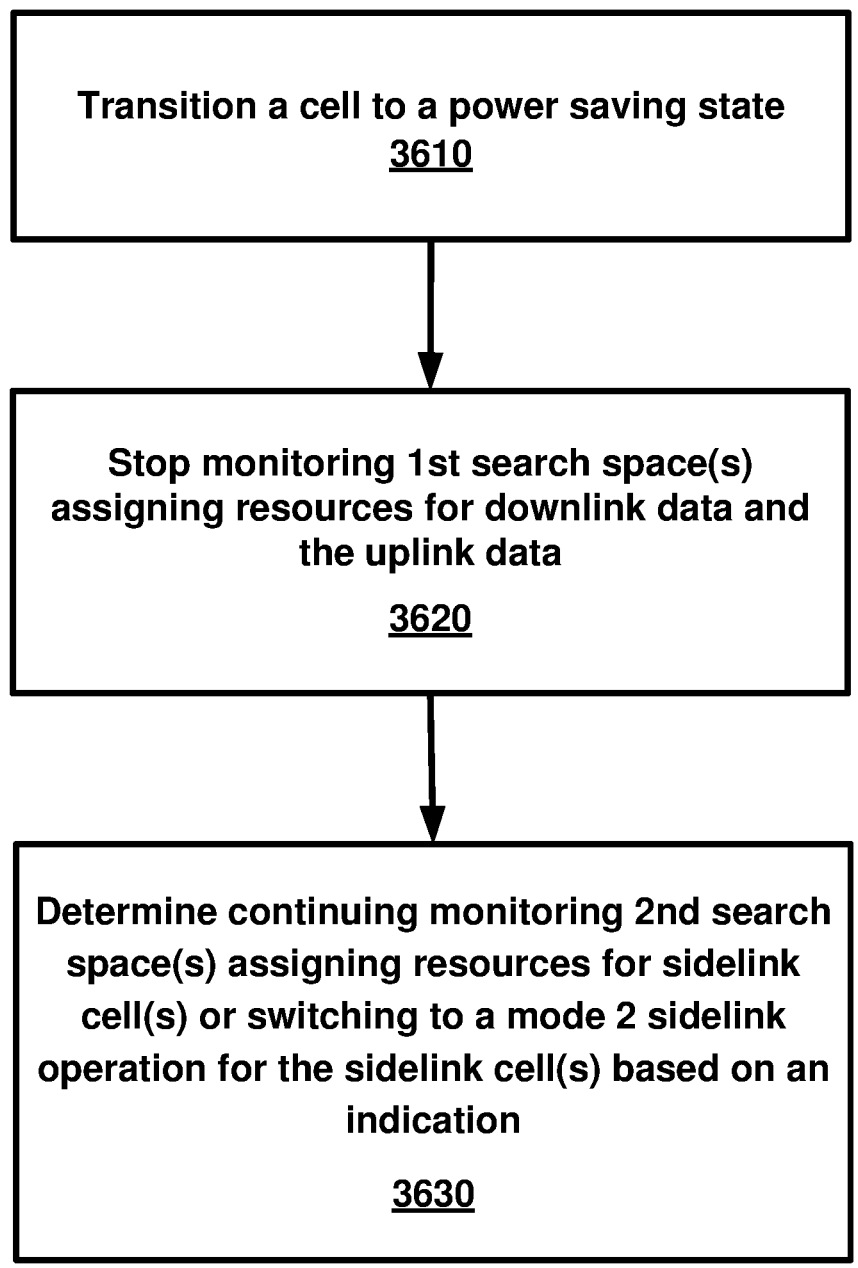
FIG. 36 is a flow diagram as per an aspect of an example embodiment of the present disclosure.

FIG. 36 is an flow diagram as per an aspect of an example embodiment of the present disclosure. At 3610, a wireless device may transition a cell to a power saving state. At 3620, the wireless device may stop, based on the transitioning, monitoring one or more first search spaces for assigning resources for downlink data and uplink data. At 3620, the wireless device may perform, based on the transitioning, one of: continuing monitoring one or more second search spaces for assigning resources for one or more sidelink cells; or switching to a mode 2 sidelink operation for the one or more sidelink cells.

Figure 37:
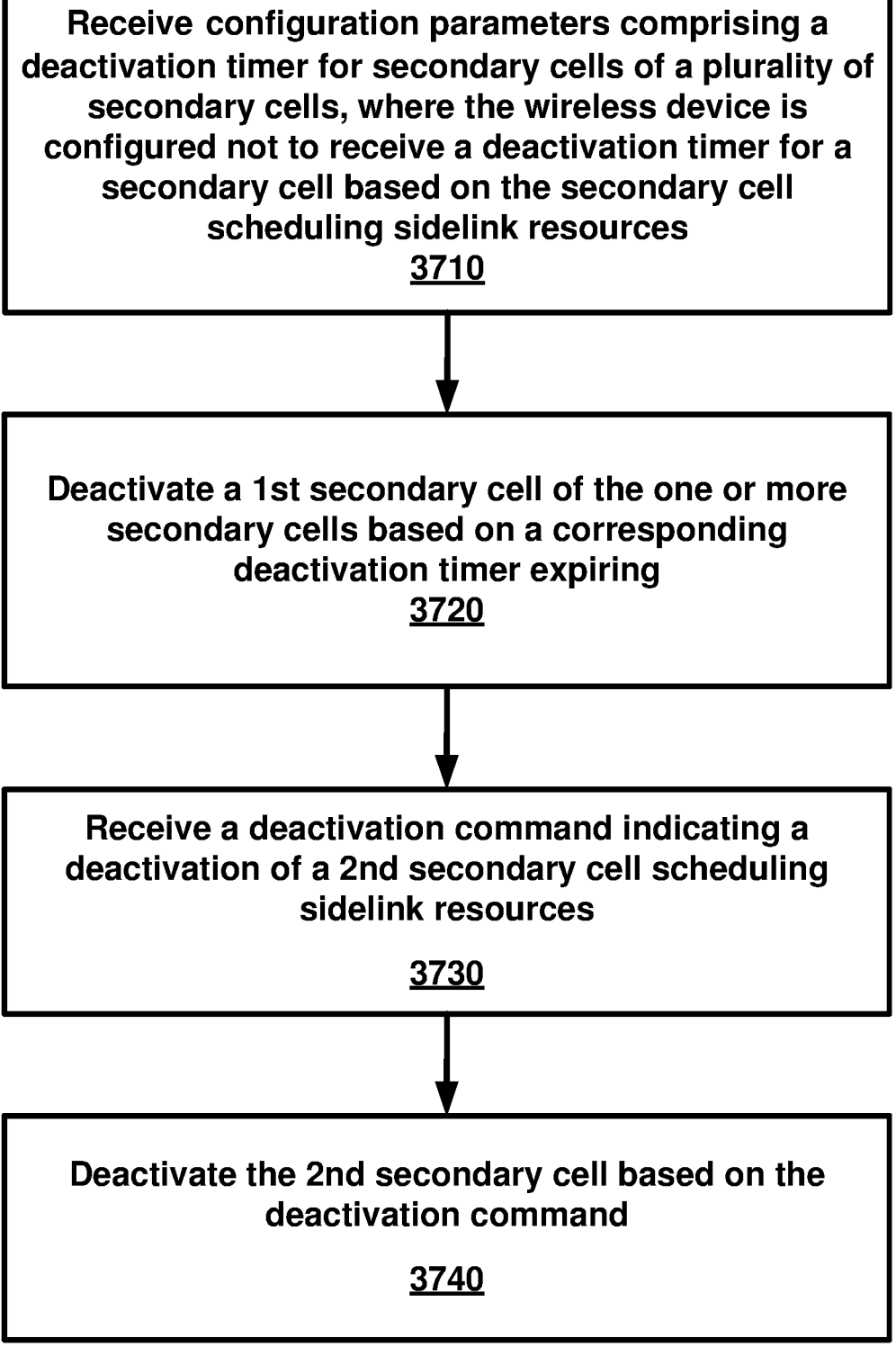
FIG. 37 is a flow diagram as per an aspect of an example embodiment of the present disclosure.

FIG. 37 is an flow diagram as per an aspect of an example embodiment of the present disclosure. At 3710, a wireless device may receive one or more radio resource control messages. The one or more radio resource control messages may comprise configuration parameters of a plurality of secondary cells. The one or more radio resource control messages may comprise a deactivation timer for one or more secondary cells of the plurality of secondary cells. The wireless device may be configured not to receive a deactivation timer for a secondary cell based on the secondary cell scheduling sidelink resources. At 3720, the wireless device may deactivate a first secondary cell of the one or more secondary cells based on a corresponding deactivation timer expiring. At 3730, the wireless device may receive a deactivation command indicating a deactivation of a second secondary cell scheduling sidelink resources. At 3730, the wireless device may deactivate the second secondary cell based on the deactivation command.

What is claimed is:

1. A method comprising:
  receiving, by a wireless device, one or more messages indicating:
    a first sidelink operation mode, for a sidelink carrier, in which a base station schedules sidelink resources for a sidelink carrier; and
    a scheduling cell for the sidelink carrier;
  transitioning the scheduling cell from a normal power state to a power saving state; and
  in response to the transitioning, switching from the first sidelink operation mode to a second sidelink operation mode in which the wireless device determines sidelink resources.

2. The method of claim 1, wherein:
  the first sidelink operation mode is resource allocation mode 1; and
  the second sidelink operation mode is resource allocation mode 2.

3. The method of claim 1, wherein the power saving state is:
- a dormant state of the scheduling cell;
- a deactivated state of the scheduling cell; or
- a state of a discontinuous reception (DRX) operation of the scheduling cell.

4. The method of claim 1, wherein the transitioning the scheduling cell to the power saving state is based on receiving, from the base station, one or more medium access control control element (MAC CEs) or one or more downlink control information (DCIs), indicating to transition the scheduling cell to the power saving state.

5. The method of claim 4, wherein the one or more MAC CEs or the one or more DCIs comprise a go-to-sleep indication for a DRX cycle of a DRX configuration of the scheduling cell.

6. The method of claim 1, wherein the transitioning the scheduling cell to the power saving state is based on an expiration of a timer.

7. The method of claim 1, wherein the scheduling cell is a primary cell or a secondary cell.

8. The method of claim 1, wherein, in the second sidelink operation mode, the wireless device determines sidelink resources for one or more sidelink transmissions without monitoring a physical downlink control channel (PDCCH) for sidelink downlink control information (DCIs).

9. The method of claim 1, wherein, in the first sidelink operation mode, the wireless device monitors a physical downlink control channel (PDCCH) for sidelink DCIs comprising resource assignments for one or more second sidelink transmissions.

10. The method of claim 1, wherein the one or more messages comprises one or more configuration parameters for a discontinuous reception (DRX) operation.

11. A wireless device comprising:
- one or more processors; and
- memory storing instructions that, when executed by the one or more processors, cause the wireless device to:
  - receive one or more messages indicating:
    - a first sidelink operation mode, for a sidelink carrier, in which a base station schedules sidelink resources for a sidelink carrier; and
    - a scheduling cell for the sidelink carrier;
  - transition the scheduling cell from a normal power state to a power saving state; and
  - in response to the transitioning, switch from the first sidelink operation mode to a second sidelink operation mode in which the wireless device determines sidelink resources.

12. The wireless device of claim 11, wherein:
- the first sidelink operation mode is resource allocation mode 1; and
- the second sidelink operation mode is resource allocation mode 2.

13. The wireless device of claim 11, wherein the power saving state is:
- a dormant state of the scheduling cell;
- a deactivated state of the scheduling cell; or
- a state of a discontinuous reception (DRX) operation of the scheduling cell.

14. The wireless device of claim 11, wherein the transitioning the scheduling cell to the power saving state is based on receiving, from the base station, one or more medium access control control element (MAC CEs) or one or more downlink control information (DCIs), indicating to transition the scheduling cell to the power saving state.

15. The wireless device of claim 14, wherein the one or more MAC CEs or the one or more DCIs comprise a go-to-sleep indication for a DRX cycle of a DRX configuration of the scheduling cell.

16. The wireless device of claim 11, wherein the transitioning the scheduling cell to the power saving state is based on an expiration of a timer.

17. The wireless device of claim 11, wherein the scheduling cell is a primary cell or a secondary cell.

18. The wireless device of claim 11, wherein, in the second sidelink operation mode, the wireless device determines sidelink resources for one or more sidelink transmissions without monitoring a physical downlink control channel (PDCCH) for sidelink downlink control information (DCIs).

19. The wireless device of claim 11, wherein, in the first sidelink operation mode, the wireless device monitors a physical downlink control channel (PDCCH) for sidelink DCIs comprising resource assignments for one or more second sidelink transmissions.

20. A system comprising:
- a base station comprising one or more first processors and memory storing instructions that, when executed by the one or more first processors, cause the base station to:
  - transmit one or more messages indicating:
    - a first sidelink operation mode, for a sidelink carrier, in which a base station schedules sidelink resources for a sidelink carrier; and
    - a scheduling cell for the sidelink carrier; and
- a wireless device comprising one or more second processors and memory storing instructions that, when executed by the one or more second processors, cause the wireless device to:
- receive, from the base station, the one or more messages;
- transition the scheduling cell from a normal power state to a power saving state; and
- in response to the transitioning, switch from the first sidelink operation mode to a second sidelink operation mode in which the wireless device determines sidelink resources.

* * * * *